United States Patent [19]
Chen et al.

[11] Patent Number: 5,814,715
[45] Date of Patent: Sep. 29, 1998

[54] AMORPHOUS OLEFIN POLYMERS, COPOLYMERS, METHODS OF PREPARATION AND DERIVATIVES THEREOF

[75] Inventors: Frank Joung-Yei Chen, Edison; Jon Edmond Randolph Stanat, Westfield; Cezar S. Baula, Edison, all of N.J.

[73] Assignee: Exxon Chemical Patents Inc, Linden, N.J.

[21] Appl. No.: 851,226

[22] Filed: May 5, 1997

Related U.S. Application Data

[63] Continuation of Ser. No. 992,871, Dec. 17, 1992, abandoned.

[51] Int. Cl.$^6$ .............................. C08F 10/08; C08F 10/14
[52] U.S. Cl. ....................... 526/348.6; 502/203; 502/231; 526/237; 526/348.2
[58] Field of Search ...................................... 502/251, 203

[56] References Cited

U.S. PATENT DOCUMENTS

| | | |
|---|---|---|
| 2,521,939 | 5/1950 | Oriolo . |
| 2,521,940 | 9/1950 | Oriolo . |
| 2,525,787 | 10/1950 | Fontana et al. . |
| 2,525,788 | 10/1950 | Fontana ................................... 585/725 |
| 2,571,354 | 1/1951 | Fontana . |
| 2,631,176 | 3/1953 | Heinrich . |
| 2,657,246 | 10/1953 | Schneider et al. . |
| 2,678,957 | 5/1954 | Fontana et al. . |
| 3,159,607 | 12/1964 | D'Alelio . |
| 3,497,568 | 2/1970 | Stepanek et al. . |
| 3,501,551 | 3/1970 | Heidler et al. . |
| 3,749,560 | 7/1973 | Perilstein ................................... 44/80 |
| 3,833,678 | 9/1974 | Brennan . |
| 3,932,371 | 1/1976 | Powers . |
| 3,985,822 | 10/1976 | Watson . |
| 4,162,233 | 7/1979 | Kramer ................................... 252/429 |
| 4,229,611 | 10/1980 | Kramer ................................... 585/728 |
| 4,419,503 | 12/1983 | Benitez et al. ........................... 526/237 |
| 4,465,887 | 8/1984 | Schammel ................................ 585/517 |
| 4,533,782 | 8/1985 | Meriianian ................................ 585/520 |
| 4,883,847 | 11/1989 | Leung et al. .............................. 526/84 |
| 4,948,522 | 8/1990 | Dunn et al. .............................. 252/32.7 |
| 4,952,739 | 8/1990 | Chen ........................................ 585/18 |
| 5,068,476 | 11/1991 | Wu ............................................ 585/12 |

FOREIGN PATENT DOCUMENTS

| | | |
|---|---|---|
| 0226112 | 6/1987 | European Pat. Off. . |
| 337737 | 10/1989 | European Pat. Off. . |
| 0370805 | 5/1990 | European Pat. Off. . |
| 369674 | 7/1992 | European Pat. Off. . |
| 01308411 | 2/1990 | Japan . |
| 1325701 | 8/1973 | United Kingdom . |
| 1525114 | 9/1978 | United Kingdom . |
| 2074175 | 10/1991 | United Kingdom . |

OTHER PUBLICATIONS

"Utilization of Waste $C_4$–Fraction From Petrochemical Manufacturing Preparation of Alkenylsuccinimides From Low Molecular Poly(n)–Butenes" Marek et al., Chemical Industry, vol. 40/85 (1990) No. 1.

"Catalyzed Polymerization of Monoalkylethylenes" Industrial & Engineering Chemistry, Fontana et al., vol. 44, No. 7, pp. 1688–1695, Mar. 5, 1992.

"High Molecular Weight Polymers From Propylene & 1–Butene" Industrial & Engineering Chemistry, vol. 44, No. 12, pp.2955–2962, Dec. 1952.

C. M. Fontana et al., Ind. Eng. Chem. (1952), 44(7), 1688–1695.

C. M. Fontana et al., Ind. Eng. Chem (1952), 44(12), 2955–2962.

*Primary Examiner*—Fred Zitomer

[57] ABSTRACT

The present invention includes related methods and uses, including composition comprising the polymer derived from a monomer having the formula:

$$H_2C=CHR; \quad (1)$$

and optionally at least one monomer selected from the group consisting of monomers having the formula:

$$R^1HC=CHR^2; \text{ and} \quad (2)$$

$$H_2C=CR^2R^3 \quad (3)$$

wherein R is a hydrocarbon or substituted hydrocarbon having from 2 to 22 carbon atoms, and $R^1$, $R^2$ and $R^3$ are the same or different hydrocarbons or substituted hydrocarbons having 1 to 22 carbon atoms. R is preferably an ethyl group ($-CH_2CH_3$) and $R^1$, $R^2$ and $R^3$ are preferably methyl groups ($-CH_3$).

27 Claims, 11 Drawing Sheets

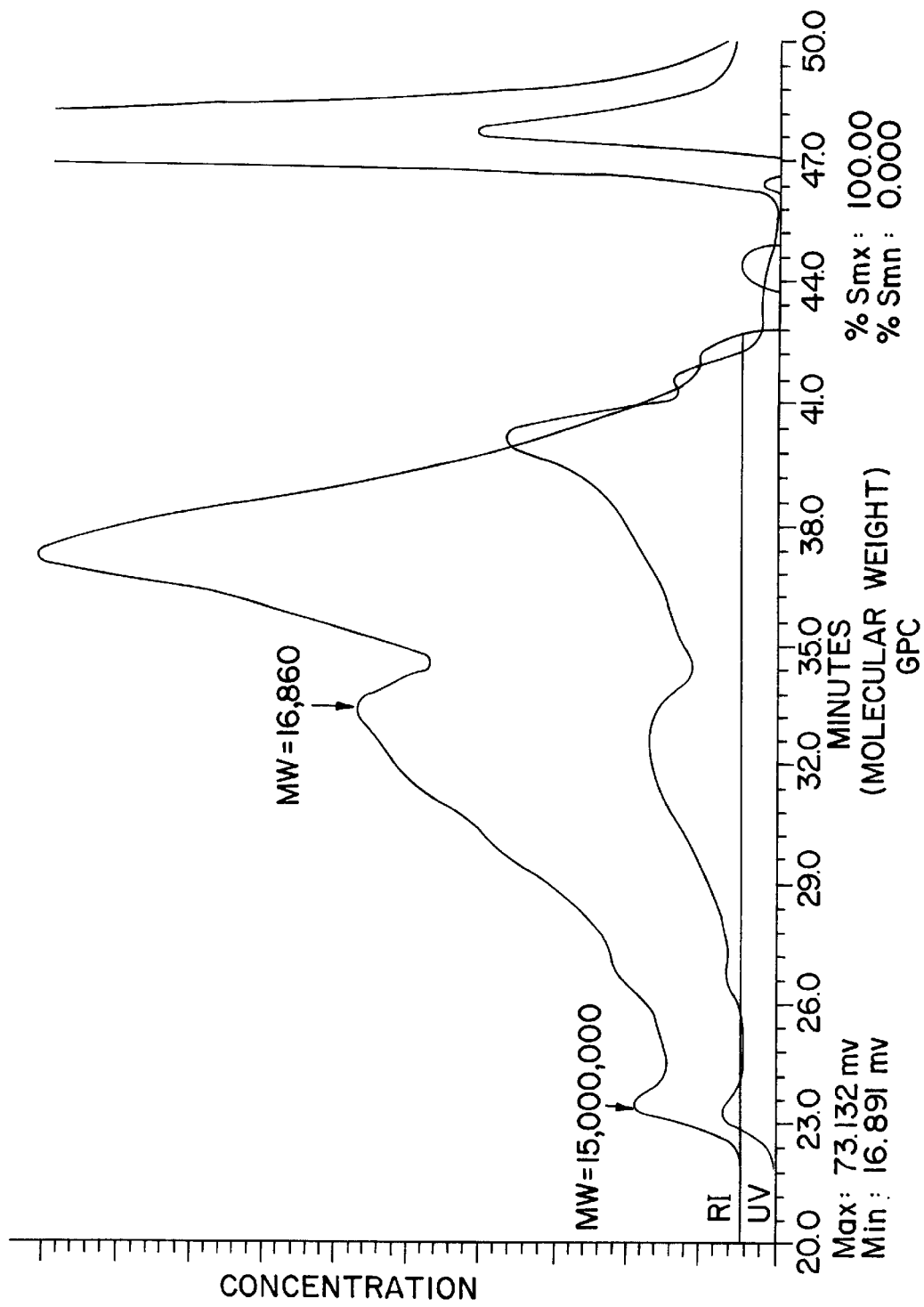

-30 °C

-15 °C

-10 °C

-5 °C

-0 °C

H-PNB PREPARED FROM SIMULATED RAFF-2 FEED

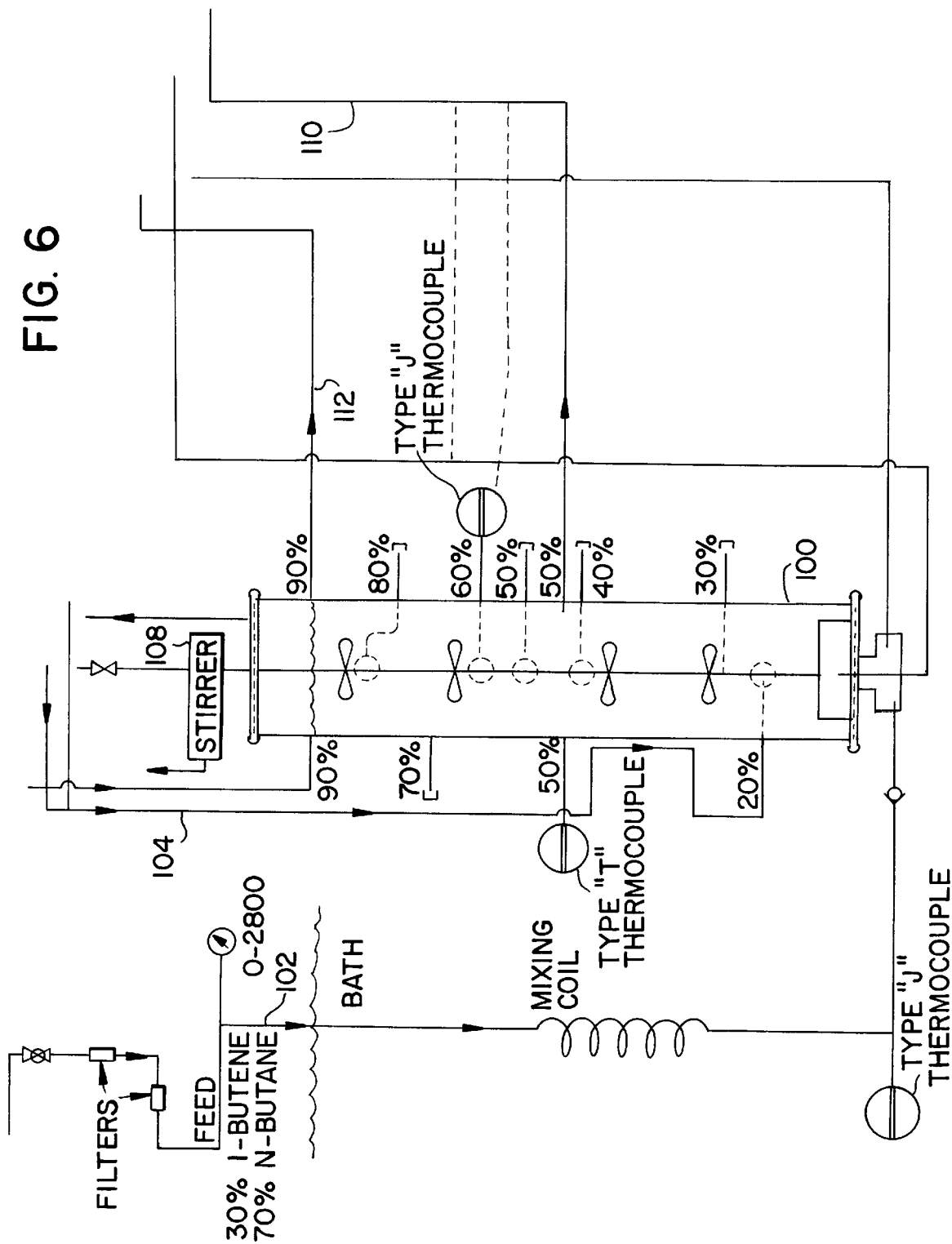

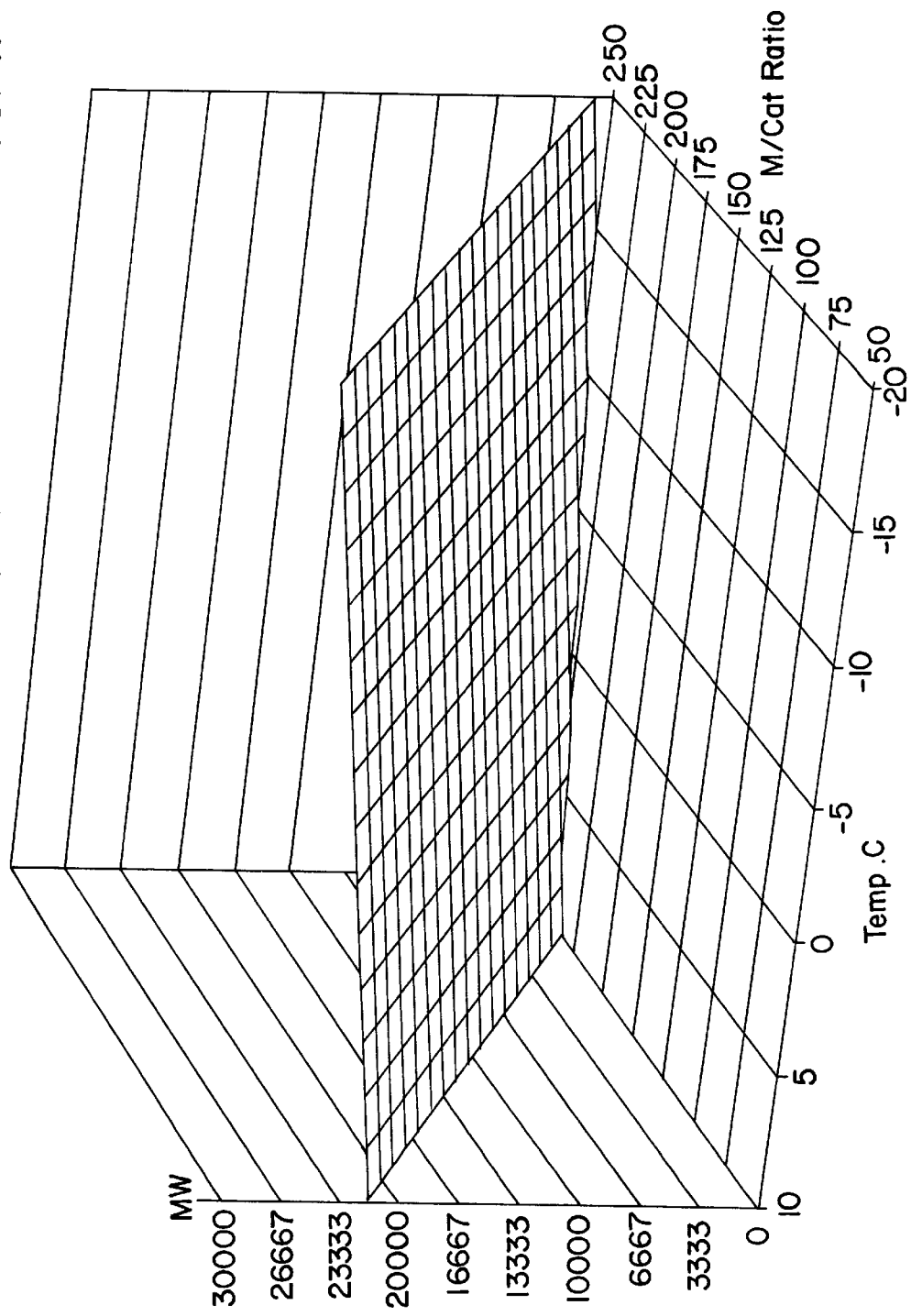

AMORPHOUS OLEFIN POLYMERS, COPOLYMERS, METHODS OF PREPARATION AND DERIVATIVES THEREOF

This is a continuation of application Ser. No. 07/992,871 filed Dec. 17, 1992 now abandoned.

BACKGROUND OF THE INVENTION

1. Field of the Invention

The present invention relates to the polymerization of olefins; and more particularly to the preparation of amorphous olefinic polymers, preferably poly-n-butenes, prepared using cationic polymerization; the functionalization and derivatization of such polymers.

2. Description of Prior Art

Feedstreams containing $C_4$ to $C_{24}$ hydrocarbons are fractionated during the processing of crude oil. In particular, $C_4$ feedstreams containing butadiene, isobutylene, 1-butene, cis- and trans-2-butene, butane and isobutane, are often processed to extract the butadiene leaving behind a mixture commonly referred to as Raffinate I, which typically contains isobutylene, 1-butene, cis- and trans-2-butene, n-butane and isobutane.

The Raffinate I stream is commonly used to produce polyisobutylene. Processes to produce isobutylene polymers use Lewis acid catalysts such as aluminum chloride in the presence of a number of cocatalysts, also referred to as catalyst promoters, which can include hydrogen chloride, and hydrocarbon chlorides such as isopropyl chloride, t-butyl chloride and water. Isobutylene has been polymerized using a $BF_3$ catalyst and a cocatalyst such as water.

The remaining feedstream, after removal of the isobutylene, is commonly referred to as Raffinate II. While the specific compositions may vary, Raffinate II typically contains n-butane, isobutane, and greater than 50% by weight of a mixture of n-butene-1, and cis- and trans-2-butene, as well as minor amounts, typically less than 5%, of isobutylene. There can also be minor amounts, i.e. less than 3%, of $C_3$ compounds. The amount of polymerizable butenes in purified Raffinate II is typically about 70% or greater. The ready supply of the Raffinate II feedstream makes it desirable to convert the Raffinate II, and particularly the 1- and 2-butenes in the Raffinate II, to useful products.

While attempts have been made over the years to generate polymers from n-butenes, limitations in the ability to process and polymerize n-butenes have limited their use. Generally, n-butenes have been polymerized using Ziegler-Natta type catalysts as well as Friedel-Crafts catalysts. Polymers made by using Ziegler-Natta catalysts are generally stereoregular. In particular, polymers such as poly(1-butene) are known to be polymerized using Ziegler-Natta catalysts to form stereoregular structures which leads to a crystalline polymer.

In contrast, cationic polymerization results in a head to tail addition of monomer in a random or atactic configuration which leads to an amorphous polymer. Disclosed Lewis acid and Friedel-Crafts catalysts include $AlCl_3$, $AlBr_3$, $BF_3$, $SnCl_4$, $H_2SO_4$ and other strong acids.

Fontana et al., *Catalyzed Polymerization of Monoalkylethylenes*, Industrial and Engineering Chemistry, Volume 44, No. 7, pg. 1688–1695 (received for view Oct. 6, 1951, accepted Mar. 5, 1952) reviews the polymerization of olefins by means of Friedel-Craft catalysts including aluminum bromide. The continuous polymerization of 1-butene is reviewed beginning at page 1691. Polymerization temperatures varied from –50° C. to 0° C. with optimum results obtained at about –35° C. A correlation between molecular weight, viscosity and thickening power is presented. A correlation of molecular weight and thickening power is also presented. A reported molecular weight of poly(1-butene) of 1,120,000 was obtained by a single determination using light scattering.

Fontana et al., *High Molecular Weight Polymers From Propylene and 1-butene. Industrial and Engineering Chemistry*, Volume 44, No. 12, pg. 2955–2962, December 1952, is a continuation of the above paper. This paper addresses the possibility that molecular weight was limited due to the removal of short chains from the reaction zone before they had sufficient time to grow to their full extent. An attempt was made to slow the growth of many polymer molecules in the reaction mixture. This was accomplished by using a semi-batch method to fully utilize the catalyst and the promoter and prevent tar formation by initiating the reaction under conditions simulating those used in the continuous method. Thickening power was used as an indicia of molecular weight.

U.S. Pat. No. 2,571,354 discloses polymerizing monoalkylethylenes in the presence of dissolved aluminum bromide catalyst and catalyst promoter under conditions of low instantaneous concentration of unpolymerized olefin and free olefin followed by conditions conducive to maximum growth of the polymer chains. The polymer is obtained by simultaneous mixing of monoalkylethylene and aluminum bromide solution in the presence of a catalyst promoter to produce polymerization mixture as a first step. In the second step, monoalkylethylene is slowly added to the polymerization mixture. By conducting the polymerization of monoalkylethylenes in this manner, polymer products of higher viscosities were obtained. It is postulated that the combination of low instantaneous concentrations of unpolymerized olefin and catalyst in the first step and the opportunity for polymer chains to grow in the second step, provides conditions for the production of high viscosity polymers having improved temperature-viscosity characteristics. The high viscosity polymers are disclosed to have comparatively low molecular weights.

U.S. Pat. No. 2,521,939 discloses the polymerization of olefins with a metal halide catalyst which can include aluminum bromide and a hydrogen bromide promoter. The polymerization process is directed to any type of olefin where hydrogen bromide promoter can be employed. Such processes include the polymerization of polypropylene, 1-butene, 2-butene, the isomeric pentenes, hexenes, etc. Other disclosed processes include the polymerization of diolefins, the copolymerization of two dissimilar monoolefins such as the copolymerization of propylene and a butene, or the interpolymerization of a monoolefin with a diolefin. The goal of this patent is to increase the viscosity of the olefin polymer products by removing impurities introduced with the hydrogen bromide promoter. The impurities are speculated to decrease the viscosity of the polymer products.

U.S. Pat. No. 2,525,787 discloses the polymerization of propylene to produce polymers having small changes in viscosity with changes in temperature. The process obtains high yields by contacting propylene with aluminum bromide dissolved in a non-polymerizing hydrocarbon solvent in the absence of a catalyst promoting agent. The aluminum bromide may be dissolved by stirring the solid compound with a saturated hydrocarbon solvent. Because solid aluminum bromide is difficult to handle and to dissolve, it is preferred to affect solution by melting. The aluminum bromide is heated to a temperature of about 98° C. or higher and thereafter mixed with the solvent while in a molten state. In batch processes the polymer is fed to a reactor containing dissolved aluminum bromide plus promoter. In continuous operation, dissolved aluminum bromide is fed to a reactor separately from the catalyst and the promoter. The catalyst is fed to the reactor and the hydrogen bromide is fed to the system through a line connected to the catalyst feed line upon entering the reactor.

U.S. Pat. No. 2,525,788 is directed to mineral oil lubricants containing polymers of 1-olefins including 1-butene. The 1-olefins containing 4 or more carbon atoms are polymerized in high yield. The disclosed process comprises contacting the olefin with aluminum bromide catalyst dissolved in a non-polymerizing hydrocarbon solvent in the presence of a catalyst-promoting agent under selected reaction conditions. The ratio of promoter to aluminum bromide catalyst is considered to be significant. Preferably, the ratio is between about 0.08 and 1.2 moles of catalyst promoter per mole of aluminum bromide catalyst. It was discovered that high thickening power polymers are obtained when the instantaneous 1-olefin monomer concentration in the reaction mixture is maintained at a low value. The rate of addition of 1-olefin should not be greater than 4.0 moles per mole of aluminum bromide catalyst per minute. Another significant variable is the olefin to catalyst ratio, which is disclosed to be in excess of 5 moles of olefin per mole of aluminum bromide catalyst. It is desirable to employ the 1-olefins as free as possible of isoparaffins, olefins containing two alkyl groups on the carbon atom once removed from the terminal carbon atoms, and 2-olefins, since the presence of these compounds tends to reduce the thickening power in the relative thickening power of the polymer product.

U.S. Pat. No. 2,657,246 discloses the polymerization of isobutylene at from −40° F. to 120° F. using a Friedel-Crafts type catalyst which can include aluminum chloride or aluminum bromide. There is disclosed a polymer product having a narrow range of high viscosity and high viscosity index with a molecular weight below 4000 Staudinger.

U.S. Pat. No. 2,678,957 is directed to the polymerization of polypropylene, butene-1, pentene-1, hexene-1, octene-1, decene-1, dodecene-1, and octadecene-1 as examples of monoalkylethylenes. It is disclosed that polymers of propylene, butene-1 and pentene-1 can be derived from $C_3$, $C_4$ and $C_5$ refinery streams respectively. Mixtures of monoalkylethylenes can also be used. An aluminum bromohalide catalyst system is used to make high viscosity polymers including poly-1-butene. However, when polymer products having relatively high thickening powers are desired, it is disclosed that the monoalkylethylene reactants must be substantially free of isoparaffins, 1-olefins having two alkyl groups on a carbon adjacent to the double bond, and/or olefins other than 1-olefins. The presence of these hydrocarbons tends to reduce the thickening power and the relative thickening power of the polymer products. Isobutane present in propylene in amounts as small as 1% by volume reduces the thickening power of the product by as much as 25%. The art, bridging columns 1 and 2 of '957, is cited as disclosing highly viscous polymers of monoalkylethylenes produced by the polymerization in the presence of aluminum bromide and hydrogen bromide through the concurrent use of specified molar ratios of promoter to dissolved aluminum catalyst.

U.S. Pat. No. 3,159,607 is directed to catalysts for the polymerization of olefins and substituted olefins. Suitable olefins disclosed include butene-1 and isobutylene. The catalysts disclosed include aluminum halide, specifically aluminum chloride, aluminum bromide, and organo aluminum compounds at concentrations ranging from 0.001 to 0.1 moles. The polymerization temperature ranged from −75° C. to 200° C. The pressures are from one atmosphere up to 10,000 psi. Example 1 discloses the production of polybutene using aluminum chloride, triisobutyl aluminum and toluene.

U.S. Pat. No. 3,833,678 is directed to stabilized solutions of aluminum chloride or aluminum bromide in molar excess, in methyl esters of certain normal and branched chain alkanoic acids.

U.S. Pat. Nos. 4,229,611 and 4,162,233 disclose the isomerization of various hydrocarbons by aluminum bromide and other super-acid type materials. Lewis acids are disclosed which are characterized as being capable of stabilizing high concentrations of tertiary cations, e.g. t-butyl cation and further characterized as capable of forming carbonium ion salts containing both dimeric and monomeric anions. The ions undergo hydride and halide exchange with other alkanes and halides. It is disclosed that pure, dried aluminum bromide is not an effective catalyst unless the system contains some trace of alkyl halide, alcohol or combination of an alkene and a protein source. Promoters include hydrogen halides, alkyl halides and water.

U.S. Pat. No. 4,533,782 discloses a process for polymerizing cationically polymerizable monomers using a solution containing an activated catalyst. The catalyst comprises:

a) an aluminum compound having the formula $R_nAlX_{3-n}$, wherein n is an integer from 0 to 3; R is $C_1$ to $C_{12}$ alkyl, $C_7$ to $C_9$ aralkyl, $C_7$ to $C_{18}$ alkaryl or $C_6$ to $C_{10}$ aryl; and X is Cl, Br or I; and b) (1) a compound having the formula R'X, wherein X is Cl, Br or I and R' is $C_1$ to $C_{24}$ alkyl, $C_3$ to $C_{20}$ alkenyl, $C_5$ to $C_9$ bridged or non-bridged cycloalkyl or cycloalkenyl, $C_7$ to $C_9$ aralkyl or (2) a hydrocarbon polymer carrying at least one X substituent wherein X is Cl, Br or I.

U.S. Pat. No. 5,068,476 is directed to liquid olefin oligomers produced by the oligomerization of $C_2$ to $C_5$ alpha-olefin alone or with ethylene as a comonomer. The oligomers have a high viscosity index and a structure which is characterized by a region-irregularity of at least 20%, usually from 20 to 40%. The molecular weight of the oligomers can range from 250 to 100,000. The olefins are oligomerized with a reduced valance state chromium oxide catalyst on a silica support, usually at a temperature from 90° C. to 250° C. The liquid oligomerization products can be produced in a wide range of viscosities including the direct production of low viscosity lubricants having high viscosity index.

U.S. Pat. No. 4,948,522 is directed to a dispersant additive package for cylinder lubricants for marine diesel engines. The package comprises a borated dispersant and a high molecular weight polybutene. Preferred polybutenes are disclosed to have a weight average molecular weight of greater than 200,000, more preferably greater than 500,000 and most preferably polybutenes of an average molecular weight of 400,000 to 3,000,000 are used.

U.S. Pat. No. 4,952,739 is directed to organo aluminum chloride catalyzed poly-n-butenes. Poly-n-butenes are prepared from a mixed $C_4$ hydrocarbon feedstream which comprises less than about 5% isobutylene and at least about 12% normal butenes together with n-butane, isobutane and less than about 1% butadiene. Streams of this type are commonly referred to as Raffinate II. In accordance with the disclosure, aluminum chloride catalyst was used to prepare poly-n-butene having a number average molecular weight range of about 300 to about 900.

"Utilization of Waste $C_4$-fraction from Petrol Chemical Manufacturing in the Preparation of Alkenyl-Succinimides from Low Molecular Weight Poly-n-butenes", Marek et al., Chemical Industry, vol. 40–85 (1990), No. 1 discloses low molecular weight poly-n-butene polymers made from Raffinate II.

European Patent Publication No. 0,337,737 discloses the polymerization of olefins in a Raffinate II composition containing 1-butene, and trans-2-butene with $BF_3$ or alkyl aluminum chlorides in the presence of HCl, HF or organic compounds with a reactive chlorine or fluorine bonded to a tertiary-, benzyl- or allyl carbon atom as co-initiators. The method is conducted in the presence of at least 20% 1-butene, and at least 15% 2-butene, at from −70° C. to +100° C. The resulting polymer has a number average molecular weight of 300 to 1,200.

European Patent Publication No. 0,369,674-B1 discloses oil soluble viscosity index improver-dispersant additives comprising poly-n-butene substituted carboxylic acid material. The poly-n-butene is disclosed to have a number average molecular weight of from about 300 to 3,000. More particularly, there is disclosed an oil soluble viscosity index improver-dispersant additives comprising the reaction products of (i) ethylene copolymers, such as copolymers of ethylene and propylene, grafted with ethylenically unsaturated carboxylic acid moieties, preferably maleic anhydride moieties; (ii) polyamines having two or more reactive amine groups selected from primary and secondary amine groups, or polyols; and (iii) poly-n-butene substituted carboxylic acid material wherein the poly-n-butene has a number average molecular weight of from about 300 to 3,000. The multifunctional viscosity index improvers containing the poly-n-butene substituted dicarboxylic acid material when incorporated into oleaginous compositions such as lubricating oil compositions, result in oil compositions exhibiting improved, low temperature viscosity characteristics.

Other references of interest include U.S. Pat. Nos. 2,521,940; 2,631,176; 3,497,568; 3,501,551; 3,749,560; 3,932,371; 3,985,822; 4,419,503; 4,465,887; 4,883,847 and GB 1,325,701.

SUMMARY OF THE INVENTION

The present invention relates to a cationically polymerized polymer composition which is derived from a monomer having the formula:

$$H_2C=CHR; \quad (1)$$

and optionally at least one monomer selected from the group consisting of monomers having the formula:

$$R^1HC=CHR^2; \text{ and} \quad (2)$$

$$H_2C=CR^2R^3 \quad (3)$$

wherein R is a hydrocarbon or substituted hydrocarbon having from 2 to 22 carbon atoms, and $R^1$, $R^2$ and $R^3$ are the same or different hydrocarbons or substituted hydrocarbons having 1 to 22 carbon atoms. R is preferably an ethyl group (—$CH_2CH_3$) and $R^1$, $R^2$ and $R^3$ are preferably methyl groups (—$CH_3$).

The polymer composition is at least 95% amorphous and has a number average molecular weight of greater than 500, preferably greater than 1,000, more preferably greater than 1,300 with a preferable range of from 1,300 to 15,000,000. Useful number average molecular weight ranges include: 1,500 to 15,000,000; 2,000 to 15,000,000; 2,500 to 15,000,000; 3,000 to 15,000,000; 3,500 to 15,000,000; 5,000 to 15,000,000, and 1,500,000 to 15,000,000. A preferred molecular weight range of polymers and copolymers of the present invention is 1,500 to 2,000,000, with a useful range of 3,500 to 1,000,000. A range of particular interest is from 1,500 to 200,000 for use as additives to lubricant compositions.

Specific embodiments include homopolymers such as poly(1-butene), poly(2-butene) and copolymers of 1-butene and 2-butene having a molecular weight of greater than 1,200,000, which can range from 1,500,000 to 15,000,000.

A preferred embodiment of the polymer composition of the present invention is a composition comprising an amorphous copolymer derived from at least one monomer having the formula:

$$H_2C=CHR \quad (1)$$

wherein R is a hydrocarbon having from 2 to 22 carbon atoms, and at least one comonomer selected from the group consisting of monomers having the formula:

$$R^1HC=CHR^2; \text{ and} \quad (2)$$

$$H_2C=CR^2R^3 \quad (3)$$

wherein $R^1$, $R^2$ and $R^3$ are the same or different hydrocarbons or substituted hydrocarbons having from 1 to 22 carbon atoms. The copolymer contains less than 5, preferably less than 4, more preferably less than 3 and most preferably less than 2 mole % of monomer units derived from formula (3). The copolymer is at least 95% amorphous, is preferably at least 99% amorphous and more preferably about 100% amorphous. The number average molecular weight of the copolymer is not less than 1,300 preferably 1,300 to 15,000,000. Specific embodiments have number average molecular weight ranges of: 1,300 to 20,000; 1,500 to 10,000; 20,000 to 200,000; 20,000 to 80,000; and 1,500,000 to 15,000,000. Preferably, R is an ethyl group and $R^1$, $R^2$ and $R^3$ are methyl groups.

The amorphous polymer and copolymers of the present invention preferably have at least one unsaturated group, preferably at least one carbon-carbon double bond, also referred to as an olefinic or ethylenic group which can be internal or at a terminal position.

Copolymers of the present invention can be derived from monomer compositions comprising 1-butene, 2-butene and up to 5 wt. % and typically 0 to 4 wt. % isobutylene. A preferred polymer is derived from a Raffinate II stream and comprises monomer units derived from formula (1) butene-1, formula (2) butene-2 and optionally, minor amounts of formula (3) isobutylene. Feedstreams such as Raffinate II can be polymerized to form higher molecular weight polymers. Raffinate II feedstreams typically comprise a mixture of 1-butene, cis-2-butene and trans-2-butene; there being less than 5% by weight of isobutylene and at least 12% by weight of 1-butene and 2-butene. The copolymer derived from Raffinate II can comprise up to 95 mole % and typically up to about 75 mole % of monomer units derived from 1-butene and up to 50 mole % of at least one 2-butene. Relative amounts of units derived from 1-butene and 2-butene in the copolymer are in ranges of 50 to 95 mole % of 1-butene and 5 to 50 mole % of at least one 2-butene. The preferred copolymer comprises at least 40, more preferably at least 50, and more preferably at least 60 mole % of repeating units derived from 1-butene.

The method of polymerization of the present invention can result in high molecular weight polymers and copolymers which are substantially, and preferably completely amorphous. By the term amorphous it is meant that the polymer chains form substantially no crystallinity and have no stereoregularity.

The method of the present invention comprises an improved process of polymerization conducted in the presence of a strong Lewis acid catalyst and preferably a reaction promoter also referred to as a cocatalyst or initiator. Strong Lewis acids can be classified as having Hammett Acidity Scale Value (Ho) of less than about −15 when dissolved in a non-reactive aprotic solvent. The concentration of the monomer relative to the catalyst can be controlled during the polymerization to minimize competing reactions of isomerization, cracking, alkylation and dimerization. These competing reactions can result from the formation of chain transfer agents which can reduce the molecular weight of the polymer. The amount of monomer being reacted can also be controlled to control polymer chain length. For higher molecular weight polymers, lower concentration of monomers in the reactor are maintained to drive the reaction to form longer polymer chains. The polymerization is preferably conducted at from −50° C. to +20° C., and more preferably at from −20° C. to +10° C.

The ability to form a high molecular weight amorphous polymer is believed to be critically dependent on the use of a catalyst which is a very strong Lewis acid. Strong Lewis acids useful in the method of the present invention are preferably Lewis acids having the formula MXn wherein M is a Group IIIA element of the Periodic Table, X is a halogen and n is the ratio of halogen atoms to atoms of M and have a Ho value of less than −15. Preferred Lewis acids are bromide salts selected from the group consisting of $AlBr_3$, $AlBr_2Cl$, $AlBrCl_2$, $GaBr_3$, $GaBrCl_2$, $GaBr_2Cl_2$, and $GaCl_3$, with $AlBr_3$ most preferred. Typical aluminum chloride catalysts will not achieve the desired molecular weights.

The catalyst is typically supplied as a solution. The solvent is preferably a normal alkane such as butane, isobutane, pentane, isopentane, hexane, heptane, octane and the like. In particular, preferred solvent should have substantially no chain transfer activity.

It has been found that the strong Lewis acid catalysts used in the method of the present invention can isomerize, crack, alkylate or dimerize the solvents, even solvents considered to be substantially nonreactive. The resulting materials can be deleterious to the formation of higher molecular weight materials. In order to minimize the formation of these poisons, it has been found that solutions of catalyst should be prepared immediately before the polymerization is to occur. This minimizes the residence time of the catalyst in contact with solvent.

Useful cocatalysts include hydrogen halides and alkyl halides, with hydrogen bromide and alkyl bromides most preferred. Preferably, a cocatalyst such as hydrogen bromide can be premixed with the monomer. Hydrogen bromide reacts with the olefinic monomer to form an alkyl bromide which has been found to be a particularly effective cocatalyst in the polymerization method of the present invention.

The polymers and copolymers of the present invention can be "functionalized", e.g. chemically modified, with a functional group as described hereinafter. Preferred functional groups are selected from acid, ester, anhydride, acid-ester, oxycarbonyl, carbonyl, formyl, formylcarbonyl, hydroxyl, and acetyl halides.

Functionalization can be achieved by any suitable method. Useful methods include the reaction of an olefinic bond of the polymer with an unsaturated, preferably a monounsaturated, carboxylic reactant. Alternatively, the polymer can be halogenated using chlorine or bromine-containing compounds. The halogenated polymer can then be reacted with the monounsaturated carboxylic acid. The polymer and the monounsaturated carboxylic reactant can also be contacted at elevated temperatures to cause a thermal "ene" reaction to take place. Alternatively, the monounsaturated carboxylic acid can be reacted with the polymer by free radical induced grafting. The polymer of the present invention can be functionalized by contact with a hydroxy aromatic compound in the presence of a catalytically effective amount of at least one acidic alkylation catalyst. The alkylated hydroxy aromatic compound can then be further reacted to form a derivative by Mannich Base condensation with an aldehyde and an amine reagent to yield a Mannich Base condensate. In yet another means to functionalize the polymer, the polymer may be contacted with carbon monoxide in the presence of an acid catalyst under Koch reaction conditions to yield the polymer substituted with carboxylic acid groups. In addition to the above methods of functionalization, the polymer of the present invention can be functionalized by methods of air oxidation, ozonolysis, hydroformylation, epoxidation and chloroamination.

The functionalized polymer can in turn be derivatized with a derivatizing compound. The derivatizing compound can react with the functional groups of the functionalized polymer by means such as nucleophilic substitution, Mannich Base condensation, and the like. The derivatizing compound can be polar and/or contain reactive derivative groups. Preferred derivatizing compounds are selected from hydroxy containing compounds, amines, metal salts, anhydride containing compounds and acetyl halide containing compounds. The derivatizing compounds can comprise at least one nucleophilic group and preferably at least two nucleophilic groups. A typical derivatized polymer is made by contacting a functionalized polymer, i.e., substituted with a carboxylic acid/anhydride or ester, with a nucleophilic reagent, e.g., amine, alcohol, including polyols, amino alcohols, reactive metal compounds and the like.

The polymers, functionalized polymers and/or derivatized polymers have uses as lubricating additives which can act as dispersants, viscosity index improvers, or multifunctional viscosity index improvers. Preferred functionalized polymers and derivatized polymers are characterized by their respective reactive functional or derivative groups.

BRIEF DESCRIPTION OF THE DRAWINGS

FIG. 3 is a plot of concentration vs. time (number average molecular weight) measured by gel permeation chromatography for polymer made in Example 1.

FIG. 6 illustrates a schematic diagram of a pilot plant system used to prepare polymer in Example 8.

FIG. 11 is a graph showing number average molecular weight, temperature and monomer cation ratio at a continuous process wherein the cocatalyst-catalyst ratio is 1.5.

DETAILED DESCRIPTION OF THE PREFERRED EMBODIMENTS

Polymers

Figure 1:
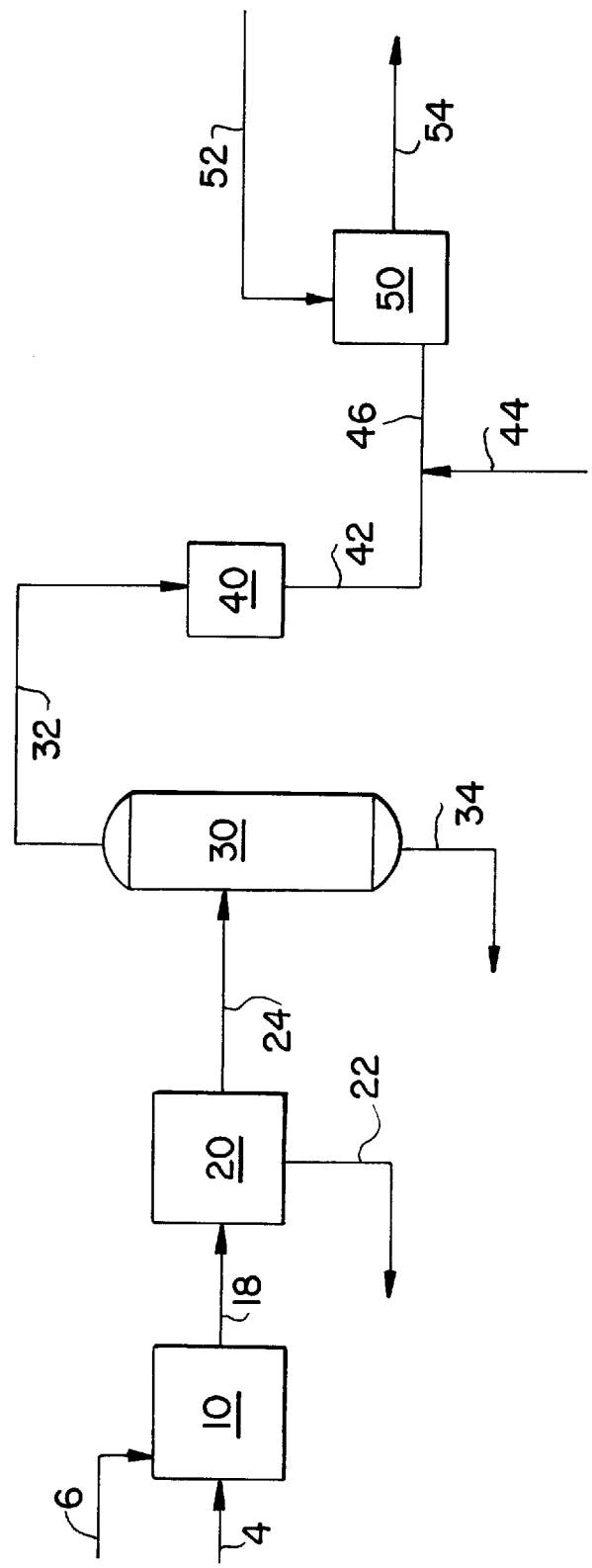
FIG. 1 is a schematic illustration of a flow chart of an embodiment of the process of the present invention.

Preferred embodiments of the present invention relate to amorphous polymers and copolymers derived from at least one monomer having the formula (1) $H_2C$=CHR, or (2) $R^1HC$=$CHR^2$ where R is a hydrocarbon having from 2 to 22 carbon atoms, $R^1$ and $R^2$ are the same or different hydrocarbons or substituted hydrocarbons having from 1 to 22 carbon atoms. A preferred homopolymer is derived from 1-butene.

Preferred homopolymer has a number average molecular weight which includes polymer molecules of from greater than 1,200,000 up to about 15,000,000. The homopolymer composition comprises up to 1, preferably 0.5 to 1.0, more preferably 0.75 to 1.0 and most preferably 0.9 to 1.0 carbon-carbon double bonds per polymer chain.

A further preferred embodiment of the present invention is a composition comprising an amorphous copolymer having present within its structure: at least 40, preferably at least 50 and most preferably at least 75 mole % of monomer units derived from at least one monomer having the formula:

$H_2C$=CHR (e.g. butene-1)     (1)

wherein R is a hydrocarbon having from 2 to 22 carbon atoms, and at least 5, but not greater than 60, preferably not greater than about 40, and most preferably not greater than about 25 mole % of monomer units derived from at least one comonomer selected from the group of monomers represented by the formulas:

$R^1HC$=$CHR^2$ (e.g. cis or trans butene-2); and     (2)

$H_2C$=$CR^2R^3$ (e.g. isobutylene)     (3)

wherein $R^1$, $R^2$ and $R^3$ are the same or different hydrocarbons or substituted hydrocarbons having from 1 to 22 carbon atoms with the proviso that the copolymer contains monomer units derived from monomers of formula (3) in amounts not greater than 5, preferably not greater than about 4 and most preferably not greater than about 3 mole %. Preferably, R is an ethyl group, and $R^1$, $R^2$ and $R^3$ are methyl groups. The copolymer comprises up to 1, preferably 0.5 to 1.0, more preferably 0.75 to 1.0 and most preferably 0.9 to 1.0 carbon-carbon double bonds per polymer chain.

Useful formula (1) monomers include linear α-olefins having from 4 to 24 carbons ($C_4$ to $C_{22}$). Typical of such α-olefins include butene-1, n-pentene-1, n-hexene-1, n-heptene-1, n-octene-1, n-nonene-1, n-decene-1, etc. Non-linear (branched) α-olefins which have from 4 to 24 carbons are also useful and include isobutylene $CH_2$=CH—$CH_2$—$CH(CH_3)_2$, $CH_2$=CH—$CH_2CH_3CH_2CH_3$, and the like with the proviso that there be at least one —$CH_2$— group between the olefinic bond and the branch (e.g., $H_2C$=CHCR'R"—) Preferred R groups include ethyl, butyl, pentyl,

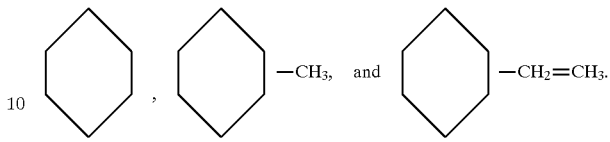

Useful formula (2) 1,2-disubstituted comonomers include cis-butene-2 and trans-butene-2 preferred. Preferred $R^1$, $R^2$ and $R^3$ groups include methyl, ethyl,

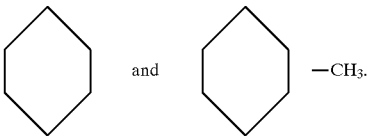

Reference is made to U.S. Pat. No. 5,102,445 herein incorporated by reference for useful comonomers.

More specifically, limits are placed on the monomer content derived from formula (3) such as isobutylene derived monomer units. This stems from the fact that isoolefins such as isobutylene more readily polymerize, while the present invention is directed to the discovery of how to polymerize or copolymerize monomers of feed streams containing α-olefins, e.g., butene-1, and also olefin-2, e.g. butene-2, monomer which are much more difficult to polymerize cationically. α-Olefins polymerize cationically at a faster rate than olefin-2 monomers, resulting in polymer with a maximized α-olefin content. However, it is an advantage of the process of the present invention that it is possible to incorporate olefin-2 monomers into the polymer since many commercial feeds also contain such monomers to varying degrees.

In view of the above, the copolymers of the present invention will typically comprise from about 40 to about 95 (e.g. 50–90), preferably 50 to about 95, (e.g. 60–85) and more preferably 60 to about 95 (e.g. 65–85) mole % of a-olefin derived monomer units and typically from about 60 to about 5 (e.g. 50–10), preferably from about 50 to about 5 (e.g. 40–15) and most preferably from about 40 to about 5 ( e.g. 35–15) mole % olefin-2 derived monomer units of formula 2.

The homopolymers and copolymers of the present invention can be conveniently characterized based on molecular weight range. As recited, the polymers and copolymers of the present invention can be made over a large molecular weight range. Polymers and copolymers of low, intermediate and high molecular weights can be prepared.

The polymers typically have a number average molecular weight of greater than 1,300, preferably 1,300 to 15,000, 000. Specific embodiments of the polymers and copolymers of the present invention have number average molecular weight ranges of from about 1,500 to 15,000,000; 2,000 to 15,000,000; 2,500 to 15,000,000; 3,000 to 15,000,000; 3,500 to 15,000,000; 5,000 to 15,000,000; 1,300 to 200,000; 1,300 to 20,000; 3,500 to 20,000; 1,500 to 10,000; 10,000 to 100,000; 20,000 to 200,000; 20,000 to 100,000; 1,200,000 to 15,000,000; 1,500,000 to 15,000,000; 1,500 to 2,000,000; and 3,500 to 2,000,00.

Dispersant range molecular weight polymers, also characterized as low molecular weight polymers, are considered to be polymers having a number average molecular weight of typically less than 20,000, preferably less than 10,000 and most preferably less than 8,000 and typically can range from 500 to 10,000 (e.g. 500 to 5,000), preferably from 1,000 to 8,000 (e.g. 1,000 to 5,000) and most preferably from 1,500 to 6,000 (e.g. 1,500 to 3,000). Other embodiments include 3,500 to 19,000. The low molecular weights are number average molecular weights measured by vapor phase osmometry. Low molecular weight polymers are useful per se as synthetic base oils and in forming dispersants for lubricant additives through the functionalization and derivatization techniques described hereinafter.

Viscosity modifier range molecular weights also described herein as medium molecular weight polymers are considered to have number average molecular weights of typically greater than 20,000, preferably greater than 25,000 and typically can range from 20,000 to 200,000, preferably 25,000 to 100,000, and more preferably from 25,000 to 80,000 are useful for viscosity index improvers for lubricating oil compositions, adhesive coatings, tackifiers and sealants. The medium number average molecular weights can be determined by membrane osmometry. In addition, such polymers may be functionalized and derivatized to make multifunctional viscosity index improvers which also possess dispersant properties.

The higher molecular weight materials have a number average molecular weights of typically greater than 200,000 and typically range from about 210,000 to about 15,000,000, preferably from about 210,000 to 10,000,000 and most preferably from about 500,000 to about 2,000,000. These polymers are useful in polymeric compositions and blends including elastomeric compositions.

Molecular weight materials having number average molecular weights of from 20,000 to 15,000,000 can be measured by gel permeation chromatography with universal calibration, or by light scattering as recited in Billmeyer, Textbook of Polymer Science, Second Edition, pp. 81–84 (1971). A convenient method for such determination is by gel permeation chromatography (GPC) which additionally provides molecular weight distribution information, see W. W. Yau, J. J. Kirkland and D. D. Bly, "Modern Size Exclusion Liquid Chromatography", John Wiley and Sons, New York, 1979.

The molecular weight distribution (MWD) depends on polymerization conditions. The molecular weight distribution can be controlled depending on the desired polymer. Useful polymers have narrow molecular weight distributions of less than 4 and ranging from 1.1 to 4.0, 1.2 to 2.0 and 1.3 to 1.5. Such polymers include those useful as lubrication and viscosity index improvers. Other polymers can have large MWD's of 10 or greater. Polymers can also be prepared with multiple distribution.

The preferred copolymers contain monomer units derived from monomer comprising 1-butene, 2-butene and up to 5 wt. %, typically 0 to 4 wt. %, isobutylene. This enables feedstreams such as Raffinate II to be polymerized to form higher molecular weight polymers which are oil soluble. Raffinate II feedstreams typically contain a mixture of 1-butene, cis-2-butene and trans-2-butene. The Raffinate II feedstock preferably comprises typically less than 5%, preferably less than 4% and most preferably less than 3% by weight of isobutylene, and typically at least 12, preferably at least 30% and most preferably at least 45 mole % of 1-butene and 2-butenes.

The copolymer derived from Raffinate II, comprises up to about 95 mole % of monomer units derived from 1-butene and up to about 50 mole % of at least one 2-butene. The mole ratio monomer of units derived from 1-butene and 2-butene in the copolymer, ranges typically from about 1:1 to about 20:1, preferably from about 5:1 to about 15:1 and most preferably from about 8:1 to about 15:1.

The copolymer can additionally include from up to 50, typically up to 40 mole % and more typically 1 to 10 mole % of other repeating units including units derived from styrenic comonomers selected from the group consisting of styrene and substituted styrene including α-methylstyrene and paramethylstyrene. The polymers or copolymers can include minor amounts, up to 10 mole % and preferably less than 5 mole % of units derived from styrenic comonomers selected from the group consisting of styrene and substituted styrene. Preferred substituted styrenes include α-methylstyrene, paramethylstyrene, paramethyloxystyrenes, parahalide-styrenes, i.e., parachlorostyrene, divinyl benzene and other styrene derivatives. Reference is made to U.S. Pat. No. 5,102,445 for other useful comonomers.

The polymers or copolymers of the present invention are preferably at least 95%, and more preferably at least 99% amorphous, and most preferably about 100% amorphous. In accordance with the method of polymerization as recited below, polymers and copolymers result which are substantially, and preferably completely amorphous. By the term amorphous it is meant that the monomer units have side chains randomly located along the polymer backbone. The polymer chains form substantially no crystallinity and substantially no stereoregularity. Hence they are oil soluble even at extremely high molecular weights. More particularly, polymers are produced which form substantially no crystals when dissolved or suspended in oleaginous liquids, typically hydrocarbon liquids such as oil base stock or gasoline. The amorphous polymers are formed by the random polymerization of at least one monomer recited above. During formation the monomers and comonomers polymerize randomly in a head-to-tail fashion. The random nature of the substituents on the backbone precludes packing which results in crystal formation.

The degree of crystallinity (inversely the % amorphous) can be determined by: 1) Specific volume measurement, 2) X-ray diffraction, 3) infrared spectroscopy, 4) heat content as a function of temperature through fusion range, 5) differential scanning calorimetric measurements or 6) NMR spectroscopy. Reference is made to Billmeyer, Jr., *Textbook of Polymer Science 2nd Ed.*, Wiley-Interscience pp. 172–174 (1971).

The polymers of the present invention are made by cationic polymerization based on the use of the strong Lewis acid. This type of polymerization typically results in the polymer having a carbon-carbon double bond, i.e., an olefinic unsaturation at the end of the polymer chain. However, unsaturation can also be present near the chain end or intermediate in the chain depending on the condition of polymerization.

The polymers of the present invention preferably comprise a high degree of terminal unsaturation. Terminal unsaturation is the unsaturation provided by the last monomer unit located in the polymer. The unsaturation can be located anywhere in this terminal monomer unit. Terminal olefinic groups include vinylidene unsaturation, $R^aR^bC=CH_2$; trisubstituted olefin unsaturation, $R^aR^bC=CR^cH$; vinyl unsaturation, $R^aHC=CH_2$; 1,2-disubstituted terminal unsaturation, $R^aHC=CHR^b$; and tetra-substituted terminal unsaturation, $R^aR^bC=CR^cR^d$. At least one of $R^a$ and $R^b$ is a polymeric group of the present invention, and the remaining $R^b$, $R^c$ and $R^d$ are hydrocarbon groups as defined with respect to R, $R^1$, $R^2$ and $R^3$ above. Ranges of terminal unsaturation of polymers of the present invention are: 1 to 50 mole % of vinylidene termination; 5 to 90 mole % of trisubstituted termination; 0 to 20 mole % vinyl termination; 0 to 40 mole % 1,2-disubstituted terminal unsaturation; and 0 to 60 mole % tetra-substituted terminal unsaturation. More typically, the ranges can be from 10 to 20 mole % vinylidene; 20 to 80 mole % tri-substituted, 0 to 10 mole % vinyl; 0 to 20 mole % 1,2-disubstituted and 5 to 50 tetra-substituted. Terminal unsaturation of copolymer made from Raffinate II is typically from 10 to 20 mole % vinylidene (typically ethylvinylidene); 20 to 80 mole % tri-substituted; 1 to 10 mole % vinyl; 5 to 20 mole % of 1,2-disubstituted; and 5 to 50 mole % tetra-substituted terminal unsaturation.

Preferably, the polymers used in this invention contain less than 5 wt. %, more preferably less than 2 wt. %, and most preferably less than 1 wt. % of a polymer fraction comprising polymer molecules having a number average molecular weight of less than about 300, as determined by high temperature gel permeation chromatography employing the corresponding polymer calibration curve. In the event the polymer produced as described above contains greater than about 5 wt. % of such a low molecular weight polymer fraction, the polymer can be first treated by conventional means to remove the low molecular weight fraction to the desired level prior to initiating functionalization.

Method of Polymerization

The method of the present invention is an improved process of cationic polymerization conducted in the presence of a strong Lewis acid catalyst and a reaction promoter. Strong Lewis acids are defined herein as having Hammett Acidity Scale Value (Ho) less than about −15, when dissolved in a non-reactive aprotic solvent.

The cationic polymerization results in an amorphous polymer. Preferably, the polymer or copolymer is substantially amorphous. The polymer is preferably at least 95% and more preferably at least 99% and most preferably substantially 100% amorphous. The random polymer backbone construction prevents crystal formation. The polymers can be used in a variety of applications where crystal formation would result in an insoluble polymer which would precipitate out of the composition. This is particularly undesirable in lubricating compositions where dispersants and viscosity improvers which crystallize out are deleterious to the performance of the composition.

The polymer chain length is a function of monomer concentration in the reactor. For higher molecular weight polymers, the monomer concentration in the reactor is controlled to be relatively low so that the minimum of competing reaction of the monomer takes place. Additionally, feedstreams containing compounds such as isobutylene result in low molecular weight polymers. By controlling the amount of isobutylene and other chain transfer agents, the effects of these types of materials is reduced. However, small amounts (i.e., <5 wt. %) of isobutylene can be tolerated and even copolymerized into the forming polymer chains.

The method of the present invention has a particular advantage of being capable of polymerizing petroleum feedstreams such as Raffinate II. Typical feedstocks are disclosed in the art such as in U.S. Pat. No. 4,952,739, herein incorporated by reference. Such feedstreams can be characterized as a dilute, preferably liquified olefin feedstream comprising at least 1, preferably at least 2, olefin reactant(s) and diluent admixed therewith. The diluent is differentiated from this olefin reactant in that it does not participate in the polymerization reaction and hence is viewed as being non-reactive. Since the major constituents in typical petroleum feedstreams suitable for use in the present process contain a similar number of carbon atoms, some of which are reactive, some of which are not, it is convenient to define the non-reactive constituents with reference to their boiling points relative to the boiling points of the reactive constituents.

Accordingly, the amount of diluent in said feedstream will typically be at least 10, preferably at least 15, and most preferably at least 20 wt. % thereof, and will typically range from about 10 to about 80, preferably from about 15 to about 70, and most preferably from about 20 to about 55 wt. % thereof. Moreover, typically at least 10, preferably at least 20, and most preferably at least 30 wt. %, typically from about 10 to 100, preferably from about 20 to about 95, and most preferably from about 30 to about 90 wt. % of the diluent constituents possess a boiling point under reaction conditions within about 5° C. to about 10° C. of the average boiling point of the reactive constituents at the same temperature.

The preferred copolymers can be prepared from Raffinate II feedstreams. Raffinate II is typically derived from either butane/butene catalytic cracking refinery streams (BB-streams); or Raffinate I which can be derived from butadiene crude produced by steam cracking plants. Raffinate I and BB streams are highly prized for their isobutylene content which is used for the production of polyisobutylene (PIB) and methyl-tert-butyl ether (MTBE).

Butadiene crudes and the resultant Raffinates can vary in composition. A typical crude butadiene refinery stream comprises, in weight percent, 40 to 45% butadiene, 20 to 30% isobutylene, 10 to 20% butene-1, 1 to 4% cis-butene-2, 3 to 10% trans-butene-2, 3 to 10% n-butane, and 1 to 5% isobutane. Also included can be minor amounts of propane, propene, pentanes, pentenes, and water in addition to trace quantities of other hydrocarbons.

Butadiene crude is valued for its butadiene. After solvent extraction of the butadiene, Raffinate I remains. The Raffinate I resulting from the recited typical butadiene stream includes, in weight percent, 0 to 0.5% butadiene, 40 to 50% isobutylene, 20 to 35% butene-1, 1 to 10% cis-butene-2, 5 to 15% trans-butene-2, 5 to 15% n-butane, and 3 to 10% isobutane. The isobutylene can be removed leaving behind Raffinate II.

A typical Raffinate II derived from a Raffinate I stream which in turn was derived from butadiene crude includes, in weight percent, about 0.0 to 0.8% butadiene, 0 to 5% isobutylene, 20 to 60% butene-1, 3 to 10% cis-butene-2, 15 to 25% trans-butene-2, 10 to 20% n-butane, and 5 to 10% of isobutane. The diluent therefore constitutes the butane and isobutane constituents.

An exemplary butane/butene stream (BB-stream) from refinery fluid catalytic cracking includes, in weight percent, 0 to 0.5% butadiene, 5 to 15% isobutylene, 10 to 20% butene-1, 5 to 15% cis-butene-2, 10 to 20% trans-butene-2, 5 to 15% n-butane, and 30 to 45% isobutane.

A typical Raffinate II derived from a BB-stream includes, in weight percent, about 0 to 0.8% butadiene, 0 to 5% isobutylene, 10 to 25% butene-1, 5 to 15% cis-butene-2, 10 to 20% trans-butene-2, 5 to 15% n-butane, and 5 to 15% isobutane.

The Raffinate II streams can include minor amounts of other hydrocarbons. For example, the Raffinate II derived from MTBE production can include traces of MTBE, methanol, dimethyl ether, and tert-butyl alcohol. Because of the explosive growth in demand for MTBE over the last eight years, the supply of Raffinate II exceeds demand by more than 2 to 1 worldwide. Raffinate II is, at present, of small economic value. It is primarily used as in the production of high purity butene-1 and secondary butanol/methyl ethyl ketone (SBA/MEK).

Typical Raffinate II feedstock useful in the process of this invention comprises a mixture of pressure liquefied $C_4$ hydrocarbons which comprise less than about 5 wt. % (preferably less than about 4.9 wt. %, e.g. from about 0.1 to 4.9 wt. %, and typically greater than 1 wt. %) isobutylene, and at least about 12 wt. % (preferably at least about 15 wt. %, e.g. from about 15 to about 85 wt. %) total normal-butenes (i.e., butene-1, cis- and trans-butene-2), together with 10 to 70% n-butane, isobutane and preferably less than about 0.8 wt. %, e.g. from about 0 to 0.8 wt. % butadiene. More typically, Raffinate II is about 20 to 55% of 1-butene and 5 to 35% of 2-butene.

Preferably, the $C_4$ feedstream is substantially free of $H_2$ and sulfur contaminants (e.g., mercaptans), e.g. <20 wppm $H_2$ and <5 wppm S. Such low levels of free $H_2$ minimize the degree of saturation in the poly-n-butene products. Low S levels are desired to avoid undesired side reactions with the monomer, polymer and catalyst components, and to avoid the need to resort to added expense and technical difficulties in removing the sulfur contaminants from the polymers thereby formed.

The $C_4$ feedstream is preferably substantially anhydrous, that is, it contains less than about 0.05 wt. % water, more preferably less than about 300 wppm water, based on the $C_4$ monomers in the feedstream. When Raffinate I is used in a process to make methyl tertiary butyl ether, the Raffinate II obtained has some methanol residue. The $C_4$ feedstream preferably contains less than about 100 ppm of methanol, more preferably less than about 500 ppm of methanol. The $C_4$ products other than butenes (e.g., saturated $C_4$ hydrocarbons), function as diluent or solvent in the reaction mixture and are a noncritical aspect of this invention. The process of the present invention enables a new class of polymers and copolymers to be made from Raffinate II feedstock rendering a substantially low value feedstream as a valuable new raw material.

The $C_4$ feedstream is maintained at a sufficient pressure to be in liquid form both at the reactor inlet and in the reaction mixture at the reaction temperature, which is generally from about −50° C. to +20° C. Reaction pressures are generally from about 250 to 1,000 kPa, and more typically from about 300 to 700 kPa. Conventional cooling means can be used in view of the exothermic nature of the reaction. Cooling coils within the reactor, cooling the external surfaces of the reactor, withdrawing a portion of the reaction mixture from the reaction zone to an external cooler and recycling it to the reaction zone, etc. can be used to maintain the reaction at these temperatures. Preferred reaction temperatures are about −20° C. to +10° C., and most preferred −15° C. to +10° C. Generally, higher temperatures tend to produce lower molecular weight polymer.

The polymer or copolymer of the present invention is polymerized in the presence of a catalyst. The catalyst used in the method of the present invention is a strong Lewis acid. The strong Lewis acid catalyst is a Lewis acid having a Hammett Scale Value acidity Ho of less than about −10, and preferably less than −15 when dissolved in a non-reactive aprotic solvent. Hammett acidity is defined in J. March, *Advanced Organic Chemistry* 3d. Ed., Acids and Bases, p. 223–225 which refers to Hammett and Deyrup, J. Am. Chem. Soc., vol. 54, p. 2721 (1932). Useful strong Lewis acids are disclosed in U.S. Pat. No. 4,229,611, hereby incorporated by reference.

Preferably, the strong Lewis acids comprise the formula $MX_n$ wherein M is selected from the Group IIIA, elements of the Periodic Table, X is a halogen, with at least one X representing bromine, n is the ratio of halogen atoms to atoms of M and varies from 1 to 8. The Periodic Table referred to is that described in "Encyclopedia of Chemistry", Reinhold Publishing Corporation, 2nd Ed. (1966) at page 790. The term "elements" as used herein refers to the metals and metalloids of the aforementioned Groups of the Periodic Table. The preferred Lewis acids are the bromides of aluminum and gallium. Typical examples of the most preferred Lewis acids include bromide salts such as $AlBr_3$, $AlBr_2Cl$, $AlBrCl_2$, $GaBr_3$, $GaBr_2Cl$ and $GaBrCl_2$. The most preferred strong Lewis acid for use in the present invention is aluminum bromide. The aluminum bromide can be added directly to a monomer stream. More preferably the aluminum bromide is dissolved in a suitable solvent.

Organo aluminum bromide catalyst is also useful in the process of this invention and comprises at least one compound of the formula:

$$(R^4)_x M(Br)_{(3-x)} \qquad (4)$$

wherein M is defined as above and is preferably Al, $R^4$ is $C_1$ to $C_{20}$ hydrocarbyl and x is an integer of from 1 to 2. $R^4$ can comprise branched or straight chain alkyl, cycloalkyl, aryl, alkaryl, aralkyl, alkynyl, alkenyl, and hydrocarbyl (e.g., $C_1$ to $C_{10}$) substituted derivatives thereof. When $R^4$ is alkyl, the alkyl group can contain from 1 to 20, preferably from 1 to 10, and most preferably from 1 to 4 carbon atoms. Illustrative of such alkyl groups are methyl, ethyl, isopropyl, propyl, n-butyl, isobutyl, tertbutyl, pentyl, hexyl, heptyl, octyl, nonyl, decyl, dodecyl, tridecyl, tetradecyl, octadecyl and the like. When $R^4$ is alkenyl, the alkenyl group can contain from 2 to 20, preferably from 2 to 10, and most preferably from 2 to 4 carbon atoms. Illustrative of such alkyl groups are ethenyl, isopropenyl, propenyl, n-butenyl, isobutenyl, tertbutenyl, pentenyl, hexenyl, heptenyl, octenyl, nonenyl, decenyl, dodecenyl, tridecenyl, tetradecenyl, octadecenyl and the like. When $R^4$ is alkynyl, the alkynyl group can contain from 2 to 20, preferably from 2 to 10, and most preferably from 2 to 4 carbon atoms. Illustrative of such alkynyl groups are ethynyl, isopropynyl, propynyl, n-butynyl, isobutynyl, tertbutynyl, pentynyl, hexynyl, heptynyl, octynyl, nonynyl, decynyl, dodecynyl, tridecynyl, tetradecynyl, octadecynyl and the like. When $R^4$ is aryl, the aryl group can contain from 6 to 10 carbon atoms. Illustrative of such aryl groups are phenyl, naphthyl and the like. When $R^4$ is alkaryl, the alkaryl group can contain from 7 to 20, preferably from 7 to 15, and most preferably from 7 to 10 carbon atoms. Illustrative of such alkaryl groups are tolyl, xylyl, di(ethyl)phenyl, di(hexyl)phenyl and the like. When $R^4$ is aralkyl, the aralkyl group can contain from 7 to 20, preferably from 7 to 15, and most preferably from 7 to 10 carbon atoms. Illustrative of such aralkyl groups are benzyl, ethylbenzyl, phenylhexyl, naphthylhexyl and the like. When $R^4$ is cycloalkyl, the cycloalkyl group can contain from 3 to 20, preferably from 3 to 10, and most preferably from 3 to 4 carbon atoms. Illustrative of such cycloalkyl groups are cylcopropyl, cyclobutyl, cyclopentyl, cyclohexyl, cycloheptyl, cyclooctyl, cyclononyl, cyclodecyl, cyclododecyl, cyclotridecyl, cyclotetradecyl, cyclooctadecyl and the like. Illustrative of hydrocarbyl-substituted derivatives of the foregoing groups are 2-ethylcyclohexyl, cyclopropylphenyl, phenylcyclohexyl and the like.

Illustrative of useful organo-aluminum bromides are: $(CH_3)AlBr_2$, $(CH_3)_2AlBr$, $C_2H_5AlBr_2$, $(C_2H_5)_2AlBr$, $(CH_3)_2CHAlBr_2$, $[(CH_3)_2CH]_2AlBr$, $(C_3H_7)AlBr_2$, $(C_3H_7)_2AlBr$, CH$_3$CH(CH$_3$)AlBr$_2$, [CH$_3$CH(CH$_3$)]$_2$AlBr, (CH$_3$)$_3$CAlBr$_2$, [(CH$_3$)$_3$C]$_2$AlBr, C$_6$H$_{13}$AlBr$_2$, C$_5$H$_{11}$AlBr$_2$, C$_{10}$H$_{21}$AlBr$_2$, and mixtures thereof. Especially preferred are C$_2$H$_5$AlBr$_2$, (C$_2$H$_5$)$_2$AlBr and mixtures thereof. Preferred organo-aluminum bromide catalysts are liquids under reaction conditions.

The high acidity of the catalyst can cause reactions with the solvent and/or the monomer present in the reacting mixture. The concentration of the monomer relative to the catalyst can be controlled during the polymerization to minimize competing reactions of isomerization, cracking, alkylation and dimerization. These competing reactions can result from the formation of chain transfer agents which can reduce the molecular weight of the polymer. The method must be carefully controlled since the Lewis acid catalyst can also react with the catalyst solvent as well as the monomer to form compounds which are deleterious to the polymerization process. The amount of monomer being reacted can be controlled to control polymer chain length. For higher molecular polymers, lower concentration of monomers in the reactor are maintained to drive the reaction to form longer polymer chains.

The strong Lewis acid is preferably dissolved in a non-reactive aprotic solvent. Preferred solvents for use in the present invention neither yield a proton to the solute, nor gain one from it (they are neither an acid nor base). The term "non-reactive" is meant to include compounds which do not undergo an elimination reaction, cracking, alkylation, dimerization or an isomerization or reduce the acidity of the Lewis acid by acting as a Lewis base. For example, isopropyl chloride reacts with AlBr$_3$, and, therefore, is not desirable as a "non-reactive" aprotic solvent to be considered for use in the practice of the present invention.

Generally, non-reactive solvents include hydrocarbons such as C$_3$ to C$_{24}$ alkanes, the halogenated C$_1$ to C$_3$ alkanes, halogenated cyclopropane or halogenated C$_2$ to C$_3$ alkenes (wherein the C$_2$ to C$_3$ compounds contain 2 or more halogen atoms per mole and the halogens are preferably chlorine, bromine or fluorine). Examples of non-reactive aprotic solvents include: methylene chloride, methylene bromide, 1,2-dichloroethane, 1,1-dibromocyclopropane, 1,1-dichlorocyclopropane, cis- or trans-1,2-dichlorocyclopropane, and cis- or trans-1,2-dibromocyclopropane. Useful solvents include saturated hydrocarbon solvents, preferably methane, propane, normal butane, pentane, hexane, cyclohexane and octane. The most preferred solvents include normal butane, n-hexane and cyclohexane.

When using a strong acid, particularly aluminum bromide in a solvent, it is preferred that the solution be prepared immediately prior to use to minimize the recited undesirable side reaction of the solvent in the presence of the strong Lewis acid. Accordingly, the solution should be prepared and fed to the reactor before there is a significant amount of reaction of the solvent in the presence of the catalyst. Preferably, the fresh catalyst solution is prepared within 2 hours of the reaction, more preferably within 1 hour, yet more preferably within 30 minutes, yet even more preferably within 15 minutes and most preferably immediately.

In accordance with a preferred method of the present invention a reaction promoter also referred to as cocatalyst or initiator, is used in addition to the catalyst. Useful reaction promoters include hydrogen halides including hydrogen chloride and hydrogen bromide with hydrogen bromide most preferred. Other useful promoters known include alkyl halides such as alkyl bromide and alkyl chloride. Useful cocatalysts include t-butyl bromide, 2 bromo butane, which can be used with AlBr$_3$ catalyst.

Most preferably, the promoter is hydrogen bromide which is added to the monomer prior to contact with the catalyst. It is believed that the hydrogen bromide interacts with at least some of the monomer to form alkyl bromides in situ. The catalyst alone or catalyst in solution is then combined with the monomers and cocatalyst.

The addition of HBr cocatalyst to the feedstream in the absence of aluminum bromide to form a pre-reacted feedstream offers the further advantage of substantially reducing the presence of brominated poly-n-butene in the finished product. The presence of free HBr in the reactor has the potential of corrosion of the reactor. The present invention successfully avoids this through use of the pre-reacted feedstream. The HBr injected into the feedstream reacts quickly with normal-butenes to produce 2-bromobutane which, upon entering the reactor, functions as a cocatalyst with the aluminum bromide to initiate the polymerization, the aluminum bromide reacting with the 2-bromobutane to form AlBr$_4$ anion and a butyl cation, thereby initiating polymerization.

The combination of monomer plus cocatalyst is contacted with the catalyst in a tank or tube-type reactor for a period of time sufficient to polymerize the monomer to desired amount of polymerization. In accordance with a preferred method of polymerization the concentration of monomer relative to catalyst is controlled to control the polymerization and minimize competing reactions of isomerization, cracking, alkylation and dimerization of the monomer and catalyst solvent.

Useful polymerization conditions include temperatures ranging from −30° C. to +20° C., pressures ranging from 50 to 150 psig, monomer to catalyst mole ratio of up to 250 and typically from 25 to 250; monomer to cocatalyst molar ratio of up to 500 and typically from 20 to 500; cocatalyst to catalyst mole ratio of from 0.25 to 3.00; reaction time of up to about 2 hours, and typically from 20 to 45 minutes.

A preferred process uses either a tubular reactor or a stirred reactor (preferably a continuous-type stirred reactor) having two separate inlet means for introduction of C$_4$ feedstream and the organo-aluminum chloride catalyst. The latter are added alone or in admixture with a diluent or solvent which is substantially inert under the premixing and polymerization conditions.

The feedstream inlet means (e.g., a conduit) is fitted with a device for injection (preferably for continuous injection) of HBr (preferably gaseous HBr) cocatalyst into the C$_4$ feedstream at a point prior to reactor entry. The HBr should be introduced into the C$_4$ feedstream sufficiently in advance of the reactor entry to permit substantially complete reaction of the HBr in the feedstream with 1-butene and 2-butene prior to the polymerization reaction zone. The HBr is believed to react with the 1-butene and 2-butene to form a 2-bromobutane in the resulting treated feedstream mixture. Other organo bromides can also be formed, principally t-butyl bromide from reaction with the isobutylene content of the monomer feedstream. The treated feedstream mixture, containing the C$_4$ monomers and the pre-reacted HBr is added to the reactor. The aluminum bromide catalyst is preferably introduced into the reaction mixture through a separate inlet.

The concentration of free HBr in the treated feedstream mixture at the point of reactor entry is preferably less than about 1.0 ppm (parts per million). The concentration of the HBr can be determined by conventional means, for example, by analyzing the feedstream for organic bromides and free HBr using a gas chromatograph equipped with a halogen sensitive detector. The rate of mixing (and, hence, reaction)

of the monomers and the HBr can be conveniently enhanced by use of an in-line static (kinetic) mixer in the feedstream conduit downstream of the HBr injection point. To further enhance the rate of mixing of the HBr and monomers, the mixture of the HBr and the $C_4$ feedstream is preferably maintained at a temperature of from at least about 5° C., e.g., from about 5° C. to 70° C.

The process of this invention can be practiced in a batchwise, semi-continuous or preferably in a continuous manner. Preferably, the treated feedstream mixture, containing the $C_4$ monomers and the pre-reacted HBr, and the aluminum bromide catalyst streams are added to the reaction zone substantially simultaneously, at a rate sufficient to maintain the selected ratio of the monomers and aluminum bromide catalyst in the liquid reaction mixture. However, it is also possible to add these streams in a stagewise manner to a liquid reaction mixture.

Polymerization occurs in an exothermic reaction in the reaction zone of the reactor upon contacting the two incoming streams. The reactor temperature is preferably maintained at about −50° C. to +20° C. For a continuous-type stirred reactor, average reactant residence time is generally about 20 to 60 minutes and preferably about 20 to 50 minutes. There is generally a mole ratio of up to 250 and preferably 25 to 250 of monomer to aluminum bromide catalyst, a mole ratio of up to 500 and preferably from 20 to 500 of monomer to HBr cocatalyst, and mole ratio of cocatalyst, i.e., HBr cocatalyst, to catalyst, i.e., aluminum bromide catalyst, of from about 0.1 to 3.0, preferably from about 1.0 to 2.0 parts.

In the process of the present invention, a high degree of reactor controllability is achieved. The target specification of molecular weight and molecular weight distribution which is desired can be met through monitoring and adjustment of incoming catalyst addition rate relative to monomer (i.e., normal butene) content, reactor temperature, residence time, feedstream introduction rate and the like. These parameters and the quality of the finished product can be monitored at short time intervals in the practice of the present invention.

Referring to FIG. 1, wherein one embodiment of the process of the present invention is illustrated, a liquid monomer feed 4 (i.e., Raffinate I) comprising 1-butene, 2-butene, isobutylene, and saturates (butanes), and generally containing at least about 6 wt. % (e.g., from about 10 to 50 wt. %) isobutylene, and a polymerization catalyst 6 are introduced into first polymerization reaction zone 10 wherein the isobutylene monomer is selectively polymerized to form a polyisobutylene (PIB) polymer mixture 18 containing PIB and unreacted monomers. The temperature in the first polymerization reaction 10 is typically from about −10° C. to +10° C. Mixture 18 is passed to catalyst removal zone 20 wherein the polymerization catalyst 22 is separated from the remaining components of the polymerization mixture. The resulting liquid PIB/monomer mixture 24 is passed to a polymer recovery zone 30 for separation of monomer stream 32 from liquid PIB stream 34. Typically, monomer stream 24 is removed from zone 30 as a gas. Stream 32 comprises a crude spent $C_4$ stream (i.e., Raffinate II) which can include 1-butene, 2-butene, unreacted isobutylene, and butanes.

The crude spent monomer stream 32 is passed to drying zone 40 wherein water is removed, to provide a $C_4$ monomer feedstream 42 containing less than about 200 wppm, preferably less than about 100 wppm, water (e.g., 5 to 100 wppm, more preferably from about 5 to 50 wppm water). The $C_4$ monomer feedstream 42 is then contacted with HBr 44 in a portion 46 of conduit 42 to form the treated feedstream mixture containing not greater than about 1 wppm free HBr which is then charged to polymerization reaction zone 50, along with a separately charged aluminum bromide catalyst stream 52, for polymerization as described above to form the poly-n-butene polymers of this invention. The resulting poly-n-butene polymerization reaction mixture 54 can be withdrawn from zone 50 and treated as described above for recovery of the polymer product, including the steps of catalyst removal and stripping to remove low molecular weight polymer fractions, as desired.

The catalysts and polymerization conditions, and the methods of catalyst separation and polymer recovery, employed in zones 10, 20 and 30, respectively, are conventional. Exemplary catalysts for polyisobutylene (PIB) polymerization are $AlCl_3$, $BF_3$, and organo-aluminum chlorides, can be employed together with cocatalysts or promoters such as alkanols (e.g., methanol, ethanol, propanol, isopropanol, butanol, tert-butanol and the like), and $C_1$ to $C_4$ alkyl halides, and preformed complexes of any of these catalysts and cocatalysts (e.g., $AlCl_3$-ethanol complexes, $BF_3$-ethanol complexes, and the like). Especially preferred catalysts are $AlCl_3$, $BF_3$ and organo-aluminum chlorides of Formula (4'):

$$(R)_xAlCl_{(3-x)} \qquad (4')$$

wherein R is $C_1$ to $C_4$ alkyl and x is 1 or 2.

The drying of the crude spent $C_4$ monomer stream in zone 40 can be accomplished by contacting the stream with a desiccant which is substantially nonreactive with any organic component of the stream, such as $CaCl_2$, molecular sieves (e.g., mol sieves 3A and 13X from Linde Division, Union Carbide), and the like. Drying zone 40 can comprise one or more vessels containing a solid desiccant through which stream 32 is passed, and usefully can comprise a series of separate vessels arranged in parallel to facilitate the charging to any vessel of fresh desiccant in the continuous practice of the process of this invention.

Because of the presence of olefin-2 monomer, e.g. butene-2, in conventional Raffinate feeds, the resulting polymer will be a copolymer. Homopolymers can be obtained by using pure α-olefin feeds. Accordingly, the term "poly-n-butenes" as used herein is intended to include homopolymers of butene-1 and copolymers of butene-1 and butene-2.

The polymers, particularly poly-n-butenes prepared in accordance with the process of this invention preferably contain an average of about 1 double bond per polymer chain. Up to about 20% of the polymer chains may be saturated.

The poly-n-butene of the present invention offers a number of advantages over poly-n-butenes prepared by prior art techniques with respect to properties which are important for use in making lubricating oil additives such as dispersants. There is a significant reduction in the quantity of so called "light ends" in the polymer product. These are poly-n-butenes in the undesirable number average molecular weight range of less than 300, typically from about 110 to 250. The process of this invention minimizes the quantity of these materials, and the yield of desired product in the high molecular weight range increases accordingly. Products of this invention generally contain less than about 5% by weight of such low molecular weight polybutenes in the reaction mixture prior to product finishing. After stripping, the finished polymer preferably contains less than about 2% by weight of poly-n-butenes having a number average molecular weight below 250. The exact amount of acceptable low molecular weight polybutenes can vary depending on product viscosity and the intended end-use of the polymer products.

Polymers of the present invention have a variety of uses. The polymers, particularly poly-n-butene, which are useful for dispersants have a number average molecular weight of from 1,300 to 20,000, preferably 1,300 to 10,000, more preferably 1,500 to 10,000, and most preferably 1,500 to 5,000. Polymers useful for lubricating oil viscosity index improvers preferably have a number average molecular weight of 20,000 to 100,000, preferably 20,000 to 100,000 and more preferably 20,000 to 65,000. Polymers useful in an adhesive application have a molecular weight of 20,000 to 200,000 or greater.

Functionalized Polymers

The polymers produced in accordance with the present invention can be functionalized. By functionalized, it is meant that the polymer is chemically modified to have at least one functional group present within its structure, which functional group is capable of: (1) undergoing further chemical reaction (e.g. derivatization) with other material and/or (b) imparting desirable properties, not otherwise possessed by the polymer alone, absent such chemical modification.

More specifically, the functional group can be incorporated into the backbone of the polymer, or as pendant groups from the polymer backbone.

The functional group typically will be polar and contain hetero atoms such as P, O, S, N, halogen and/or boron. It can be attached to the saturated hydrocarbon part of the polymer via substitution reactions or to an olefinic portion via addition or cycloaddition reactions. Alternatively, the functional group can be incorporated into the polymer during polymerization via a functional group containing comonomer or by oxidation or cleavage of a small portion of the end of the polymer (e.g. as in ozonolysis).

Functionalization of the polymer backbone with substituent functional groups typically relies on an ethylenic unsaturation, preferably a terminal ethylenic unsaturation, present in the polymer for reaction with a functional compound containing or constituting the functional group.

Thus, reaction of these functional compounds and the polymer can occur through a variety of mechanisms. Useful and preferred functional groups include halogen, carboxyl materials present as acids, esters, salts, anhydrides, alcohols, amines, ketones, aldehydes and the like.

Useful functionalization reactions include: maleation, which is the reaction of the polymer at the point of unsaturation with maleic acid or anhydride; halogenation of the polymer at the olefinic bond and subsequent reaction of the halogenated polymer with an ethylenically unsaturated functional compound; reaction of the polymer with an unsaturated functional compound by the "ene" reaction absent halogenation; reaction of the polymer with at least one phenol group; (this permits derivatization in a Mannich Base-type condensation); reaction of the polymer at its point of unsaturation with carbon monoxide using a Koch-type reaction wherein an acid group such as an iso acid or neo acid is formed; reaction of the polymer with the functional compound by free radical addition using a free radical catalyst; and reaction of the polymer by air oxidation methods, epoxidation, chloroamination or ozonolysis.

Suitable functional comonomers which can be incorporated into polymer backbone include vinyl monomers (e.g.,

with pendant functional groups, such as pendant (i.e., attached to a carbon bridging the double bond) carboxyl, ester, carbonyl, aryl, heteroaryl, i.e., at least one aromatic ring containing one or more heteroatoms such as oxygen, nitrogen or sulfur within the ring structures (e.g., pyridine).

Representative examples of suitable vinyl comonomer type compounds include vinylacetate, styrene, p-alkyl styrene, e.g., p-methyl styrene, vinyl carbonate, acrylic acid, and vinyl alcohol.

A preferred functional compound of this type is p-alkyl styrene and its method of use for subsequent derivatization reactions, e.g., through selective bromination of the alkyl group on the styrene, is described in U.S. Pat. No. 5,102,445, the disclosure of which is herein incorporated by reference.

It will be appreciated by those skilled in the art that some of the functional compounds described above may constitute poisons for cationic polymerization catalysts and hence their incorporation into the polymer backbone may have to be staged in more than one polymerization step, e.g., completed under subsequent non-cationic polymerization conditions.

Characterization of the degree to which the polymer has been functionalized is referred to herein as "functionality".

Functionality refers generally to the average number of functional groups present within the polymer structure per polymer chain. Thus, functionality can be expressed as the average number of moles of functional groups per "mole of polymer". When said "mole of polymer" in the functionality ratio includes both functionalized and unfunctionalized polymer, functionality is referred to herein as F. When said "mole of polymer" includes only functionalized polymer, functionality is referred to herein as $F^*$.

The distinction between F and $F^*$ arises, in non-copolymerization methods of functionalization, when all the polymer chains do not undergo reaction with the functional compound. In this instance typical analytical techniques employed to determine $F^*$ will normally necessitate identification of the weight fraction of functionalized polymer, based on the total weight of polymer (functionalized+ unfunctionalized) in the sample being analyzed for functionality. This weight fraction is commonly referred to as Active Ingredient or A.I. Since the determination of AI is a separate analytical step, it can be more convenient to express functionality as F rather than $F^*$. In any event, both F and $F^*$ are alternate ways of characterizing the functionality.

As a general proposition, the polymer of the present invention can be functionalized to any functionality effective to impart properties suitable for the end use contemplated.

Typically, where the end use of the polymer is for making dispersant, e.g. as derivatized polymer, the polymer will possess dispersant range molecular weights ($\overline{M}n$) and the functionality will typically be significantly lower than for polymer intended for making derivatized multifunctional V.I. improvers, where the polymer will possess viscosity modifier range molecular weights ($\overline{M}n$) as described above.

Moreover, the particular functionality selected, for polymer intended to be derivatized, will depend on the nature of the derivatization reactions and type and number of chemical linkages established by the derivatizing compound.

In most instances, one derivatizing linkage will be formed for each functional group, e.g., each carboxy functional group will form 1 ester linkage. However, certain functional groups can not only act individually to form a single derivatizing linkage, but also collectively such that two functional groups form a single derivatizing linkage.

For example, where two carboxy groups form an anhydride group and the derivatizing group is a primary amine it is possible to form inter-alia, two amide linkages or one imide linkage. Thus, while the anhydride group contains two carboxy functional groups, the chemical effect obtainable therefrom when both functional groups react, depends on the number of derivatizing linkages achieved.

Accordingly, for purposes of the present invention, when functionality is reported hereinafter in the context of describing functionalized polymer intended for derivatization, and the subject functional groups are capable of forming less than one derivatizing linkage per functional group, such functionality recitation is to be interpreted as representing the average number of derivatizing linkages to be produced per polymer chain.

Thus, where the derivatizing linkage is to be an imide, and the functional groups are anhydride carboxy groups, a functionality of "2" is intended to represent "2" derivatizing imide linkages and consequently, in effect, an average of two anhydride groups per polymer chain (rather than two carboxy functional groups) since each anhydride will form one derivatizing imide linkage. However, where the derivatizing linkage is to be an amide, and the functional groups are anhydride carboxy groups, a functionality of "2" represents "2" amide derivatizing linkages and consequently, in effect, a single anhydride group since one anhydride will form two amide derivatizing linkages.

Accordingly, while any effective functionality can be imparted to the functionalized polymer intended for subsequent derivatization, it is contemplated that such functionalities, expressed as F*, can be for dispersant end uses, typically not greater than about 3, preferably not greater than about 2, and typically can range from about 1 to about 3, preferably from about 1.5 to about 2.5, and most preferably from about 1.1 to about 2 (e.g. 1.2 to about 1.3).

Similarly, effective functionalities F* for viscosity modifier end uses of derivatized polymer are contemplated to be typically greater than about 3, preferably greater than about 5, and most preferably greater than about 10, and typically will range from about 4 to about 20, preferably from about 5 to about 15, and most preferably from about 8 to about 15.

F and F* values can be interconnected using the A.I. which for polymers of the present invention typically are at least about 0.50, preferably from 0.65 to 0.99, more preferably from 0.75 to 0.99, yet more preferably 0.85 to 0.99. However, the upper limit of A.I. is typically from 0.90 to 0.99, and more typically 0.90 to 0.95. Where A.I. is 1.0 F=F*.

End uses involving high molecular weight polymers contemplate functionalities which can range typically greater than about 20, preferably greater than about 30, and most preferably greater than about 40, and typically can range from about 20 to about 60, preferably from about 25 to about 55 and most preferably from about 30 to about 50.

Acyl Functionalized Polymer

The most preferred functionalities for technique of the present invention is to chemically modify the polymer to have chemical moieties present within its structure which contain or constitute at least one acyl functional group, i.e.

wherein X is hydrogen, nitrogen, hydroxy, oxyhydrocarbyl (e.g. ester), oxygen, the salt moiety —OM wherein M is a metal, e.g. alkali, alkaline earth, transition metal, copper zinc and the like, oxyhetero, e.g. —O—Z wherein Z represents a hetero atom such as phosphorus boron, sulfur, which hetero atom may be substituted with hydrocarbyl or oxyhydrocarbyl groups, or two acyl groups may be joined through (X).

Within this broad class of compounds the most preferred are acyl groups derived from monounsaturated mono- or dicarboxylic acids and their derivatives, e.g. esters and salts.

More specifically, polymer functionalized with mono- or dicarboxylic acid material, i.e., acid, anhydride, salt or acid ester suitable for use in this invention, includes the reaction product of the polymer with a monounsaturated carboxylic reactant comprising at least one member selected from the group consisting of (i) monounsaturated $C_4$ to $C_{10}$ dicarboxylic acid (preferably wherein (a) the carboxyl groups are vicinyl, (i.e. located on adjacent carbon atoms) and (b) at least one, preferably both, of said adjacent carbon atoms are part of said monounsaturation); (ii) derivatives of (i) such as anhydrides or $C_1$ to $C_5$ alcohol derived mono- or diesters of (i); (iii) monounsaturated $C_3$ to $C_{10}$ monocarboxylic acid wherein the carbon-carbon double bond is conjugated to the carboxyl group, i.e., of the structure

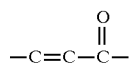

and (iv) derivatives of (iii) such as $C_1$ to $C_5$ alcohol derived monoesters of (iii). Upon reaction with the polymer, the double bond of the monounsaturated carboxylic reactant becomes saturated. Thus, for example, maleic anhydride reacted with the polymer becomes succinic anhydride, and acrylic acid becomes a propionic acid. Reference is made to EP Publication No. 0,441,548-A1, hereby incorporated by reference.

Suitable unsaturated acid materials thereof which are useful functional compounds, include acrylic acid, crotonic acid, methacrylic acid, maleic acid, maleic anhydride, fumaric acid, itaconic acid, itaconic anhydride, citraconic acid, citraconic anhydride, mesaconic acid, glutaconic acid, chloromaleic acid, aconitic acid, crotonic acid, methylcrotonic acid, sorbic acid, 3-hexenoic acid, 10-decenoic acid, 2-pentene-1,3,5-tricarboxylic acid, cinnamic acid, and lower alkyl (e.g. $C_1$ to $C_4$ alkyl) acid esters of the foregoing, e.g. methyl maleate, ethyl fumarate, methyl fumarate, etc. Particularly preferred are the unsaturated dicarboxylic acids and their derivatives, especially maleic acid, fumaric acid and maleic anhydride.

Typically, from about 0.7 to about 4.0 (e.g., 0.8 to 2.6), preferably from about 1.0 to about 2.0, and most preferably from about 1.1 to about 1.7 moles of said monounsaturated carboxylic reactant are charged to the reactor per mole of polymer charged.

Normally, not all of the polymer reacts with the monounsaturated carboxylic reactant and the reaction mixture will contain unfunctionalized polymer. The mono- or dicarboxylic acid functionalized polymer, non-functionalized polymer, and any other polymeric by-products, e.g. chlorinated polyolefin, (also included within "unfunctionalized" polymer) are collectively referred to herein as "product residue" or "product mixture". The unfunctionalized polymer is typically not removed from the reaction mixture (because such removal is difficult and would be commercially infeasible) and the product mixture, stripped of any monounsaturated carboxylic reactant can be used in further derivatization reactions with, for example, amine, alcohol, metal salt and the like as described hereinafter to make dispersant.

The functionality (F) of the polymer can be based upon (i) a determination of the saponification number (SAP) of the reaction mixture using potassium hydroxide and (ii) the number average molecular weight of the polymer charged (Mn).

For example, for the case where maleic anhydride is the monounsaturated carboxylic reactant, the saponification number (SAP) is the number of mg pure potassium hydroxide which are consumed in the total saponification of 1 g of material investigated and in the neutralization of any free acid.

In the hydrolysis and subsequent neutralization of succinic anhydride groups (SA) two moles of KOH (molecular weight 56.1; two moles=112,200 mg) are consumed per mole anhydride groups.

The molecular weight of the polymer (p) is $$Mn(p)+(98*x)$$

wherein Mn is the number average molecular weight of the unfunctionalized starting polymer charged to the functionalization reaction mixture, 98 is the molecular weight of maleic anhydride and x is the degree of succination:

$$x = \frac{\text{moles } SA \text{ groups}}{\text{mole}(p)}$$

Depending on the degree of succination, the consumption of mg KOH per mole of functionalized polymer is 2×mole KOH or $$112200 \, x$$

Thus, the saponification number of functionalized polymer is $$SAP = \frac{112200(x)}{Mn(p) + 98(x)}$$

Therefrom one obtains:

$$x = \frac{SAP * Mn(p)}{112200 - (SAP * 98)}$$

However, since there are two functional groups (i.e., carboxyl groups) per succinic group and absent derivatizing linkage considerations, the functionality (F) is determined from the equation:

$$F = \frac{(y)(SAP) * Mn(p)}{112200 - (SAP * 98)} \quad (I)$$

wherein y is the number 2.

It will be observed that the Mn in the formula defining (F) is the number average molecular weight of the polymer changed to the functionalization reaction mixture. The use of the starting polymer as a basis for determining the Mn in the formula (I) is based on the assumptions (1) that the Mn of the starting polymer does not undergo a significant change (e.g., not greater than about ±5% change during functionalization and (2) that functionalization does not occur preferentially within one or more molecular weight regions in the polymer molecular weight distribution to any significant degree (e.g., the MWD of the starting polymer is with ±5% of the MWD of only the functionalized polymer). Therefore, under these assumptions the Mn of the starting and functionalized polymer are assumed to be sufficiently similar to employ, as a matter of convenience, the Mn of the starting polymer in Formula I.

To the extent that the above assumptions are incorrect, the functionality determined by Formula I will be incorrect and it will be necessary to determine the Mn of functionalized polymer and either derive a statistically valid correction factor for the starting polymer Mn which reflects the deviations from the above assumptions or employ the functionalized polymer Mn directly in Formula I.

Moreover, as would be obvious to one skilled in the art, when the polymer is functionalized with a monocarboxylic acid group, y in Formula I will be 1.

Alternatively, functionality (F*) for polymer functionalized with maleic anhydride (and absent derivatizing end use considerations) is determined by the following equation:

$$F* = \frac{\frac{SAP}{AI} * Mn(p)(y)}{112,200 - \frac{SAP}{AI} * 98}$$

wherein AI, SAP and Mn(p) and (y) are as described above.

The polymer of the present invention can be functionalized with the monounsaturated carboxylic reactant by a variety of methods. Such methods include halogen assisted "ene" reaction and free radical grafting.

Halogen Assisted Polymer Functionalization

For halogen assisted polymer functionalization, the polymer can be first halogenated, (e.g. chlorinated or brominated) to about 1 to 8 wt. %, preferably 3 to 7 wt. % chlorine, or bromine, based on the weight of polymer, by passing the chlorine or bromine through the polymer at a temperature of 60° C. to 250° C., preferably 110° C. to 160° C., e.g. 120° C. to 140° C., for about 0.5 to 10, preferably 1 to 7 hours. The halogenated polymer may then be reacted with sufficient monounsaturated carboxylic reactant at 100° C. to 250° C., usually about 180° C. to 235° C., for about 0.5 to 10, e.g. 3 to 8 hours, so the product obtained will contain the desired number of moles of the monounsaturated carboxylic reactant per mole of the halogenated polymer. Processes of this general type are taught in U.S. Pat. Nos. 3,087,436; 3,172,892; 3,272,746 and others. Alternatively, the polymer and the monounsaturated carboxylic reactant are mixed and heated while adding chlorine to the hot material. Processes of this type are disclosed in U.S. Pat. Nos. 3,215,707; 3,231,587; 3,912,764; 4,110,349; 4,234,435 and in U.K. 1,440,219.

The polymers of this invention, which are charged to the alkylation reaction zone (zone where the unsaturated acid reacts with polymer), can be charged alone or together with (e.g., in admixture with) polyalkenes, derived from alkenes having from 1 to 20 carbon atoms (pentene, octene, decene, dodecene, tetradodecene and the like) and homopolymers of $C_3$ to $C_{10}$, e.g. $C_2$ to $C_5$ monoolefins, and other copolymers of $C_2$ to $C_{10}$, e.g. $C_2$ to $C_5$ monoolefins, said additional polymer having a number average molecular weight of at least about 900, and preferably a molecular weight distribution of less than about 4.0, preferably less than about 3.0 (e.g., from 1.2 to 2.8). Preferred such additional olefin polymers comprise a major molar amount of $C_2$ to $C_{10}$, e.g. $C_2$ to $C_5$ monoolefin. Such olefins include ethylene, propylene, butylene, isobutylene, pentene, octene-1, styrene, etc. Exemplary of the additionally charged homopolymers are polypropylene and polyisobutylene olefins and the like as well as interpolymers of two or more of such olefins such as copolymers of: ethylene and propylene (prepared by conventional methods, ethylene-propylene copolymers which are substantially saturated, wherein less than about 10 wt. % of the polymer chains contain ethylenic unsaturation). The additional such olefin polymers charged to the alkylation reaction will usually have number average molecular weights of at least about 900 and in embodiments for use as dispersants, more generally within the range of about 1,300 to about 5,000, more usually between about 1,500 to about 4,000. Particularly useful such additional olefin polymers have number average molecular weights within the range of about 1,500 and about 3,000 with approximately one double bond per chain. A useful additional polymer can be polyisobutylene. Preferred are mixtures of such polyisobutylene with ethylene-propylene copolymers wherein at least 30 wt.

% of the copolymer chains contain terminal vinylidene monounsaturation.

The polymer can be heated, preferably with inert gas (e.g., nitrogen) stripping, at elevated temperature under a reduced pressure to volatilize the low molecular weight polymer components which can then be removed from the heat treatment vessel. The precise temperature, pressure and time for such heat treatment can vary widely depending on such factors as the polymer number average molecular weight, the amount of the low molecular weight fraction to be removed, the particular monomers employed and other factors. Generally, a temperature of from about 60° C. to 100° C. and a pressure of from about 0.1 to 0.9 atmospheres and a time of from about 0.5 to 20 hours (e.g., 2 to 8 hours) will be sufficient.

The polymer and monounsaturated carboxylic reactant and halogen (e.g., chlorine gas), where employed, are contacted for a time and under conditions effective to form the desired functionalized polymer. Generally, the polymer and monounsaturated carboxylic reactant will be contacted in an unsaturated carboxylic reactant to polymer mole ratio usually from about 0.7:1 to 4:1, and preferably from about 1:1 to 2:1, at an elevated temperature, generally from about 120° C. to 260° C., preferably from about 160° C. to 240° C. The mole ratio of halogen to monounsaturated carboxylic reactant charged will also vary and will generally range from about 0.5:1 to 4:1, and more typically from about 0.7:1 to 2:1 (e.g., from about 0.9 to 1.4:1). The reaction will be generally carried out, with stirring for a time of from about 1 to 20 hours, preferably from about 2 to 6 hours.

By the use of halogen, about 65 to 95 wt. % of the polymer will normally react with the monounsaturated carboxylic acid reactant. Upon carrying out a thermal reaction without the use of halogen or a catalyst, only about 50 to 75 wt. % of the polymer will react. Chlorination helps increase the reactivity.

The reaction is preferably conducted in the substantial absence of $O_2$ and water (to avoid competing side reactions), and to this end can be conducted in an atmosphere of dry $N_2$ gas or other gas inert under the reaction conditions. The reactants can be charged separately or together as a mixture to the reaction zone, and the reaction can be carried out continuously, semi-continuously or batchwise. Although not generally necessary, the reaction can be carried out in the presence of a liquid diluent or solvent, e.g., a hydrocarbon diluent such as mineral lubricating oil, toluene, xylene, dichlorobenzene and the like. The functionalized polymer thus formed can be recovered from the liquid reaction mixture, e.g., after stripping the reaction mixture, if desired, with an inert gas such as $N_2$ to remove unreacted unsaturated carboxylic reactant.

If desired, a catalyst or promoter for reaction of the olefinic polymer and monounsaturated carboxylic reactant (whether the olefin polymer and monounsaturated carboxylic reactant are contacted in the presence or absence of halogen (e.g., chlorine)) can be employed in the reaction zone. Such catalyst of promoters include alkoxides of Ti, Zr, V and Al, and nickel salts (e.g., Ni acetoacetonate and Ni iodide) which catalysts or promoters will be generally employed in an amount of from about 1 to 5,000 ppm by weight, based on the mass of the reaction medium.

"ENE" Acid Functionalized Polymer

The polymer and the aforedescribed monounsaturated carboxylic reactant can be contacted at elevated temperature to cause a thermal "ene" reaction to take place. Thermal "ene" reactions have been heretofore described in U.S. Pat. Nos. 3,361,673 and 3,401,118, the disclosures of which are hereby incorporated by reference in their entirety.

Functionalized polymer can be prepared using a thermal "ene" type reactor or by chlorination as disclosed in EPA 91300843.9, hereby incorporated by reference.

Free Radical Grafted Acid Functionalized

An ethylenically unsaturated carboxylic acid or derivative thereof may be grafted onto saturated or unsaturated polymer backbone in solution or in solid form using a radical initiator. The free radical-induced grafting of ethylenically unsaturated carboxylic acid materials is preferably done using a mechanical or thermal shearing technique. It is carried out at an elevated temperature in the range of about 100° C. to 250° C., preferably 120° C. to 190° C. and more preferably at 150° C. to 180° C. Suitable unsaturated acids include those described above.

The free radical initiators which may be used are peroxides, hydroperoxides, and azo compounds and preferably those which have a boiling point greater than about 100° C. and decompose thermally within the grafting temperature range to provide free radicals. Representative of these free radical initiators are azobutyronitrile and 2,5-dimethyl-hex-3-yne-2,5 bis-tertiary-butyl peroxide. The initiator is used in an amount of between about 0.005% and about 1% by weight based on the weight of the reaction mixture. The grafting is preferably carried out in an inert atmosphere, such as under nitrogen blanketing. The resulting functionalized polymer is characterized by having carboxylic acid moieties or derivatives randomly distributed within its structure.

In the solid or melt process for forming a graft polymer, the unsaturated carboxylic acid with the optional use of a radical initiator can be grafted on molten rubber using rubber masticating or shearing equipment. The temperature of the molten material in this process may range from about 150° C. to 400° C. Free radical grafting is particularly suited for functionalizing intermediate molecular weight polymers pursuant to preparing multifunctional viscosity index improvers.

While this functionalization technique can also be employed to functionalize polymer intended to make dispersants, the functionality typically will be limited, and/or derivatization and/or post-treatment controlled to avoid gellation of the dispersant as described in commonly assigned U.S. Ser. No. 992,516 filed Dec. 17, 1992 (Docket No. PT-964) titled Gel Free Ethylene Interpolymer Derived Dispersant Additive Useful in Oleaginous Compositions, and U.S. Ser. No. 991,837, filed Dec. 17, 1992 titled Gel-Free α-Olefin Derived Dispersant Additive Useful in Oleaginous Compositions (Docket No. PT-967) the disclosure of which are herein incorporated by reference.

Hydroxy Aromatic Compounds

A further suitable functionalization technique involves the reaction of hydroxy aromatic functional compounds with the polymer.

Hydroxy aromatic compounds useful in the preparation of the functionalized polymer of this invention include those compounds having the formula:

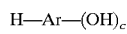

wherein Ar represents

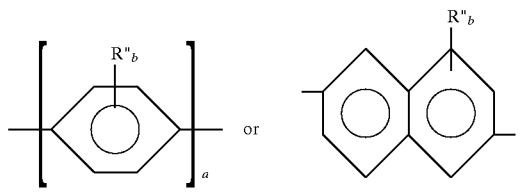

wherein a is 1 or 2, R" is a halogen radical such as the bromide or chloride radical, b is an integer from 0 to 2, and c is an integer from 1 to 2. Illustrative of such Ar groups are phenylene, biphenylene, naphthylene and the like.

The polymer, i.e. poly-n-butene, having at least one olefinic unsaturation and hydroxy aromatic compound are contacted in the presence of a catalytically effective amount of at least one acidic alkylation catalyst under conditions effective to alkylate the aromatic group of the hydroxy aromatic compound. The alkylation catalyst is conventional and can, with the polymer, comprise inorganic acids such as $H_3PO_4$, $H_2SO_4$, HF, $BF_3$, HF—$BF_3$ and the like. The acid catalyst can also comprise an acidic ion exchange resin having acidic groups adsorbed or absorbed thereon, such as Amberlyst 15 resin (Rohm & Haas Co.), and the like. Also useful as catalysts are preformed complexes (or complexes formed in situ) of the foregoing with $C_2$ to $C_{10}$ ethers, $C_1$ to $C_{10}$ alcohols, $C_2$ to $C_{10}$ ketones, phenols and the like, such as $BF_3$ complexed with dimethyl ether, diethyl ether, phenol, and the like.

The hydroxy aromatic compound and polymer will be generally contacted in a ratio of from about 0.1 to 10, preferably from about 1 to 7, more preferably from about 2 to 5 moles of the aromatic compound per mole of the polymer. The selected acid catalyst can be employed in widely varying concentrations. Generally, when the acid catalyst comprises an inorganic catalyst, the acid catalyst will be charged to provide at least about 0.001, preferably from about 0.01 to 0.5, more preferably from about 0.1 to 0.3 moles of catalyst per mole of hydroxy aromatic compound charged to the alkylation reaction zone. Use of greater than 1 mole of the inorganic catalyst per mole of hydroxy aromatic compound is not generally required. When the acid catalyst comprises a supported catalyst, such as an acidic ion exchange resin, the reactants can be contacted with the ion exchange resin employing any conventional solid-liquid contacting techniques, such as by passing the reactants through the resin (e.g., in a catalyst bed or through a membrane impregnated or otherwise containing the resin catalyst) and the upper limit on the moles of catalyst employed per mole of hydroxy aromatic compound is not critical.

The temperature for alkylation can also vary widely, and will usually range from about 20° C. to 250° C., preferably from about 30° C. to 150° C., more preferably from about 50° C. to 80° C.

The alkylation reaction time can vary and will generally be from about 1 to 5 hours, although longer or shorter times can also be employed. The alkylation process can be practiced in a batchwise, continuous or semicontinuous manner. Preferably, the acid catalyst is neutralized and/or removed prior to contacting the alkylation product mixture with a nucleophilic reagent (e.g., polyamine) and aldehyde reactant. The neutralization can be accomplished by contacting the crude alkylation product with gaseous ammonia or other basically reacting compound (e.g., aqueous NaOH, KOH, and the like), followed by filtration to remove any precipitated neutralized catalyst solids. Alkylation processes of the above types are known and are described, for example, in U.S. Pat. Nos. 3,539,633 and 3,649,229, the disclosures of which are hereby incorporated by reference.

Oxidation

Oxidation of the polymer represents another suitable technique applicable to the polymers of the present invention. This technique can be further categorized as including air oxidation (e.g. oxidation with oxygen or oxygen-containing gas), ozonolysis, and hydroperoxidation.

As a result of oxidation, the butene units at the terminal and intermediate of the polymer chain are randomly oxidized and thus have at least one oxygen containing functional group.

Examples of the oxygen containing functional group include carboxyl, oxycarboxyl (esterbond), formyl, carbonyl and hydroxyl groups. The functionality (F*) of the oxidized polymer will be as described generally hereinabove.

More specifically, the polymer of the present invention having unsaturation, typically terminal unsaturation, can be functionalized by an air oxidation process such as those recited in U.S. Pat. Nos. 4,925,579 and 4,943,658, both hereby incorporated by reference.

A useful process comprises contacting polymer, preferably in the liquid state, with molecular oxygen, ozone or a mixture thereof at a temperature of from 100° C. to 250° C., typically from 120° C. to 190° C. to oxidize the polymer until an oxygen content in the range of from 0.1 to 20% by weight is reached or until an acid value having a range of from 0.1 to 50 or saponification value in the range of 0.1 to 100 are reached. Pressures are typically up to 600 bar, and preferably 50 to 300 bar. The polymer oxidized at this extent is effective in formulating dispersants and viscosity modifiers.

The oxidatively modified polymer of the present invention can be prepared by oxidizing the above recited polymers with a gas containing molecular oxygen and/or ozone, optionally in an inert hydrocarbon medium. The molecular oxygen-containing gas used for oxidation includes oxygen gas, air and gaseous mixtures of molecular oxygen diluted with an inert gas such as nitrogen, argon and carbon dioxide to a proper concentration. The ozone-containing gases include oxygen, gaseous mixtures of ozone and oxygen or air, and gaseous mixtures of ozone or ozone plus oxygen or air diluted with an inert gas such as nitrogen, argon and carbon dioxide to a proper concentration. The gas containing molecular oxygen and ozone may be any mixtures of the foregoing.

The inert hydrocarbon medium which may be used in oxidative reaction include, for example, pentane, hexane, heptane, octane, decane, dodecane, kerosine, gas oil, benzene, toluene, xylene and the like.

Oxidation of the polymer is generally carried out in the absence of a catalyst, but may be carried out in the presence of a radical initiator or an oxidative catalyst. Examples of the radical initiator include organic peroxides such as benzoyl peroxide, di-tert-butyl peroxide, tert-butyl hydroperoxide, dicumyl peroxide, and 2,5-dimethyl-2,5-di(peroxybenzoate)-hexyne-3. Examples of the oxidative catalyst include inorganic compounds such as cobalt acetate, manganese chloride, copper, nickel oxide, manganese dioxide, and cobalt naphthenate.

Oxidation of the polymer is effected at a temperature in the range of from 100° C. to 250° C., preferably from 120° C. to 230° C., more preferably from 130° C. to 200° C. The time taken for the oxidation reaction ranges from 10 minutes to 20 hours, preferably from 30 minutes to 10 hours. The oxidation may be carried out either in atmospheric pressure or in applied pressure. The reaction mixture obtained at the end of oxidative reaction may be worked up by a conventional technique.

U.S. Pat. No. 4,076,738; EP Publication No. 0389722 and WO90/09371 relate to ozonolysis. A useful method of ozonolysis is to introduce a stream comprising one to 10% by weight of ozone in a carrier gas. The ozone concentration in the gas is not critical and any practical concentration can be used. The carrier gas can be nitrogen, air or oxygen and is preferably air or oxygen. Useful ozonation temperatures are from about −80° C. to 60° C. and preferably −10° C. to 30° C.

The polymer of the present invention, can also be functionalized by hydroperoxidation in accordance with the method of U.S. Pat. No. 4,925,579. Hydroperoxidation can be carried out in solvents relatively inert to the reaction conditions. Solvents such as toluene, xylene, or mineral neutral oils can be used. Preferred solvents are benzene, chlorobenzene, t-butyl-benzene and the like. Free radical initiators are used which can be peroxides, hydroperoxides and azo compounds, which may be used alone or as mixtures thereof, include, for example, cumene hydroperoxide, dicumyl peroxide, benzoyl peroxide, azo-bis (isobutyronitrile), tertiary butyl hydroperoxide, and the like. Preferably, the free radical initiator is cumene hydroperoxide, dicumyl peroxide, and mixtures thereof. These free radical initiators have been conventionally employed in effecting hydroperoxidation of polymers and copolymers.

The more vigorous the oxidation conditions and the longer the length of time maintaining such conditions, the greater the number of carboxyl groups introduced into the starting material. It is sufficient, however, that on an average at least one carboxyl is introduced into each molecule of the starting material.

The product produced by the hydroperoxidation reaction is an oil-soluble product of lower molecular weight than the starting material. The molecular weight depends upon the extent and conditions employed during the oxidation reaction. Ultimately, the intermediate hydroperoxidized polymers are converted by further oxidation reactions to fragmented or degraded polymer materials having a viscosity average molecular weight of from about one-half to about one-tenth of the molecular weight of the original material. The functionality (F*) of the carboxylated polymers is in the range of from 1 to 15 as generally described above depending on the end use.

Hydroformylation

The polymer of the present invention can be functionalized by hydroformylation by methods of the type disclosed in U.S. Pat. Nos. 4,832,702; 4,859,210 and GB Patent No. 1,049,291, all hereby incorporated by reference.

The process of hydroformylation can be carried out using a conventional rhodium or cobalt catalyst at from 80° C. to 200° C., preferably 120° C. to 190° C. and under a $CO/H_2$ pressure of up to 600, preferably 50 to 300 bar. The reaction can be conducted in two stages. The first stage is conducted at a low temperature, e.g., 100° C. to 150° C., and the second stage at a high temperature, e.g., 160° C. to 200° C. The oxygen-containing polymer resulting from the hydroformylation process are formed by addition of carbon monoxide and hydrogen to a double bond. Reactive double bonds are predominantly converted to aldehydes and ketones. Isomerization can cause a mixture of aldehydes to be obtained.

Epoxidation

The polymers of the present invention can be functionalized by epoxidation as disclosed in U.S. Pat. No. 4,981,605, Japanese Application JP HO1-132,605, PCT WO90/10022 and EP 461,744, all hereby incorporated by reference.

In accordance with the method disclosed in Japanese Application S62-289292 as applied to poly-n-butene, hydrogen peroxide or organic peroxides are allowed to react with the polymer. In particular, the polymer is mixed with an acid, preferably an organic acid, such as formic or acetic acid plus hydrogen peroxide. It is preferred that a buffer in the form of sodium hydrogen phosphate, sodium carbonate or sodium bicarbonate be present. The amount of organic acid per mole of hydrogen peroxide is typically from 2 to 50 moles and preferably 5 to 25 moles. The reaction temperature is typically from 0° C. to 60° C. and preferably 10° C. to 50° C., the reaction time of typically from 0.5 to 20 hours, preferably 1 to 10 hours. The amount of hydrogen peroxide added typically will be 1 to 10, preferably 2 to 5 moles per mole of unsaturated bond of polymer, and the amount of added organic acid typically will be 10 to 100, and preferably 20 to 50 moles. The amount of buffer per mole of organic acid typically will be 0.05 to 0.5, preferably 0.1 to 0.3 moles. The reaction temperature typically will be 0° C. to 100° C., preferably 20° C. to 80° C., and the time required typically will be 1 to 30 and preferably to 20 hours. The polymer concentration typically will be 5 to 400, preferably 10 to 300 g per liter.

Where an organic peroxide is used it typically will be from 1 to 10, preferably 1 to 5 moles per mole of unsaturated bond of the polymer. The compound of preference is organic per carbonate. The reaction temperature typically will be 0° C. to 100° C., preferably 10° C. to 80° C. and the reaction time typically will be 0.1 to 10, preferably 0.5 to 5 hours. The polymer concentration should be 5 to 400 g per liter and preferably 10 to 300 g per liter.

The solvent used in the preparation of liquid epoxidated poly-n-butene can be an aromatic hydrocarbon such as benzene, toluene or xylene or an ether such as ethyl ether, tetrahydrofuran or dioxane. This method is also disclosed in U.S. Pat. No. 4,981,605.

The functionalized polymer produced by epoxidation contains epoxy groups formed at the carbon-carbon unsaturation bond. Preferably the polymer is terminally unsaturated.

Koch Functionalized Polymer

Yet another method to functionalize the polymer of the present invention is by a Koch-type reaction as disclosed in commonly assigned copending U.S. Ser. No. 992,403, filed Dec. 17, 1992 (Docket No. PT-941), and entitled Functionalization of Polymers Based on Koch Chemistry and Derivatives Thereof, herein incorporated by reference.

The polymer of the present invention having unsaturation, preferably terminal unsaturation, can be reacted via the Koch mechanism to be functionalized with an acid or an ester. The polymer is contacted with carbon monoxide for a suitable carbon monoxide source such as carbon monoxide gas or formic acid, in the presence of an acidic catalyst. The catalyst preferably has a Hammett Scale Value acidity (Ho) of less than −7 in order to be sufficiently active, particularly to form neo structures. Preferably the Hammett acidity of the catalyst is in the range of from −8 to −11.5. Useful catalysts include $H_2SO_4$, $BF_3$, and HF. The catalyst causes a carbenium ion to form at the point of unsaturation. The carbon monoxide reacts with the carbenium ion forming an acylium ion. Water or a hydroxy-containing compound or a thiol containing compound can be added to react with the acylium cation to form a carboxylic acid or a carboxylic ester/or a thiol ester. Preferably, the hydroxy-containing compound or water is added in combination with the catalyst as a catalyst complex. Preferred catalyst complexes include ($BF_3.H_2O$) and ($BF_3$. substituted phenols) with a most preferred catalyst complex being $BF_3$.2,4 dichlorophenyl.

In accordance with the Koch process carboxyl groups, including carboxylic acid or carboxylic esters, can be formed at moderate temperatures and pressures at the point of unsaturation of the polymer of the present invention. The polymer is heated to a desired temperature range which is typically between −20° C. to 200° C. and preferably from 0° C. to 80° C. The pressure in the reactor can be maintained based on the carbon monoxide source, with pressures ranging up to 5,000 psig with a preferred range of from 500 to 3,000 psig.

Other functionalized polymers include those suitable for use as intermediates in making ash-producing detergents as described hereinbelow including sulfurized alkylphenols, alkyl sulfonic acids, alkyl salicylates, alkyl naphthenates wherein the alkyl group is derived from the polymer of the present invention.

The functionalized polymers of the present invention may be used as an additive agent for oleaginous compositions such as fuels and lubricating oils as discussed hereinafter.

Derivatized Polymers

As indicated above, a functionalized polymer is one which is chemically modified primarily to enhance its ability to participate in a wider variety of chemical reactions than would otherwise be possible with the unfunctionalized polymer.

In contrast, a derivatized polymer is one which has been chemically modified to perform one or more functions in a significantly improved way relative to the unfunctionalized polymer and/or the functionalized polymer. Representative of such functions, are dispersancy and/or viscosity modification in lubricating oil compositions.

Typically, derivatization is achieved by chemical modification of the functionalized polymer.

More specifically, the functionalized polymer can be derivatized by reaction with at least one derivatizing compound to form derivatized polymers. The derivatizing compound typically contains at least one reactive derivatizing group. The reactive derivatizing group is typically selected to render it capable of reacting with the functional groups of the functionalized polymers by the various reactions described below. Representative of such reactions are nucleophilic substitution, Mannich Base condensation, transesterification, salt formations, and the like. The derivatizing compound preferably also contains at least one additional group suitable for imparting the desired properties to the derivatized polymer, e.g., polar groups. Thus, such derivatizing compounds typically will contain one or more groups including amine, hydroxy, ester, amide, imide, thio, thioamido, oxazoline or salt groups derived from reactive metal or reactive metal compounds.

Thus, the derivatized polymers can include the reaction product of the above recited functionalized polymer with a nucleophilic reactant which include amines, alcohols, amino-alcohols and mixtures thereof to form oil soluble salts, amides, imides, oxazoline, reactive metal compounds and esters of mono- and dicarboxylic acids, esters or anhydrides.

Suitable properties sought to be imparted to the derivatized polymer include one or more of dispersancy, multifunctional viscosity modification, antioxidancy, friction modification, antiwear, antirust, seal swell, and the like.

The preferred properties sought to be imparted to the derivatized polymer include dispersancy (both mono- and multifunctional) viscosity modification (e.g. primarily viscosity modification with attendant secondary dispersant properties). A multifunctional dispersant typically will function primarily as a dispersant with attendant secondary viscosity modification.

As indicated above, dispersants are made from polymer having dispersviscosite molecular weights and viscosity modifiers are made from polymer having viscosity modifier range molecular weights which are higher than dispersant range molecular weights.

Multifunctional dispersants rely on polymers having number average molecular weights of greater than about 2,000 to less than about 20,000. In short, the higher the Mn of the polymer within the dispersant range molecular weight, the higher the contribution of the polymer to the high temperature viscosity properties of the formulation containing the dispersant.

Multifunctional viscosity modifiers possess attendant dispersant properties when the polymer from which they are derived is functionalized and derivatized with groups which contribute to dispersancy as described hereinafter in connection with ashless dispersants.

However, while the general functionalization and derivatization techniques for preparing multifunctional viscosity modifiers (also referred to herein as multifunctional viscosity index improvers or MFVI) are the same as for ashless dispersants, the functionality of a functionalized polymer intended for derivatization and eventual use as an MFVI will be controlled to be higher than functionalized polymer intended for eventual use as a dispersant. This stems from the difference in Mn of the MFVI polymer backbone vs. the Mn of the dispersant polymer backbone.

Accordingly, it is contemplated that an MFVI will be derived from functionalized polymer having typically at least about one functional group for each 7,000, preferably for each 5,000, Mn molecular weight segment in the backbone polymer. For example, the functionality of a functionalized polymer having an Mn of 30,000 will typically be controlled to have a functionality (F*) of about 6. Consequently, the stoichiometry of the derivatization reactions is adjusted accordingly in view of the higher functionality relative to the stoichiometrics described below for dispersant derivatization.

Moreover, it will be observed that to achieve the higher functionality for MFVI end use the functionalization technique is also adjusted accordingly. For example, for those functionalization techniques which rely on the olefinic sites it will be necessary to incorporate additional sites of unsaturation into the polymer. This can be achieved by incorporation of dienes into the polymer. Alternatively, other functionalization techniques do not rely on unsaturation, such as free radical grafting and oxidation.

In those instances, it is merely necessary to adjust reaction conditions to achieve the desired higher functionality.

Accordingly, while the following discussion relates primarily to derivatization for dispersant end use, the ashless dispersant portion thereof is also applicable to derivatization for MFVI end use subject to the above caveats.

Dispersants

Dispersants maintain oil insolubles, resulting from oxidation during use, in suspension in the fluid thus preventing sludge flocculation and precipitation. Suitable dispersants include, for example, dispersants of the ash-producing (also known as detergent/inhibitors) and ashless type, the latter type being preferred.

Ash-Producing Dispersants

The ash-producing detergents which can be made using the functionalized polymers of the present invention are exemplified by oil-soluble neutral and basic salts of alkali or alkaline earth metals with alkyl phenols, alkyl sulfonic acids, carboxylic acids, or organic phosphorus acids characterized by at least one direct carbon-to-phosphorus linkage such as those prepared from the functionalized olefin polymer of the present invention (e.g., functionalized polymer having a molecular weight of 1,500) with a phosphorizing agent such as phosphorus trichloride, phosphorus heptasulfide, phosphorus pentasulfide, phosphorus trichloride and sulfur, white phosphorus and a sulfur halide, or phosphorothioic chloride. The most commonly used salts of such acids are those of sodium, potassium, lithium, calcium, magnesium, strontium and barium. The alkyl groups of the above acids or compounds constitute the polymer of the present invention.

The term "basic salt" is used to designate metal salts wherein the metal is present in stoichiometrically larger amounts than the derivatized polymer. The commonly employed methods for preparing the basic salts involve heating a mineral oil solution of the acid with a stoichiometric excess of a metal neutralizing agent such as metal oxide, hydroxide, carbonate, bicarbonate, or sulfide at a temperature of about 50° C. and filtering the resulting mass. The use of a "promoter" in the neutralization step to aid the incorporation of a large excess of metal likewise is known. Examples of compounds useful as the promoter include phenolic substance such as phenol, napthol, alkylphenol, thiophenol, sulfurized alkylphenol, and condensation products of formaldehyde with a phenolic substance; alcohols such as methanol, 2-propanol, octyl alcohol, cellosolve, ethylene glycol, stearyl alcohol, and cyclohexyl alcohol; and amines such as aniline, phenylenediamine, phenyl-beta-napthylamine, and dodecylamine. A particularly effective method for preparing the basic salts comprises mixing an acid with an excess of a basic alkaline earth metal neutralizing agent and at least one alcohol promoter, and carbonating the mixture at an elevated temperature such as 60° C. to 200° C. This class of materials is discussed further hereinbelow in connection with detergents and metal rust inhibitors.

Preferred ash-producing detergents which can be derived from the functionalized polymers of the present invention include the metal salts of alkyl sulfonic acids, alkyl phenols, sulfurized alkyl phenols, alkyl salicylates, alkyl naphthenates and other oil soluble mono- and dicarboxylic acids. Highly basic (viz, overbased) metal salts, such as highly basic alkaline earth metal alkyl sulfonates (especially Ca and Mg salts) are frequently used as detergents. They are usually produced by heating a mixture comprising an oil-soluble alkyl sulfonate or alkaryl sulfonic acid, with an excess of alkaline earth metal compound above that required for complete neutralization of any sulfonic acid present, and thereafter forming a dispersed carbonate complex by reacting the excess metal with carbon dioxide to provide the desired overbasing. The sulfonic acids are typically obtained by the sulfonation of alkyl substituted aromatic hydrocarbons such as those obtained from the fractionation of petroleum by distillation and/or extraction or by the alkylation of aromatic hydrocarbons as for example those obtained by alkylating benzene, toluene, xylene, naphthalene, diphenyl and the halogen derivatives such as chlorobenzene, chlorotoluene and chloronaphthalene. The alkylation with the polymers of the present invention may be carried out in the presence of a catalyst, the polymer alkylating agents.

The alkaline earth metal compounds which may be used in neutralizing these acids to provide the compounding metal salts include the oxides and hydroxides, alkoxides, carbonates, carboxylate, sulfide, hydrosulfide, nitrate, borates and ethers of magnesium, calcium, and barium. Examples are calcium oxide, calcium hydroxide, magnesium acetate and magnesium borate. As noted, the alkaline earth metal compound is used in excess of that required to complete neutralization of the alkaryl sulfonic acids. Generally, the amount ranges from about 100 to about 220%, although it is preferred to use at least 125% of the stoichiometric amount of metal required for complete neutralization.

Various other preparations of basic alkaline earth metal sulfonates are known, such as those described in U.S. Pat. Nos. 3,150,088 and 3,150,089, wherein overbasing is accomplished by hydrolysis of an alkoxide-carbonate complex with the alkaryl sulfonate in a hydrocarbon solvent/diluent oil.

Ashless Dispersants

The derivatized polymer compositions of the present invention, can be used as ashless dispersants and multifunctional viscosity index improvers in lubricant and fuel compositions. Ashless dispersants and viscosity index improvers are referred to as being ashless despite the fact that, depending on their constitution, the dispersants may, upon combustion, yield a non-volatile material such as boric oxide or phosphorus pentoxide. The compounds useful as ashless dispersants generally are characterized by a "polar" group attached to a relatively high molecular weight hydrocarbon chain supplied by the polymer of the present invention. The "polar" group generally contains one or more of the elements nitrogen, oxygen and phosphorus. The solubilizing chains are generally higher in molecular weight than those employed with the metallic based dispersants, but in some instances they may be quite similar.

Various types of ashless dispersants can be made by derivatizing the polymer of the present invention and are suitable for use in the lubricant compositions. The following are illustrative:

1. Reaction products of functionalized polymer of the present invention derivatized with nucleophilic reagents such as amine compounds, e.g. nitrogen-containing compounds, organic hydroxy compounds such as phenols and alcohols, and/or basic inorganic materials.

More specifically, nitrogen- or ester-containing ashless dispersants comprise members selected from the group consisting of oil-soluble salts, amides, imides, oxazolines and esters, or mixtures thereof, of the polymer of the present invention, functionalized with mono- and dicarboxylic acids or anhydride or ester derivatives thereof, said polymer having dispersant range molecular weights as defined hereinabove.

At least one functionalized polymer is mixed with at least one of amine, alcohol, including polyol, aminoalcohol, etc., to form the dispersant additives. One class of particularly preferred dispersants includes those derived from the polymer of the present invention functionalized mono- or dicarboxylic acid material, e.g. succinic anhydride, and reacted with (i) a hydroxy compound, e.g. pentaerythritol, (ii) a polyoxyalkylene polyamine, e.g. polyoxypropylene diamine, and/or (iii) a polyalkylene polyamine, e.g., polyethylene diamine or tetraethylene pentamine referred to herein as TEPA. Another preferred dispersant class includes those derived from functionalized polymer reacted with (i) a polyalkylene polyamine, e.g. tetraethylene pentamine, and/or (ii) a polyhydric alcohol or polyhydroxy-substituted aliphatic primary amine, e.g., pentaerythritol or trismethylolaminomethane.

2. Reaction products of the polymer of the present invention functionalized with an aromatic hydroxy group and derivatized with aldehydes (especially formaldehyde) and amines (especially polyalkylene polyamines), through the Mannich reaction, which may be characterized as "Mannich dispersants".

3. Reaction products of the polymer of the present invention which have been functionalized by reaction with halogen and then derivatized by reaction with amines (e.g. direct amination), preferably polyalkylene polyamines. These may be characterized as "amine dispersants" and examples thereof are described, for example, in U.S. Pat. Nos. 3,275,554; 3,438,757; 3,454,555; 3,565,804; 3,755,433; 3,822,209 and 5,084,197, the disclosures of which are herein incorporated by reference.

Derivatized Polymer From Amine Compounds

Useful amine compounds for derivatizing functionalized polymers comprise at least one amine and can comprise one or more additional amines or other reactive or polar groups. Where the functional group is a carboxylic acid, ester or derivative thereof, it reacts with the amine to form an amide. Where the functional group is an epoxy it reacts with the amine to form an amino alcohol. Where the functional group is a halide the amine reacts to displace the halide. Where the functional group is a carbonyl group it reacts with the amine to form an imine.

Amine compounds useful as nucleophilic reactants for reaction with the functionalized polymer of the present invention include those disclosed in U.S. Pat. Nos. 3,445,441, 5,017,299 and 5,102,566, all hereby incorporated by reference. Preferred amine compounds include mono- and (preferably) polyamines, of about 2 to 60, preferably 2 to 40 (e.g. 3 to 20), total carbon atoms of about 1 to 12, preferably 3 to 12, and most preferably 3 to 9 nitrogen atoms in the molecule. These amines may be hydrocarbyl amines or may be hydrocarbyl amines including other groups, e.g., hydroxy groups, alkoxy groups, amide groups, nitriles, imidazoline groups, and the like. Hydroxy amines with 1 to 6 hydroxy groups, preferably 1 to 3 hydroxy groups, are particularly useful. Preferred amines are aliphatic saturated amines, including those of the general formulas:

  (5)

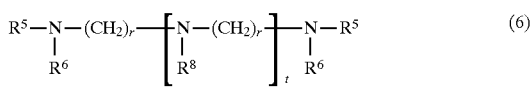  (6)

wherein $R^5$, $R^6$, $R^7$ and $R^8$ are independently selected from the group consisting of hydrogen; $C_1$ to $C_{25}$ straight or branched chain alkyl radicals; $C_1$ to $C_{12}$ alkoxy; $C_2$ to $C_6$ alkylene radicals; $C_2$ to $C_{12}$ hydroxy amino alkylene radicals; and $C_1$ to $C_{12}$ alkylamino $C_2$ to $C_6$ alkylene radicals; and wherein $R^8$ can additionally comprise a moiety of the formula:

  (7)

wherein $R^6$ is as defined above, and wherein r and r' can be the same or a different number of from 2 to 6, preferably 2 to 4; and t and t' can be the same or different and are numbers of from 0 to 10, preferably 2 to 7, and most preferably about 3 to 7. Preferably that the sum of t and t' is not greater than 15. To assure a facile reaction, it is preferred that $R^5$, $R^6$, $R^7$, $R^8$, r, r', t and t' be selected in a manner sufficient to provide the compounds of Formulae (5) and (6) with typically at least 1 primary or secondary amine group, preferably at least 2 primary or secondary amine groups. This can be achieved by selecting at least 1 of said $R^5$ $R^6$, $R^7$ and $R^8$ groups to be hydrogen or by letting t in Formula 6 be at least 1 when $R^8$ is H or when the Formula (7) moiety possesses a secondary amino group. The most preferred amine of the above formulas are represented by Formula (6) and contain at least 2 primary amine groups and at least 1, and preferably at least 3, secondary amine groups.

Non-limiting examples of suitable amine compounds include: 1,2-diaminoethane; 1,3-diaminopropane; 1,4-diaminobutane; 1,6-diaminohexane; polyethylene amines such as diethylene triamine; triethylene tetramine; tetraethylene pentamine; polypropylene amines such as 1,2-propylene diamine; di-(1,2-propylene)triamine; di-( 1,3-propylene)triamine; N,N-dimethyl-1,3-diaminopropane; N,N-di-(2-aminoethyl) ethylene diamine; N,N-di-(2-hydroxyethyl)-1,3-propylene diamine; 3-dodecyloxypropylamine; N-dodecyl-1,3-propane diamine; tris hydroxymethylaminomethane (THAM); diisopropanol amine; diethanol amine; triethanol amine; mono-, di-, and tri-tallow amines; amino morpholines such as N-(3-aminopropyl)morpholine; and mixtures thereof. Monoamines include methyl ethyl amine, methyl octadecyl amines, anilines, diethylol amine, dipropyl amine, etc.

Other useful amine compounds include: alicyclic diamines such as 1,4-di(aminomethyl) cyclohexane, and heterocyclic nitrogen compounds such as imidazolines, and N-aminoalkyl piperazines of the general formula (8):

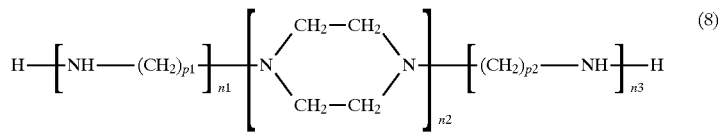  (8)

wherein $p_1$ and $p_2$ are the same or different and are each integers of from 1 to 4, and $n_1$, $n_2$ and $n_3$ are the same or different and are each integers of from 1 to 3. Non-limiting examples of such amines include 2-pentadecyl imidazoline; N-(2-aminoethyl) piperazine; etc.

Commercial mixtures of amine compounds may advantageously be used. For example, one process for preparing alkylene amines involves the reaction of an alkylene dihalide (such as ethylene dichloride or propylene dichloride) with ammonia, which results in a complex mixture of alkylene amines wherein pairs of nitrogens are joined by alkylene groups, forming such compounds as diethylene triamine, triethylenetetramine, tetraethylene pentamine and isomeric piperazines. Low cost poly(ethyleneamine) compounds averaging about 5 to 7 nitrogen atoms per molecule are available commercially under trade names such as "Polyamine H", "Polyamine 400", "Dow Polyamine E-100", etc.

Useful amines also include polyoxyalkylene polyamines such as those of the formula:

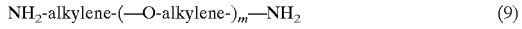  (9)

where m has a value of about 3 to 70 and preferably 10 to 35; and the formula:

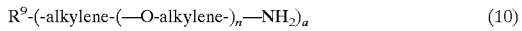  (10)

where n has a value of about 1 to 40 with the provision that the sum of all the n values is from about 3 to about 70 and preferably from about 6 to about 35, and $R^9$ is a polyvalent saturated hydrocarbon radical of up to 10 carbon atoms wherein the number of substituents on the $R^9$ group is represented by the value of "a", which is a number of from 3 to 6. The alkylene groups in either formula (9) or (10) may be straight or branched chains containing about 2 to 7, and preferably about 2 to 4 carbon atoms.

The polyoxyalkylene polyamines of formulas (9) or (10) above, preferably polyoxyalkylene diamines and polyoxyalkylene triamines, may have average molecular weights ranging from about 200 to about 4,000 and preferably from about 400 to about 2,000. The preferred polyoxyalkylene polyamines include the polyoxyethylene and polyoxypropylene diamines and the polyoxypropylene triamines having average molecular weights ranging from about 200 to 2,000. The polyoxyalkylene polyamines are commercially available and may be obtained, for example, from the Jefferson Chemical Company, Inc. under the trade name "Jeffamines D-230, D-400, D-1000, D-2000, T-403, etc.

Other suitable amines include the bis(para-amino cyclohexyl) methane oligomers disclosed in U.S. Ser. No. 547,930, filed Jul. 3, 1990, the disclosure of which is herein incorporated by reference.

A particularly useful class of amines are the polyamido and related amines disclosed in U.S. Pat. Nos. 4,857,217; 4,963,275 and 4,956,107, the disclosures of which are herein incorporated by reference, which comprise reaction products of a polyamine and an alpha, beta unsaturated compound of the formula:

wherein X is sulfur or oxygen, Y is —$OR^{13}$, $SR^{13}$, or —$NR^{13}(R^{14})$, and $R^{10}$, $R^{11}$, $R^{12}$, $R^{13}$ and $R^{14}$ are the same or different and are hydrogen or substituted or unsubstituted hydrocarbyl. Any polyamine, whether aliphatic, cycloaliphatic, aromatic, heterocyclic, etc., can be employed provided it is capable of adding across the acrylic double bond and amidifying with, for example, the carbonyl group (—C(O)—) of the acrylate-type compound of formula (11), or with the thiocarbonyl group (—C(S)—) of the thioacrylate-type compound of formula (11).

When $R^{10}$, $R^{11}$, $R^{12}$, $R^{13}$ or $R^{14}$ in Formula (11) are hydrocarbyl, these groups can comprise alkyl, cycloalkyl, aryl, alkaryl, aralkyl or heterocyclic, which can be substituted with groups which are substantially inert to any component of the reaction mixture under conditions selected for preparation of the amido-amine. Such substituent groups include hydroxy, halide (e.g., Cl, Fl, I, Br), —SH and alkylthio. When one or more of $R^{10}$ through $R^{14}$ are alkyl, such alkyl groups can be straight or branched chain, and will generally contain from 1 to 20, more usually from 1 to 10, and preferably from 1 to 4, carbon atoms. Illustrative of such alkyl groups are methyl, ethyl, propyl, butyl, pentyl, hexyl, heptyl, octyl, nonyl, decyl, dodecyl, tridecyl, hexadecyl, octadecyl and the like. When one or more of $R^{10}$ through $R^{14}$ are aryl, the aryl group will generally contain from 6 to 10 carbon atoms (e.g., phenyl, naphthyl).

When one or more of $R^{10}$ through $R^{14}$ are alkaryl, the alkaryl group will generally contain from about 7 to 20 carbon atoms, and preferably from 7 to 12 carbon atoms. Illustrative of such alkaryl groups are tolyl, m-ethylphenyl, o-ethyltolyl, and m-hexyltolyl. When one or more of $R^{10}$ through $R^{14}$ are aralkyl, the aryl component generally consists of phenyl or ($C_1$ to $C_6$) alkyl-substituted phenol and the alkyl component generally contains from 1 to 12 carbon atoms, and preferably from 1 to 6 carbon atoms. Examples of such aralkyl groups are benzyl, o-ethylbenzyl, and 4-isobutylbenzyl. When one or more of $R^{10}$ through $R^{14}$ are cycloalkyl, the cycloalkyl group will generally contain from 3 to 12 carbon atoms, and preferably from 3 to 6 carbon atoms. Illustrative of such cycloalkyl groups are cyclopropyl, cyclobutyl, cyclohexyl, cyclooctyl, and cyclododecyl. When one or more of $R^{10}$ through $R^{14}$ are heterocyclic, the heterocyclic group generally consists of a compound having at least one ring of 6 to 12 members in which one or more ring carbon atoms is replaced by oxygen or nitrogen. Examples of such heterocyclic groups are furyl, pyranyl, pyridyl, piperidyl, dioxanyl, tetrahydrofuryl, pyrazinyl and 1,4-oxazinyl.

The alpha, beta ethylenically unsaturated carboxylate compounds employed herein have the following formula:

wherein $R^{10}$, $R^{11}$, $R^{12}$ and $R^{13}$ are the same or different and are hydrogen or substituted or unsubstituted hydrocarbyl as defined above. Examples of such alpha, beta-ethylenically unsaturated carboxylate compounds of formula (12) are acrylic acid, methacrylic acid, the methyl, ethyl, isopropyl, n-butyl, and isobutyl esters of acrylic and methacrylic acids, 2-butenoic acid, 2-hexenoic acid, 2-decenoic acid, 3-methyl-2-heptenoic acid, 3-methyl-2-butenoic acid, 3-phenyl-2-propenoic acid, 3-cyclohexyl-2-butenoic acid, 2-methyl-2-butenoic acid, 2-propyl-2-propenoic acid, 2-isopropyl-2-hexenoic acid, 2,3-dimethyl-2-butenoic acid, 3-cyclohexyl-2-methyl-2-pentenoic acid, 2-propenoic acid, methyl 2-propenoate, methyl 2-methyl-2-propenoate, methyl 2-butenoate, ethyl 2-hexenoate, isopropyl 2-decenoate, phenyl 2-pentenoate, tertiary butyl 2-propenoate, octadecyl 2-propenoate, dodecyl 2-decenoate, cyclopropyl 2,3-dimethyl-2-butenoate, methyl 3-phenyl-2-propenoate and the like.

The alpha, beta ethylenically unsaturated carboxylate thioester compounds employed herein have the following formula:

wherein $R^{10}$, $R^{11}$, $R^{12}$ and $R^{13}$ are the same or different and are hydrogen or substituted or unsubstituted hydrocarbyl as defined above. Examples of such alpha, beta-ethylenically unsaturated carboxylate thioesters of formula (13) are methylmercapto 2-butenoate, ethylmercapto 2-hexenoate, isopropylmercapto 2-decenoate, phenylmercapto 2-pentenoate, tertiary butylmercapto 2-propenoate, octadecylmercapto 2-propenoate, dodecylmercapto 2-decenoate, cyclopropylmercapto 2,3-dimethyl-2-butenoate, methylmercapto 3-phenyl-2-propenoate, methylmercapto 2-propenoate, methylmercapto 2-methyl-2-propenoate and the like.

The alpha, beta-ethylenically unsaturated carboxyamide compounds employed herein have the following formula:

wherein $R^{10}$, $R^{11}$, $R^{12}$, $R^{13}$ and $R^{14}$ are the same or different and are hydrogen or substituted or unsubstituted hydrocarbyl as defined above. Examples of alpha, beta-ethylenically unsaturated carboxyamides of Formula (14) are 2-butenamide, 2-hexenamide, 2-decenamide, 3-methyl-2- heptenamide, 3-methyl-2-butenamide, 3-phenyl-2-propenamide, 3-cyclohexyl-2-butenamide, 2-methyl-2-butenamide, 2-propyl-2-propenamide, 2-isopropyl-2-hexenamide, 2,3-dimethyl-2-butenamide, 3-cyclohexyl-2-methyl-2-pentenamide, N-methyl 2-butenamide, N,N-diethyl 2-hexenamide, N-isopropyl 2-decenamide, N-phenyl 2-pentenamide, N-tertiary butyl 2-propenamide, N-octadecyl 2-propenamide, N-N-didodecyl 2-decenamide, N-cyclopropyl 2,3-dimethyl-2-butenamide, N-methyl 3-phenyl-2-propenamide, 2-propenamide, 2-methyl-2-propenamide, 2-ethyl-2-propenamide and the like.

The alpha, beta ethylenically unsaturated thiocarboxylate compounds employed herein have the following formula:

wherein $R^{10}$, $R^{11}$, $R^{12}$, and $R^{13}$ are the same or different and are hydrogen or substituted or unsubstituted hydrocarbyl as defined above. Examples of alpha, beta-ethylenically unsaturated thiocarboxylate compounds of formula (15) are 2-butenthioic acid, 2-hexenthioic acid, 2-decenthioic acid, 3-methyl-2-heptenthioic acid, 3-methyl-2-butenthioic acid, 3-phenyl-2-propenthioic acid, 3-cyclohexyl-2-butenthioic acid, 2-methyl-2-butenthioic acid, 2-propyl-2-propenthioic acid, 2-isopropyl-2-hexenthioic acid, 2,3-dimethyl-2-butenthioic acid, 3-cyclohexyl-2-methyl-2-pententhioic acid, 2-propenthioic acid, methyl 2-propenthioate, methyl 2-methyl 2-propenthioate, methyl 2-butenthioate, ethyl 2-hexenthioate, isopropyl 2-decenthioate, phenyl 2-pententhioate, tertiary butyl 2-propenthioate, octadecyl 2-propenthioate, dodecyl 2-decenthioate, cyclopropyl 2,3-dimethyl-2-butenthioate, methyl 3-phenyl-2-propenthioate and the like.

The alpha, beta ethylenically unsaturated dithioic acid and acid ester compounds employed herein have the following formula:

wherein $R^{10}$, $R^{11}$, $R^{12}$ and $R^{13}$, are the same or different and are hydrogen or substituted or unsubstituted hydrocarbyl as defined above. Examples of alpha, beta-ethylenically unsaturated dithioic acids and acid esters of formula (16) are 2-butendithioic acid, 2-hexendithioic acid, 2-decendithioic acid, 3-methyl-2-heptendithioic acid, 3-methyl-2-butendithioic acid, 3-phenyl-2-propendithioic acid, 3-cyclohexyl-2-butendithioic acid, 2-methyl-2-butendithioic acid, 2-propyl-2-propendithioic acid, 2-isopropyl-2-hexendithioic acid, 2,3-dimethyl-2-butendithioic acid, 3-cyclo- hexyl-2-methyl-2-pentendithioic acid, 2-propendithioic acid, methyl 2-propendithioate, methyl 2-methyl 2-propendithioate, methyl 2-butendithioate, ethyl 2-hexendithioate, isopropyl 2-decendithioate, phenyl 2-pentendithioate, tertiary butyl 2-propendithioate, octadecyl 2-propendithioate, dodecyl 2-decendithioate, cyclopropyl 2,3-dimethyl-2-butendithioate, methyl 3-phenyl-2-propendithioate and the like.

The alpha, beta ethylenically unsaturated thiocarboxyamide compounds employed herein have the following formula:

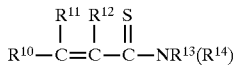

wherein $R^{10}$, $R^{11}$, $R^{12}$, $R^{13}$ and $R^{14}$ are the same or different and are hydrogen or substituted or unsubstituted hydrocarbyl as defined above. Examples of alpha, beta-ethylenically unsaturated thiocarboxyamides of formula (17) are 2-butenthioamide, 2-hexenthioamide, 2-decenthioamide, 3-methyl-2-heptenthioamide, 3-methyl-2-butenthioamide, 3-phenyl-2-propenthioamide, 3-cyclohexyl-2-butenthioamide, 2-methyl-2-butenthioamide, 2-propyl-2-propenthioamide, 2-isopropyl-2-hexenthioamide, 2,3-dimethyl-2-butenthioamide, 3-cyclohexyl-2-methyl-2-pententhioamide, N-methyl 2-butenthioamide, N,N-diethyl 2-hexenthioamide, N-isopropyl 2-decenthioamide, N-phenyl 2-pententhioamide, N-tertiary butyl 2-propenthioamide, N-octadecyl 2-propenthioamide, N-N-didodecyl 2-decenthioamide, N-cyclopropyl 2,3-dimethyl-2-butenthioamide, N-methyl 3-phenyl-2-propenthioamide, 2-propenthioamide, 2-methyl-2-propenthioamide, 2-ethyl-2-propenthioamide and the like.

Preferred compounds for reaction with the polyamines in accordance with this invention are lower alkyl esters of acrylic and (lower alkyl) substituted acrylic acid. Illustrative of such preferred compounds are compounds of the formula:

where $R^{12}$ is hydrogen or a $C_1$ to $C_4$ alkyl group, such as methyl, and $R^{13}$ is hydrogen or a $C_1$ to $C_4$ alkyl group, capable of being removed so as to form an amido group, for example, methyl, ethyl, propyl, isopropyl, butyl, sec-butyl, tert-butyl, aryl, hexyl, etc. In the preferred embodiments these compounds are acrylic and methacrylic esters such as methyl or ethyl acrylate, methyl or ethyl methacrylate. When the selected alpha, beta-unsaturated compound comprises a compound of formula (11) wherein X is oxygen, the resulting reaction product with the polyamine contains at least one amido linkage (—C(O)N<) and such materials are herein termed "amido-amides". Similarly, when the selected alpha, beta unsaturated compound of Formula (11) comprises a compound wherein X is sulfur, the resulting reaction product with the polyamine contains thioamide linkage (—C(S)N<) and these materials are herein termed "thioamido-amines". For convenience, the following discussion is directed to the preparation and use of amido-amines, although it will be understood that such discussion is also applicable to the thioamido-amines.

The type of amido-amine formed varies with reaction conditions. For example, a more linear amido-amine is formed where substantially equimolar amounts of the unsaturated carboxylate and polyamine are reacted. The presence of excesses of the ethylenically unsaturated reactant of formula (11) tends to yield an amido-amine which is more cross-linked than that obtained where substantially equimolar amounts of reactants are employed. Where, for economic or other reasons, a cross-linked amido-amine using excess amine is desired, generally a molar excess of the ethylenically unsaturated reactant of about at least 10%, such as 10 to 300%, or greater, for example, 25 to 200%, is employed. For more efficient cross-linking an excess of carboxylated material should preferably be used since a cleaner reaction ensues. For example, a molar excess of about 10 to 100% or greater such as 10 to 50%, but preferably an excess of 30 to 50%, of the carboxylated material. Larger excess can be employed if desired.

In summary, without considering other factors, equimolar amounts of reactants tend to produce a more linear amido-amine whereas excess of the formula (11) reactant tends to yield a more cross-linked amido-amine. It should be noted that the higher the polyamine (i.e., in greater the number of amino groups on the molecule) the greater the statistical probability of cross-linking since, for example, a tetraalkylenepentamine, such as tetraethylene pentamine

has more labile hydrogens than ethylene diamine.

These amido-amine adducts so formed are characterized by both amido and amino groups. In their simplest embodiments they may be represented by units of the following idealized formula:

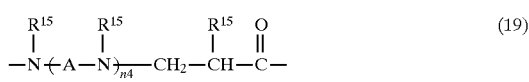

wherein the $R^{15}$'s, which may be the same or different, are hydrogen or a substituent group, such as a hydrocarbon group, for example, alkyl, alkenyl, alkynyl, aryl, etc., and A is a moiety of the polyamine which, for example, may be aryl, cycloalkyl, alkyl, etc., and n4 is an integer such as 1 to 10 or greater.

The above simplified formula represents a linear amido-amine polymer. However, cross-linked polymers may also be formed by employing certain conditions since the polymer has labile hydrogens which can further react with either the unsaturated moiety by adding across the double bond or by amidifying with a carboxylate group.

Preferably, however, the amido-amines are not cross-linked to any substantial degree, and more preferably are substantially linear.

Preferably, the polyamine reactant contains at least one primary amine, and more preferably from 2 to 4 primary amines, group per molecule, and the polyamine and the unsaturated reactant of formula (11) are contacted in an amount of from about 1 to 10, more preferably from about 2 to 6, and most preferably from about 3 to 5, equivalents of primary amine in the polyamine reactant per mole of the unsaturated reactant of formula (11).

The reaction between the selected polyamine and acrylate-type compound is carried out at any suitable temperature. Temperatures up to the decomposition points of reactants and products can be employed. In practice, one generally carries out the reaction by heating the reactants below 100° C., such as 80° C. to 90° C., for a suitable period of time, such as a few hours. Where an acrylic-type ester is employed, the progress of the reaction can be judged by the removal of the alcohol in forming the amide.

During the early part of the reaction, alcohol is removed quite readily below 100° C. in the case of low boiling alcohols such as methanol or ethanol. As the reaction slows, the temperature is raised to push the polymerization to completion and the temperature may be raised to 150° C. toward the end of the reaction. Removal of alcohol is a convenient method of judging the progress and completion of the reaction which is generally continued until no more alcohol is evolved. Based on removal of alcohol, the yields are generally stoichiometric. In more difficult reactions, yields of at least 95% are generally obtained.

Similarly, it will be understood that the reaction of an ethylenically unsaturated carboxylate thioester of formula (13) liberates the corresponding $HSR^{13}$ compound (e.g., $H_2S$ when $R^{13}$ is hydrogen) as a by-product, and of formula (14) liberates the corresponding $HNR^{13}$ ($R^{14}$ compound (e.g., ammonia when $R^{13}$ and $R^{14}$ are each hydrogen) as a by-product.

The reaction time to form an amido-amine material can vary widely depending on a wide variety of factors. For example, there is a relationship between time and temperature. In general, lower temperature demands longer times. Usually, reaction times of from about 2 to 30 hours, such as 5 to 25 hours, and preferably 3 to 10 hours will be employed. Although one can employ a solvent, the reaction can be run without the use of any solvent. In fact, where a high degree of cross-linking is desired, it is preferably to avoid the use of a solvent and most particularly to avoid a polar solvent such as water. However, taking into consideration the effect of solvent on the reaction, where desired, any suitable solvent can be employed, whether organic or inorganic, polar or non-polar.

As an example of the amido-amine adducts, the reaction of tetraethylene pentaamine (TEPA) with methyl methacrylate can be illustrated as follows:

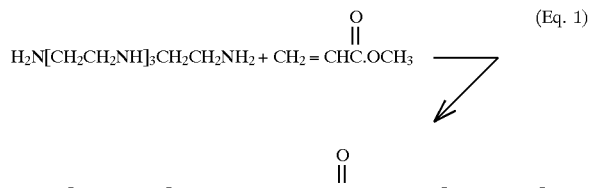

Tris(hydroxymethyl) amino methane (THAM) can be reacted with the aforesaid functionalized polymers to form amides, imides or ester type additives as taught by U.K. 984,409, or to form oxazoline compounds and borated oxazoline compounds as described, for example, in U.S. Pat. Nos. 4,102,798; 4,116,876 and 4,113,639.

Derivatization Polymer From Alcohols

The functionalized polymers, particularly acid functionalized polymers, of the present invention can be reacted with alcohols, e.g. to form esters. The alcohols may be aliphatic compounds such as monohydric and polyhydric alcohols or aromatic compounds such as phenols and naphthols.

The aromatic hydroxy compounds from which the esters may be derived are illustrated by the following specific examples: phenol, beta-naphthol, alpha-naphthol, cresol, resorcinol, catechol, p,p'di-hydroxybiphenyl, 2-chlorophenol, 2,4-dibutylphenol, propene tetramer-substituted phenol, didodecylphenol, 4,4'-methylene-bis-phenol, alpha-decyl-beta-naphthol, polyisobutene (molecular weight of 1000)-substituted phenol, the condensation product of heptylphenol with 0.5 mole of formaldehyde, the condensation product of octyl-phenol with acetone, di(hydroxyphenyl)-oxide, di(hydroxyphenyl) sulfide, di(hydroxyphenyl)disulfide, and 4-cyclohexylphenol. Phenol and alkylated phenols having up to three alkyl substituents are preferred.

The alcohols from which the esters may be derived preferably contain up to about 40 aliphatic carbon atoms. They may be monohydric alcohols such as methanols, ethanol, isooctanol, dodecanol, cyclohexanol, cyclopentanol, behenyl alcohol, hexatriacontanol, neopentyl alcohol, isobutyl alcohol, benzyl alcohol, beta-phenyl-ethyl alcohol, 2-methylcyclohexanol, beta-chloroethanol, monomethyl ether of ethylene glycol, monobutyl ether of ethylene glycol, monopropyl ether of diethylene glycol, monododecyl ether of triethylene glycol, monooleate of ethylene glycol, monostearate of diethylene glycol, secpentyl alcohol, tertbutyl alcohol, 5-bromo-dodecanol, nitro-octadecanol and dioleate of glycerol. The polyhydric alcohols preferably contain from 2 to about 10 hydroxy radicals. They are illustrated by, for example, ethylene glycol, diethylene glycol, triethylene glycol, tetraethylene glycol, dipropylene glycol, tripropylene glycol, dibutylene glycol, tributylene glycol, and other alkylene glycols in which the alkylene radical contains from 2 to about 8 carbon atoms. Other useful polyhydric alcohols include glycerol, monooleate of glycerol, monostearate of glycerol, monomethyl ether of glycerol, pentaerythritol, 9,10-dihydroxy stearic acid, methyl ester of 9,10-dihydroxy stearic acid, 1,2-butanediol, 2,3-hexanediol, 2,4-hexanediol, penacol, erythritol, arabitol, sorbitol, mannitol, 1,2-cyclo-hexanediol, and xylene glycol. Carbohydrates such as sugars, starches, cellulose, etc., likewise may yield the esters of this invention. The carbohydrates may be exemplified by a glucose, fructose, sucrose, rhamnose, mannose, glyceraldehyde, and galactose. Heterocyclic polyols, such as described in U.S. Pat. No. 4,797,219, the disclosure of which is herein incorporated by reference, may be employed. Such polyols include tetrahydro-3,3,5,5-tetrakischydroxymethyl)-4-pyranol also known as anhydroenneaheptitol(AEH).

A useful class of polyhydric alcohols are those having at least three hydroxy radicals, some of which have been esterified with a monocarboxylic acid having from about 8 to about 30 carbon atoms, such as octanoic acid, oleic acid, stearic acid, linoleic acid, dodecanoic acid, or tall oil acid. Examples of such partially esterified polyhydric alcohols are the monooleate of sorbitol, distearate of sorbitol, monooleate of glycerol, monostearate of glycerol, di-dodecanoate of erythritol.

The esters may also be derived from unsaturated alcohols such as allyl alcohol, cinnamyl alcohol, propargyl alcohol, 1-cyclohexene-3-ol, an oleyl alcohol. Still another class of the alcohols capable of yielding the esters of this invention comprise the ether-alcohols and amino-alcohols including, for example, the oxyalkylene-, oxyarylene-, amino-alkylene-, and aminoarylene-substituted alcohols having one or more oxyalkylene, amino-alkylene or amino-arylene oxyarylene radicals. They are exemplified by Cellosolve, carbitol, phenoxyethanol, heptylphenyl-(oxypropylene)6-H, octyl(oxyethylene)30-H, phenyl-(oxyoctylene)2-H, mono (heptylphenyl-oxypropylene)-substituted glycerol, poly (styrene oxide), aminoethanol, 3-amino ethyl-pentanol, di(hydroxyethyl) amine, p-amino-phenol, tri (hydroxypropyl)amine, N-hydroxyethyl ethylene diamine, N,N,N',N'-tetrahydroxy-trimethylene diamine, and the like. For the most part, the ether-alcohols having up to about 150 oxyalkylene radicals in which the alkylene radical contains from 1 to about 8 carbon atoms are preferred.

The esters may be diesters, e.g., of succinic acids or acidic esters, i.e., partially esterified polyhydric alcohols or phenols, i.e., esters having free alcoholic or phenolic hydroxyl radicals. Mixtures of the above-illustrated esters likewise are contemplated within the scope of the invention.

The esters may be prepared by one of several methods. The method which is preferred because of convenience and superior properties of the esters it produces, involves the reaction of a suitable alcohol or phenol with the acid or anhydride (i.e., functionalized polymer succinic anhydride). The esterification is usually carried out at a temperature above about 100° C., preferably between 150° C. and 300° C.

The water formed as a by-product is removed by distillation as the esterification proceeds. A solvent may be used in the esterification to facilitate mixing and temperature control. It also facilitates the removal of water from the reaction mixture. The useful solvents include xylene, toluene, diphenyl ether, chlorobenzene, and mineral oil.

A modification of the above process involving dicarboxylic acid involves the replacement of, for example, succinic anhydride with the corresponding succinic acid as a functionalized compound. However, succinic acids readily undergo dehydration at temperatures above about 100° C. and are thus converted to their anhydrides which are then esterified by the reaction with the alcohol reactant. In this regard, succinic acids appear to be the substantial equivalents of their anhydrides in the process.

The relative proportions of the acid functionalized polymer (e.g., succinic acid functionalized polymer) and the hydroxy reactant which are to be used depend to a large measure upon the type of the product desired, the functionality of the functionalized polymer, and the number of hydroxyl groups present in the molecule of the hydroxy reactant. For instance, the formation of a half ester of a succinic acid, i.e., one in which only one of the two acid radicals is esterified, involves the use of one mole of a monohydric alcohol for each mole of the succinic functional group, whereas the formation of a diester of a succinic acid involves the use of two moles of the alcohol for each mole of the acid functional group. On the other hand, one mole of a hexahydric alcohol may combine with as many as six moles of a di-acid to form an ester in which each of the six hydroxyl radicals of the alcohol is esterified with one of the two acid radicals of the succinic acid. Thus, the maximum proportion of functional groups to be esterified with a polyhydric alcohol is determined by the number of hydroxyl groups present in the molecule of the hydroxy reactant. Esters obtained by the reaction of stoichiometric amounts of the acid reactant and hydroxy reactant are preferred.

In some instances, it is advantageous to carry out the esterification in the presence of a catalyst such as sulfuric acid, pyridine hydrochloride, hydrochloric acid, benzene-sulfonic acid, p-toluenesulfonic acid, phosphoric acid, or any other known esterification catalyst. The amount of the catalyst in the reaction may be as little as 0.01% (by weight of the reaction mixture), more often from about 0.1% to about 5%.

Ester derivatives likewise may be obtained by the reaction of a acid functionalized polymer with epoxide or a mixture of an epoxide and water. Such reaction is similar to one involving the acid or anhydride with a glycol. For instance, the product may be prepared by the reaction of functionalized polymer with alkylene oxide to yield half-esters, monoesters or diesters.

Epoxides which are commonly available for use in such reaction include, for example, ethylene oxide, propylene oxide, styrene oxide, 1,2-butylene oxide, 2,3-butylene oxide, epichlorohydrin, cyclohexene oxide, 1,2-octylene oxide, epoxidized soya bean oil, methyl ester of 9,10-epoxy-stearic acid, and butadiene monoepoxide. Preferred epoxides are the alkylene oxides in which the alkylene radical has from 2 to about 8 carbon atoms; or the epoxidized fatty acid esters in which the fatty acid radical has up to about 30 carbon atoms and the ester radical is derived from a lower alcohol having up to about 8 carbon atoms.

In lieu of the acid functionalized polymer, a polymer functionalized with lactone acid or an acid halide may be used in the processes illustrated above for preparing the ester derivatives of this invention. Such acid halides may be acid dibromides, acid dichlorides, acid monochlorides, and acid monobromides.

In view of the above, the derivative compositions produced by reacting functionalized polymer with alcohols are esters including both acidic esters and neutral esters. Acidic esters are those in which less than all of the functional groups in functionalized polymer are esterified, and hence possess at least one free functional group. Obviously, acid esters are easily prepared by using an amount of alcohol insufficient to esterify all of the functional groups in the functionalized polymer.

The functionalized, e.g., acid functionalized, polymers of this invention are reacted with the alcohols according to conventional esterification techniques. This normally involves heating the functionalized polymer with the alcohol, optionally in the presence of a normally liquid, substantially inert, organic liquid solvent/diluent and/or in the presence of esterification catalyst. Temperatures of at least about 100° C. up to the decomposition point are used (the decomposition point having been defined hereinbefore). This temperature is usually within the range of about 100° C. up to about 300° C. with temperatures of about 140° C. to 250° C. often being employed.

Many issued patents disclose procedures for reacting high molecular weight carboxylic acids with alcohols to produce acidic esters and neutral esters. These same techniques are applicable to preparing esters from the functionalized polymer of this invention and the alcohols described above. All that is required is that the acylating reagents of this invention are substituted for the high molecular weight carboxylic acid acylating agents discussed in these patents, usually on an equivalent weight basis. The following U.S. Patents are expressly incorporated herein by reference for their disclosure of suitable methods for reacting the acylating reagents of this invention with the alcohols described above: U.S. Pat. Nos. 3,331,776; 3,381,022; 3,522,179; 3,542,680; 3,697,428 and 3,755,169.

Derivatized Polymer From Mannich Base Condensation

The hydroxy aromatic functionalized polymer aldehyde/amino condensates useful as ashless dispersants in the compositions of this invention include those generally referred to as Mannich condensates. Generally they are made by reacting simultaneously or sequentially at least one active hydrogen compound such as a hydrocarbon-substituted phenol (e.g., hydroxy aromatic functionalized polymer of the present invention), having at least one hydrogen atom bonded to an aromatic carbon, with at least one aldehyde or aldehyde-producing material (typically formaldehyde precursor) and at least one amino or polyamino compound having at least one NH group. Preferred phenolic compounds include the hydroxy aromatic functionalized polymer recited above. Useful amine compounds can be selected from those recited above. The amine compounds include primary or secondary monoamines having hydrocarbon substituents of 1 to 30 carbon atoms or hydroxyl-substituted hydrocarbon substituents of 1 to about 30 carbon atoms. Another type of typical amine compound are the polyamines described during the discussion of the acylated nitrogen-containing compounds. The materials described in the following patents are illustrative of Mannich dispersants: U.S. Pat. Nos. 3,413,347; 3,697,574; 3,725,277; 3,725,480; 3,726,882; 4,454,059 and 5,102,566.

The following U.S. patents contain extensive descriptions of Mannich condensates which can be used in making the compositions of this invention:

| U.S. Pat. Nos. | | |
|---|---|---|
| 2,459,112 | 3,413,347 | 3,558,743 |
| 2,962,442 | 3,442,808 | 3,586,629 |
| 2,984,550 | 3,448,047 | 3,591,598 |
| 3,036,003 | 3,454,497 | 3,600,372 |
| 3,166,516 | 3,459,661 | 3,634,515 |
| 3,236,770 | 3,461,172 | 3,649,229 |
| 3,355,270 | 3,493,520 | 3,697,574 |
| 3,368,972 | 3,539,633 | 5,017,299 |

Condensates made from sulfur-containing reactants also can be used in the compositions of the present invention. Such sulfur-containing condensates are described in U.S. Pat. Nos. 3,368,972; 3,649,229; 3,600,372; 3,649,659 and 3,741,896. These patents also disclose sulfur-containing Mannich condensates.

The Aldehyde Material Used in Mannich Condensations

The aldehyde reactants will generally comprise formaldehyde or paraformaldehyde, although it will be understood that other aldehyde group-containing compounds, such as $C_2$ to $C_{10}$ hydrocarbyl aldehydes (e.g., butyraldehyde, acetaldehyde, propionaldehyde, and the like) can also be employed. A preferred group of aldehyde materials are compounds of the formula: $R^{16}CHO$, wherein $R^{16}$ is H or aliphatic hydrocarbon radicals having from 1 to 4 carbon atoms.

Mannich Base Condensation Derivatives

The Mannich Base condensate dispersants are prepared by condensing at least one of the above-described hydroxy/aromatic functionalized polymers with an amine, which can include amines as described, in the presence of an aldehyde. The reactants are contacted for a time and under conditions sufficient to form the desired dispersant product.

The process employed in the condensation reaction can be any of those disclosed in U.S. Pat. Nos. 3,634,515; 3,649,229; 3,442,808; 3,798,165; 3,798,247 and 3,539,633, the disclosures of which are hereby incorporated by reference in their entirety.

The amount of the reactants employed is not critical and can vary over a wide range. It is, however, preferred to react the hydroxy aromatic functionalized polymer, aldehyde reactant and amine compound in the respective molar ratios of about 1:(1 to 4):(0.1 to 10). An excess of aldehyde reactant may be used. More specifically, condensates can be prepared by reacting about one molar portion of phenolic polymer with about 1 to about 2 molar portions of aldehyde and about 1 to about 5 equivalent portions of amino compound (an equivalent of amino compound is its molecular weight divided by the number of =NH groups present). The conditions under which such condensation reactions are carried out are well known to those skilled in the art as evidenced by the above-noted patents. Therefore, these patents are also incorporated by reference for their disclosures relating to reaction conditions.

The reactions are exothermic, but it is desirable to heat the reaction to a temperature of above about 150° C., preferably in the range of from about 150° C. to 200° C. This additional heating drives the reaction to completion and removes water from the resultant condensation reaction product.

The condensation reaction can be illustrated by the following reactions employing an alkylene polyamine and formaldehyde:

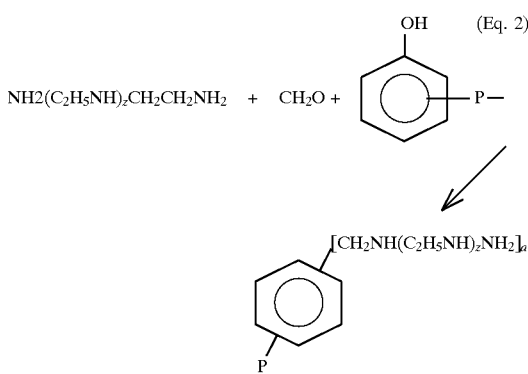

wherein "z" is an integer of from 1 to 10, "a" is an integer of 1 or 2 and P is the polymer as described above, and

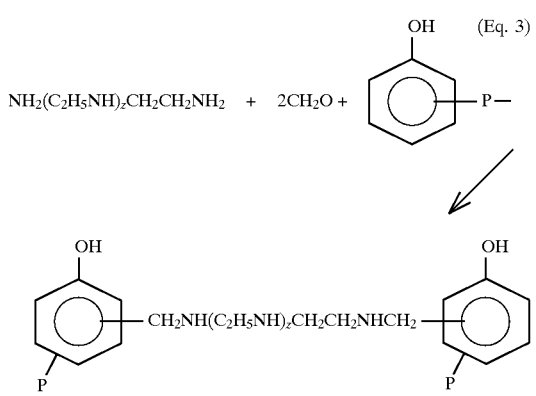

(Eq. 3)

wherein "z", and P are as defined above.

A useful group of Mannich Base ashless dispersants are those formed by condensing phenol functionalized polymer with formaldehyde and polyethylene amines, e.g., tetraethylene pentamine, pentaethylene hexamine, polyoxyethylene and polyoxypropylene amines, e.g., polyoxypropylene diamine and combinations thereof. One particularly preferred dispersant comprises a condensation of (A) phenol functionalized polymer, (B) formaldehyde, (C) a polyoxyalkylene polyamine, e.g., polyoxypropylene diamine, and (D) a polyalkylene polyamine, e.g. polyethylene diamine and tetraethylene pentamine, using about 2 to about 8 moles each of (B) and about 1 to about 4 moles of (C) or (D) per mole of (A).

A useful class of nitrogen-containing condensation products for use in the present invention are those made by a "2-step process" as disclosed in U.S. Pat. No. 4,273,891, incorporated herein by reference. Briefly, these nitrogen-containing condensates are made by (1) reacting at least phenol functionalized polymer of the present invention with a lower aliphatic $C_1$ to $C_7$ aldehyde or reversible polymer thereof in the presence of an alkaline reagent, such as an alkali metal hydroxide, at a temperature up to about 150° C.; (2) substantially neutralizing the intermediate reaction mixture thus formed; and (3) reacting the neutralized intermediate with at least one compound which contains an amino group having at least one —NH— group. These 2-step condensates can be made from (a) phenol functionalized polymer and (b) formaldehyde, or reversible polymer thereof, (e.g., trioxane, paraformaldehyde) or functional equivalent thereof, (e.g., methylol) and (c) an alkylene polyamine such as ethylene polyamines having between 2 and 10 nitrogen atoms.

Derivatized Polymer From Reactive Metals/Metal Compounds

Useful reactive metals or reactive metal compounds are those which will form metal salts or metal-containing complexes with the functionalized polymer. Metal complexes are typically achieved by reacting the functionalized polymers with amines and/or alcohols as discussed above and also with complex forming reactants either during or subsequent to amination.

Reactive metal compounds for use in the formation of complexes with the reaction products of functionalized polymer and amines include those disclosed in U.S. Pat. No. 3,306,908. Complex-forming metal reactants include the nitrates, nitrites, halides, carboxylates, phosphates, phosphites, sulfates, sulfites, carbonates, borates, and oxides of cadmium as well as metals having atomic numbers from 24 to 30 (including chromium, manganese, iron, cobalt, nickel, copper and zinc). These metals are the so-called transition or coordination metals, i.e., they are capable of forming complexes by means of their secondary or coordination valence. Specific examples of the complex-forming metal compounds useful as the metal reactant are cobaltous nitrate, cobaltous oxide, cobaltic oxide, cobalt nitrite, cobaltic phosphate, cobaltous chloride, cobaltic chloride, cobaltous carbonate, chromous acetate, chromic acetate, chromic bromide, chromous chloride, chromic fluoride, chromous oxide, chromium dioxide, chromic oxide, chromic sulfite, chromous sulfate heptahydrate, chromic sulfate, chromic formate, chromic hexanoate, chromium oxychloride, chromic phosphite, manganous acetate, manganous benzoate, manganous carbonate, manganese dichloride, manganese trichloride, manganous citrate, manganous formate, manganous nitrate, manganous oxalate, manganese monooxide, manganese dioxide, manganese trioxide, manganese heptoxide, manganic phosphate, manganous pyrophosphate, manganic metaphosphate, manganous hypophosphite, manganous valerate, ferrous acetate, ferric benzoate, ferrous bromide, ferrous carbonate, ferric formate, ferrous lactate, ferrous nitrate, ferrous oxide, ferric oxide, ferric hypophosphite, ferric sulfate, ferrous sulfite, ferric hydrosulfite, nickel dibromide, nickel dichloride, nickel nitrate, nickel dioleate, nickel stearate, nickel sulfite, cupric propionate, cupric acetate, cupric metaborate, cupric benzoate, cupric formate, cupric laurate, cupric nitrite; cupric oxychloride, cupric palmitate, cupric salicylate, zinc benzoate, zinc borate, zinc bromide, zinc chromate, zinc dichromate, zinc iodide, zinc lactate, zinc nitrate, zinc oxide, zinc stearate, zinc sulfite, cadmium benzoate, cadmium carbonate, cadmium butyrate, cadmium chloroacetate, cadmium fumarate, cadmium nitrate, cadmium dihydrogenphosphate, cadmium sulfite, and cadmium oxide. Hydrates of the above compounds are especially convenient for use in the process of this invention.

U.S. Pat. No. 3,306,908 is expressly incorporated herein by reference for its discussion of reactive metal compounds suitable for forming such complexes and its disclosure of processes for preparing the complexes. Basically, those processes are applicable to the carboxylic derivative compositions of the functionalized polymer of this invention with the amines as described above by substituting, or on an equivalent basis, the functionalized polymer of this invention with the high molecular weight carboxylic acid functionalized polymer disclosed in U.S. Pat. No. 3,306,908.

U.S. Pat. No. Re. 26,433 discloses metals useful in preparing salts from acid functionalized polymer and/or an amine derivatized polymer as described hereinabove. Metal salts are prepared, according to this patent, from alkali metals, alkaline earth metals, zinc, cadmium, lead, cobalt and nickel. Examples of a reactive metal compound suitable for use are sodium oxide, sodium hydroxide, sodium carbonate, sodium methylate, sodium propylate, sodium pentylate, sodium phenoxide, potassium oxide, potassium hydroxide, potassium carbonate, potassium methylate, potassium pentylate, potassium phenoxide, lithium oxide, lithium hydroxide, lithium carbonate, lithium pentylate, calcium oxide, calcium hydroxide, calcium carbonate, calcium methylate, calcium ethylate, calcium propylate, calcium chloride, calcium fluoride, calcium pentylate, calcium phenoxide, calcium nitrate, barium oxide, barium hydroxide, barium carbonate, barium chloride, barium fluoride, barium methylate, barium propylate, barium pentylate, barium nitrate, magnesium oxide, magnesium hydroxide, magnesium carbonate, magnesium ethylate, magnesium propylate, magnesium chloride, magnesium bromide, barium, iodide, magnesium phenoxide, zinc oxide, zinc hydroxide, zinc carbonate, zinc methylate, zinc propylate, zinc pentylate, zinc chloride, zinc fluoride, zinc nitrate trihydrate, cadmium oxide, cadmium hydroxide, cadmium carbonate, cadmium methylate, cadmium propylate, cadmium chloride, cadmium bromide, cadmium fluoride, lead oxide, lead hydroxide, lead carbonate, lead ethylate, lead pentylate, lead chloride, lead fluoride, lead iodide, lead nitrate, nickel oxide, nickel hydroxide, nickel carbonate, nickel chloride, nickel bromide, nickel fluoride, nickel methylate, nickel pentylate, nickel nitrate hexahydrate, cobalt oxide, cobalt hydroxide, cobaltous bromide, cobaltous chloride, cobalt butylate, cobaltous nitrate hexahydrate, etc. The above metal compounds are merely illustrative of those useful in this invention and the invention is not to be considered as limited to such.

U.S. Pat. No. Re. 26,433 is expressly incorporated herein by reference for its disclosure of useful reactive metal compounds as, and processes for, utilizing these compounds in the formation of salts. Again, in applying the teachings of this patent to the present invention, it is only necessary to substitute the functionalized polymer of this invention on an equivalent weight basis for the high molecular weight carboxylic acylating agents disclosed in this reissue patent.

U.S. Pat. No. 3,271,310 discloses the preparation of metal salt of high molecular weight carboxylic acid material, in particular alkenyl succinic acids which can be adapted to make the present functionalized polymer. The metal salts disclosed therein are acid salts, neutral salts, and basic salts. Among the illustrative reactive metal compounds used to prepare the acidic, neutral and basic salts of the acid functionalized polymer are those disclosed in U.S. Pat. No. 3,271,310 including lithium oxide, lithium hydroxide, lithium carbonate, lithium pentylate, sodium oxide, sodium hydroxide, sodium carbonate, sodium methylate, sodium propylate, sodium phenoxide, potassium oxide, potassium hydroxide, potassium carbonate, potassium methylate, silver oxide, silver carbonate, magnesium oxide, magnesium hydroxide, magnesium carbonate, magnesium ethylate, magnesium propylate, magnesium phenoxide, calcium oxide, calcium hydroxide, calcium carbonate, calcium methylate, calcium propylate, calcium pentylate, zinc oxide, zinc hydroxide, zinc carbonate, zinc propylate, strontium oxide, strontium hydroxide, cadmium oxide, cadmium hydroxide, cadmium carbonate, cadmium ethylate, barium oxide, barium hydroxide, barium hydrate, barium carbonate, barium ethylate, barium pentylate, aluminum oxide, aluminum propylate, lead oxide, lead hydroxide, lead carbonate, tin oxide, tin butylate, cobalt oxide, cobalt hydroxide, cobalt carbonate, cobalt pentylate, nickel oxide, nickel hydroxide, and nickel carbonate. The present invention is not to be considered as limited to the use of the above metal compounds; they are presented merely to illustrate the metal compounds included within the invention.

U.S. Pat. No. 3,271,310 is expressly incorporated herein by reference for its disclosure of suitable reactive metal compounds suitable for forming salts of the functionalized polymer of this invention as well as illustrative processes for preparing salts of these reagents. As will be apparent, the processes of U.S. Pat. No. 3,271,310 are applicable to this invention merely by substituting on an equivalent weight basis, the functionalized polymer of this invention for the high molecular weight carboxylic acids of the patent.

Derivatization Reactant Ratios

From the foregoing description, it is apparent that the appropriate functionalized polymer of this invention can be reacted with any individual derivatizing compound such as amine, alcohol, reactive metal, reactive metal compound or any combination of two or more of any of these; that is, for example, one or more amines, one or more alcohols, one or more reactive metals or reactive metal compounds, or a mixture of any of these. The mixture can be a mixture of two or more amines, a mixture of two or more alcohols, a mixture of two or more metals or reactive metal compounds, or a mixture of two or more components selected from amines and alcohols, from amines and reactive metals or reactive metal compounds, from alcohols and reactive metal compounds, or one or more components from each of the amines, alcohols, and reactive metals or reactive metal compounds. Furthermore, the appropriate functionalized polymer of this invention can be reacted with the amines, alcohols, reactive metals, reactive metal compounds, or mixtures thereof, as described above, simultaneously (concurrently) or sequentially in any order of reaction.

In any of the foregoing derivatizing reactions involving the use of the functionalized polymer of this invention, substantially inert organic liquid diluents may be used to facilitate mixing, temperature control, and handling of the reaction mixture. Suitable diluents include aliphatic, cycloaliphatic, and aromatic hydrocarbons as well as the corresponding halogenated hydrocarbons, particularly chlorinated hydrocarbons. These diluents are exemplified by benzene, toluene, xylene, chlorobenzenes, hexane, heptane, cyclohexane, or mixtures of these. Mineral oils particularly low viscosity mineral oils are very good diluents. Other organic solvents can also be employed such as ethers, sulfoxide, sulfones, and the like. Where one or more of the reactants themselves are liquid at the reaction temperature, the reactant itself functions as a diluent and it may be convenient sometimes to employ an excess amount of the reactant to serve this purpose.

The following discussion is intended to explain and illustrate what is meant by the term "equivalent" with respect to various classes of reactants as the term is used herein. As will be shown a "derivatizing ratio" is defined as the molar equivalent ratios of the functionalized polymer to derivatizing compound.

The number of equivalents which characterize the functionalized polymer of the invention depends upon the number of functional groups present within the structure thereof as expressed by its functionality (F*).

Thus, a functionalized polymer having a functionality (F*) of 3 has an average of three equivalents per mole. Alternatively, 6,000 Mn polymer functionalized with mono acid to a functionality of 3 possesses an equivalent weight of 2000 per mole.

A nitrogen-containing derivatizing compound such as an amine reactant, is regarded as having a number of equivalents per mole corresponding to the average number of reactive amine groups, i.e., primary or secondary amine groups, per molecule. Thus, ammonia has one equivalent per mole; urea, hydrazine, ethylenediamine, and piperazine have two equivalents per mole; and tetraethylene pentamine has five equivalents per mole. Mixtures of nitrogen-containing reactants such as mixtures of alkylene polyamines are regarded as having an equivalent weight equal to the weight of the mixture divided by the number of reactive nitrogen atoms present. For example, 1,000 parts of a polyethylene polyamine mixture containing 37 percent by weight nitrogen has an equivalent weight of about 38.

In like manner, hydroxyaromatic compounds and alcohols have equivalent weights equal to their molecular weights divided by the number of functional —OH groups per molecule. Or, from another viewpoint, they possess a number of equivalents per mole equal to the number of —OH groups. Thus, pentaerythritol has four equivalents per mole and an equivalent weight of 34. Phenol has one equivalent per mole so that its equivalent weight equals its molecular weight.

Metal reactants have an equivalent weight equal to their molecular weight divided by the product of the number of metal atoms per molecule of reactant times the valence of the metal. Since most of the metal reactants have only one metal per atom per molecule, the equivalent weight of the metal reactant is normally the molecular weight divided by the valence of the metal. Stated differently, a metal reactant normally has a number of equivalents per mole equal to the valence of the metal. For example, calcium hydroxide, zinc chloride, and barium oxide have two equivalents per mole; sodium hydroxide and lithium hydroxide have one equivalent per mole.

From what has been said hereinabove, it will be apparent to those skilled in the art that the reaction products produced by reacting functionalized polymer of this invention with derivatizing compounds such as alcohols, nitrogen-containing reactants, metal reactants, and the like will, in fact, be mixtures of various reaction products. This is especially apparent in view of the fact that the functionalized polymers themselves can be mixtures of materials. For example, if acid functionalized polymer is reacted with a polyol, the esterification product can contain esters wherein only one hydroxyl group has been esterified, esters wherein two or more of the hydroxy groups have been esterified by the same or different functionalized polymer, esters where all of the carboxyl groups of an acid functionalized polymer have been esterified, esters where less than all of the carboxyl groups of functionalized polymer have been esterified, and the like. However, for purposes of the present invention it is not necessary to know the specific structure of each derivatized component of the reaction mixtures produced, since it is not necessary to isolate these components in order to use them as additives, e.g., in lubricants and fuels.

While the functionalized polymers themselves possess some dispersant characteristics and can be used as dispersant additives in lubricants and fuels, best results are achieved when at least about 30, preferably, at least about 50, most preferably 100% of the functional groups are derivatized. Furthermore, it is not necessary that all the functional groups of the functionalized polymer be derivatized to the same product or even the same type of product. Thus, functionalized polymer may be first reacted with one or more alcohols to convert a portion of the acid functional groups to ester groups and thereafter this ester product can be reacted with one or more amines and/or one or more metal reactants to convert all or a portion of the remaining carboxyl functions to a derivatized amine groups such as amides, imides, amidines, amine salt groups, and the like or metal salt groups.

In view of the above, the "derivatization ratio" can vary considerably, depending, e.g., on the reactants and type of bonds sought to be formed. Thus, while any derivatization ratio effective to impart the desired properties to the derivatized polymer can be employed, it is contemplated that such effective ratios will range typically from about 0.05:1 to about 4:1, preferably 0.5:1 to about 2.0:1 (e.g. 0.6:1 to about 1.5:1) and most preferably 0.7:1 to about 1:1 (e.g. 0.8:1 to 0.9:1). As can be seen from the above ratios it is preferred to employ an excess of derivatizing compound particularly where the unreacted excess thereof can be easily stripped from the reaction mixture.

Post Treatment

Another aspect of this invention involves the post treatment of derivatized polymer. The processes for post-treating derivatized polymer are analogous to the post-treating processes used with respect to conventional dispersants and MFVI's of the prior art. Accordingly, the same reaction conditions, ratio of reactants and the like can be used. Reference is made to U.S. Pat. No. 5,017,199.

Accordingly, derivatized polymer can be post-treated with such reagents as urea, thiourea, carbon disulfide, aldehydes, ketones, carboxylic acids, hydrocarbon-substituted succinic anhydrides, nitriles, epoxides, boron compounds, phosphorus compounds or the like. Exemplary materials of this kind are described in the following U.S. Pat. Nos. 3,036,003; 3,200,107; 3,254,025; 3,278,550; 3,281,428; 3,282,955; 3,366,569; 3,373,111; 3,442,808; 3,455,832; 3,493,520; 3,513,093; 3,539,633; 3,579,450; 3,600,372; 3,639,242; 3,649,659; 3,703,536 and 3,708,522 which are herein incorporated by reference.

The amine derivatized polymers of the present invention as described above can be post-treated, particularly for use as dispersants and viscosity index improvers by contacting said polymers with one or more post-treating reagents selected from the group consisting of boron oxide, boron oxide hydrate, boron halides, boron acids, esters of boron acids, carbon disulfide, sulfur, sulfur chlorides, alkenyl cyanides, aldehydes, ketones, urea, thiourea, guanidine, dicyanodiamide, hydrocarbyl phosphates, hydrocarbyl phosphites, hydrocarbyl thiophosphates, hydrocarbyl thiophosphites, phosphorus sulfides, phosphorus oxides, phosphoric acid, hydrocarbyl thiocyanates, hydrocarbyl isocyanates, hydrocarbyl isothiocyanates, epoxides, episulfides, formaldehyde or formaldehyde-producing compounds plus phenols, and sulfur plus phenols, and $C_1$ to $C_{30}$ hydrocarbyl substituted succinic acids and anhydrides (e.g., succinic anhydride, dodecyl succinic anhydride and the like), fumaric acid, itaconic acid, maleic acid, maleic anhydride, chloromaleic acid, chloromaleic anhydride, acrylic acid, methacrylic acid, crotonic acid, cinnamic acid, and lower alkyl (e.g., $C_1$ to $C_4$ alkyl) acid esters of the foregoing, e.g., methyl maleate, ethyl fumarate, methyl fumarate, and the like.

For example, the amine derivatized polymers can be treated with a boron compound selected from the class consisting of boron oxide, boron halides, boron acids and esters of boron acids in an amount to provide from about 0.1 atomic proportion of boron for each mole of said nitrogen composition to about 20 atomic proportions of boron for each atomic proportion of nitrogen of said nitrogen composition. Borated derivatized polymer useful as dispersants can contain from about 0.05 to 2.0 wt. %, e.g. 0.05 to 0.7 wt. % boron based on the total weight of said borated nitrogen-containing dispersant compound. The boron, which appears to be in the product as dehydrated boric acid polymers (primarily $(HBO_2)_3$), is believed to attach to the derivatized polymer as amine salts, e.g., the metaborate salt of said amine derivatized polymers.

Treating is readily carried out by adding from about 0.05 to 4, e.g. 1 to 3 wt. % (based on the weight of said derivatized polymer) of said boron compound, preferably boric acid which is most usually added as a slurry to said nitrogen compound and heating with stirring at from about 135° C. to 190° C., e.g. 140° C. to 170° C., for from 1 to 5 hours followed by nitrogen stripping at said temperature ranges.

Since post-treating processes involving the use of these post-treating reagents is known insofar as application to high molecular weight nitrogen-containing dispersants of the prior art, further descriptions of these processes herein is unnecessary. In order to apply the prior art processes to the compositions of this invention, all that is necessary is that reaction conditions, ratio of reactants, and the like as described in the prior art, be applied to the novel compositions of this invention. The following U.S. patents are expressly incorporated herein by reference for their disclosure of post-treating processes and post-treating reagents applicable to the compositions of this invention: U.S. Pat. Nos. 3,087,936; 3,200,107; 3,254,025; 3,256,185; 3,278,550; 3,281,428; 3,282,955; 3,284,410; 3,338,832; 3,344,069; 3,366,569; 3,373,111; 3,367,943; 3,403,102; 3,428,561; 3,502,677; 3,513,093; 3,533,945; 3,541,012; 3,639,242; 3,708,522; 3,859,318; 3,865,813; 3,470,098; 3,369,021; 3,184,411; 3,185,645; 3,245,908; 3,245,909; 3,245,910; 3,573,205; 3,692,681; 3,749,695; 3,865,740; 3,954,639; 3,458,530; 3,390,086; 3,367,943; 3,185,704; 3,551,466; 3,415,750; 3,312,619; 3,280,034; 3,718,663; 3,652,616; UK Patent No. 1,085,903; UK Patent No. 1,162,436; U.S. Pat. No. 3,558,743. Particularly preferred for post-treating is the process disclosed in commonly assigned U.S. Serial No. 992,413, filed Dec. 17, 1992, entitled Improved Low Sediment Process for Forming Borated Dispersant, Docket No. PT-849.

The derivatized polymers of the present invention can also be treated with polymerizable lactones (such as epsilon-caprolactone) to form dispersant adducts having the moiety —[C(O)(C$_2$)$_z$O]$_m$H, wherein z is a number of from 4 to 8 (e.g., 5 to 7) and m has an average value of from about 0 to 100 (e.g., 0.2 to 20). The derivatized polymers of this invention, particularly for use as a dispersant, can be post-treated with a C$_5$ to C$_9$ lactone, e.g., epsilon-caprolactone, by heating a mixture of the polymers and lactone in a reaction vessel in the absence of a solvent at a temperature of about 50° C. to about 200° C., more preferably from about 75° C. to about 180° C., and most preferably from about 90° C. to about 160° C., for a sufficient period of time to effect reaction. Optionally, a solvent for the lactone, dispersant material and/or the resulting adduct may be employed to control viscosity and/or the reaction rates.

In one preferred embodiment, the C$_5$ to C$_9$ lactone, e.g., epsilon-caprolactone, is reacted with a nitrogen containing polymer (i.e., dispersant) in a 1:1 mole ratio of lactone to dispersant material. In practice, the ratio of lactone to polymer may vary considerably as a means of controlling the length of the sequence of the lactone units in the adduct. For example, the mole ratio of the lactone to the dispersant material may vary from about 10:1 to about 0.1:1, more preferably from about 5:1 to about 0.2:1, and most preferably from about 2:1 to about 0.4:1. It is preferable to maintain the average degree of polymerization of the lactone monomer below about 100, with a degree of polymerization on the order of from about 0.2 to about 50 being preferred, and from about 0.2 to about 20 being more preferred. For optimum dispersant performance the nitrogen containing polymer as a dispersant, sequences of from about 1 to about 5 lactone units in a row are preferred.

Catalysts useful in the promotion of the lactone-dispersant material reactions are selected from the group consisting of stannous octanoate, stannous hexanoate, tetrabutyl titanate, a variety of organic-based acid catalysts and amine catalysts, as described on page 266, and forward, in a book chapter authored by R. D. Lundberg and E. F. Cox, entitled "Kinetics and Mechanisms of Polymerization: Ring Opening Polymerization", edited by Frisch and Reegen, published by Marcel Dekker in 1969, wherein stannous octanoate is an especially preferred catalyst. The catalyst is added to the reaction mixture at a concentration level of about 50 to about 10,000 parts per weight of catalyst per one million parts of the total reaction mixture.

Exemplary of adducts formed by reaction of dispersant materials of this invention and epsilon-caprolactone are those adducts illustrated by the following equation:

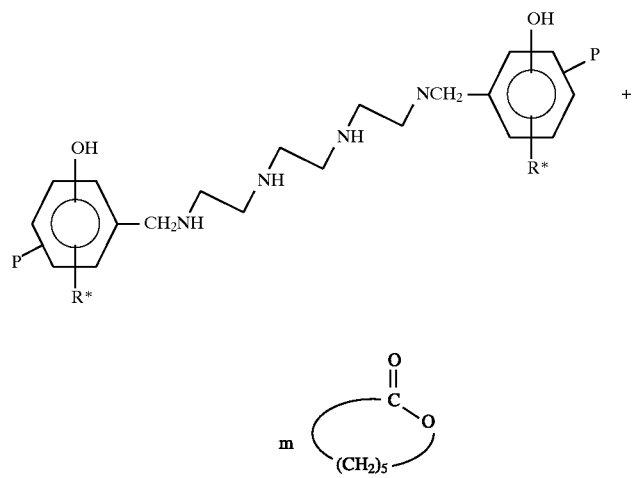

-continued

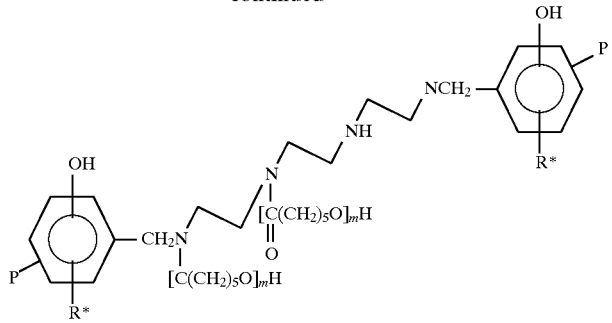

wherein m and P are as defined above. R can be H, a hydrocarbon of 1 to 18 carbons, or a halogen. The reactions of such lactones with dispersant materials containing nitrogen or ester groups is more completely described in U.S. Pat. Nos. 4,906,394; 4,866,141; 4,866,135; 4,866,140; 4,866,142; 4,866,139 and 4,963,275, the disclosure of each of which is hereby incorporated by reference in its entirety.

Lubricating Compositions

The above discussions relate to a variety of materials including the polymer per se, functionalized polymer, the derivatized polymer, and post-treated derivatized polymer.

The polymer per se has a variety of utilities depending on its molecular weight including synthetic base oil (for lower molecular weights), adhesive coatings for intermediate molecular weights, and as elastomeric compositions for high molecular weights, e.g. films, etrudoles, composites, and the like.

The functionalized polymer, in addition to acting as intermediates for dispersant and MFVI manufacture, can be used as molding release agents, molding agents, metal working lubricants, point thickeners and the like.

The primary utility for all the above-described material, from polymer all the way through post-treated derivatized polymer, is as and additive for oleaginous compositions. For ease of discussion the above-mentioned materials are collectively and individually referred to herein as additives when used in the context of an oleaginous composition containing such "additives".

Accordingly, the additives of the present invention may be used by incorporation and dissolution into an oleaginous material such as fuels and lubricating oils. When the additives of this invention are used in normally liquid petroleum fuels such as middle distillates boiling from about 65° C. to 430° C., including kerosene, diesel fuels, home heating fuel oil, jet fuels, etc., a concentration of the additives in the fuel in the range of typically from about 0.001 to about 0.5, and preferably 0.005 to about 0.15 wt. %, based on the total weight of the composition, will usually be employed. Useful compositions and additives are disclosed in U.S. Pat. No. 5,102,566, hereby incorporated by reference.

The additives of the present invention find their primary utility in lubricating oil compositions which employ a base oil in which the additives are dissolved or dispersed therein. Such base oils may be natural or synthetic. Base oils suitable for use in preparing the lubricating oil compositions of the present invention include those conventionally employed as crankcase lubricating oils for spark-ignited and compression-ignited internal combustion engines, such as automobile and truck engines, marine and railroad diesel engines, and the like. Advantageous results are also achieved by employing the additive mixtures of the present invention in base oils conventionally employed in and/or adapted for use as power transmitting fluids, universal tractor fluids and hydraulic fluids, heavy duty hydraulic fluids, power steering fluids and the like. Gear lubricants, industrial oils, pump oils and other lubricating oil compositions can also benefit from the incorporation therein of the additives of the present invention.

These lubricating oil formulations conventionally contain several different types of additives that will supply the characteristics that are required in the formulations. Among these types of additives are included viscosity index improvers, antioxidants, corrosion inhibitors, detergents, dispersants, pour point depressants, antiwear agents, friction modifiers, etc.

The additives of the present invention, particularly those adapted for use as dispersants or viscosity modifiers, can be incorporated into a lubricating oil in any convenient way. Thus, they can be added directly to the oil by dispersing or dissolving the same in the oil at the desired level of concentrations of the additive. Such blending into the additional lube oil can occur at room temperature or elevated temperatures. Alternatively, the additives can be blended with a suitable oil-soluble solvent and base oil to form a concentrate, and then blending the concentrate with a lubricating oil basestock to obtain the final formulation. Such dispersant concentrates will typically contain (on an active ingredient (A.I.) basis) from about 10 to about 80 wt. %, typically about 20 to about 60 wt. %, and preferably from about 40 to about 50 wt. %, additive, and typically from about 40 to 80 wt. %, preferably from about 40 to 60 wt. %, base oil, i.e., hydrocarbon oil based on the concentrate weight. The lubricating oil basestock for the additive typically is adapted to perform a selected function by the incorporation of additional additives therein to form lubricating oil compositions (i.e., formulations).

Usually these concentrates may be diluted with 3 to 100, e.g., 5 to 40 parts by weight of lubricating oil, per part by weight of the additive package, in forming finished lubricants, e.g. crankcase motor oils. The purpose of concentrates, of course, is to make the handling of the various materials less difficult and awkward as well as to facilitate solution or dispersion in the final blend. Thus, the additives of the present invention and formulations containing them would usually be employed in the form of a 40 to 50 wt. % concentrate, for example, in a lubricating oil fraction.

The additives of the present invention will be generally used in admixture with a lube oil basestock, comprising an oil of lubricating viscosity, including natural and synthetic lubricating oils and mixtures thereof. Useful oils are described in U.S. Pat. Nos. 5,017,299 and 5,084,197.

Natural oils include animal oils and vegetable oils (e.g., castor, lard oil) liquid petroleum oils and hydrorefined, solvent-treated or acid-treated mineral lubricating oils of the paraffinic, naphthenic and mixed paraffinic-naphthenic types. Oils of lubricating viscosity derived from coal or shale are also useful base oils.

Synthetic lubricating oils include hydrocarbon oils and halosubstituted hydrocarbon oils such as polymerized and interpolymerized olefins (e.g., polybutylenes, polypropylenes, propylene-isobutylene copolymers, chlorinated polybutylenes, etc.) poly(hexenes), poly(1-octenes), poly(1-decenes), etc. and mixtures thereof; alkylbenzenes (e.g., dodecyl-benzenes, tetradecylbenzenes, dinonylbenzenes, di-(2-ethylhexyl)-benzenes, etc.); polyphenyls (e.g., biphenyls, terphenyls, alkylated diphenyl ethers and alkylated diphenyl sulfides and the derivatives, analogs and homologs thereof and the like.

Alkylene oxide polymers and interpolymers and derivatives thereof where the terminal hydroxyl groups have been modified by esterification, etherification, etc., constitute another class of known synthetic lubricating oils. These are exemplified by polyoxyalkylene polymers prepared by polymerization of ethylene oxide or propylene oxide, the alkyl and aryl ethers of these polyoxyalkylene polymers (e.g., methylpoly isopropylene glycol ether having an average molecular weight of 1000, diphenyl ether of polyethylene glycol having a molecular weight of 500 to 1,000, diethyl ether of polypropylene glycol having a molecular weight of 1,000 to 1,500; and mono- and polycarboxylic esters thereof, for example, the acetic acid esters, mixed $C_3$ to $C_8$ fatty acid esters and $C_{13}$ Oxo acid diester of tetraethylene glycol.

Another suitable class of synthetic lubricating oils comprises the esters of dicarboxylic acids (e.g., phthalic acid, succinic acid, alkyl succinic acids and alkenyl succinic acids, maleic acid, azelaic acid, suberic acid, sebasic acid, fumaric acid, adipic acid, linoleic acid dimer, malonic acid, alkylmalonic acids, alkenyl malonic acids) with a variety of alcohols (e.g., butyl alcohol, hexyl alcohol, dodecyl alcohol, 2-ethylhexyl alcohol, ethylene glycol, diethylene glycol monoether, propylene glycol). Specific examples of these esters include dibutyl adipate, di(2-ethylhexyl)sebacate, di-n-hexyl fumarate, dioctyl sebacate, diisooctyl azelate, diisodecyl azelate, dioctyl phthalate didecyl phthalate, dieicosyl sebacate, the 2-ethylhexyl diester of linoleic acid dimer, and the complex ester formed by reacting 1 mole of sebacic acid with 2 moles of tetraethylene glycol and 2 moles of 2-ethylhexanoic acid.

Esters useful as synthetic oils also include those made from $C_5$ to $C_{12}$ monocarboxylic acids and polyols and polyol ethers such as neopentyl glycol, trimethylolpropane, pentaerythritol, dipentaerythritol and tripentaerythritol.

Silicon-based oils such as the polyalkyl-, polyaryl-, polyalkoxy-, or polyaryloxysiloxane oils and silicate oils comprise another useful class of synthetic lubricants; they include tetraethyl silicate, tetraisopropyl silicate, tetra-(2-ethylhexyl)silicate, tetra-(4-methyl-2-ethylhexyl)silicate, tetra-(p-tertbutylphenyl)silicate, hexa-(4-methyl-2-pentoxy) disiloxane, poly(methyl)siloxanes and poly(methylphenyl) siloxanes. Other synthetic lubricating oils include liquid esters of phosphorus-containing acids (e.g., tricresyl phosphate, trioctyl phosphate, diethyl ester of decylphosphonic acid) and polymeric tetrahydrofurans.

Unrefined, refined and rerefined oils can be used in the lubricants of the present invention. Unrefined oils are those obtained directly from a natural or synthetic source without further purification treatment. For example, a shale oil obtained directly from retorting operations, a petroleum oil obtained directly from distillation or ester oil obtained directly from an esterification process and used without further treatment would be an unrefined oil. Refined oils are similar to the unrefined oils except they have been further treated in one or more purification steps to improve one or more properties. Many such purification techniques, such as distillation, solvent extraction, acid or base extraction, filtration and percolation are known to those skilled in the art. Rerefined oils are obtained by processes similar to those used to obtain refined oils applied to refined oils which have been already used in service. Such rerefined oils are also known as reclaimed or reprocessed oils and often are additionally processed by techniques for removal of spent additives and oil breakdown products.

Additional Formulation Components

As indicated above, the additives of the present invention may be mixed with other types of additives selected to perform at least one desired function. Typical of such formations are detergent/inhibitor, viscosity modification, wear inhibitor, oxidation inhibitor, corrosion inhibitor, friction modifier, foam inhibitor, rust inhibitor, demulsifier, lube oil flow improvers, and seal swell control. Each class of such additional additions is discussed in more detail below.

Detergent/Inhibitor

Metal-containing detergents which can also act as rust inhibitors hence the term "detergent/inhibitor" or simply "DI", include the metal salts of sulphonic acids, alkyl phenols, sulphurized alkyl phenols, alkyl salicylates, naphthenates, and other oil soluble mono- and dicarboxylic acids as well as metal-containing complexes thereof. Usually these metal-containing detergent/inhibitors are used in lubricating oil in amounts of about 0.01 to 10, e.g. 0.1 to 5 wt. %, based on the weight of the total lubricating composition. Marine diesel lubricating oils typically employ such metal-containing rust inhibitors and detergents in amounts of up to about 20 wt. %.

Metal detergent/inhibitors are generally basic (viz, overbased) alkali or alkaline earth metal salts (or mixtures thereof, e.g. mixtures of Ca and Mg salts) of one or more organic sulfonic acid (generally a petroleum sulfonic acid or a synthetically prepared alkaryl sulfonic acid), petroleum naphthenic acids, alkyl benzene sulfonic acids, alkyl phenols, alkylene-bis-phenols, oil soluble fatty acids and the like, such as are described in U.S. Pat. Nos. 2,501,731; 2,616,904; 2,616,905; 2,616,906; 2,616,911; 2,616,924; 2,616,925; 2,617,049; 2,777,874; 3,027,325; 3,256,186; 3,282,835; 3,384,585; 3,373,108; 3,350,308; 3,365,396; 3,342,733; 3,320,162; 3,312,618; 3,318,809 and 3,562,159, the disclosures of which are herein incorporated by reference. Among the petroleum sulfonates, the most useful products are those prepared by the sulfonation of suitable petroleum fractions with subsequent removal of acid sludge and purification. Synthetic alkaryl sulfonic acids are usually prepared from alkylated benzenes such as the Friedel-Crafts reaction product of benzene and a polymer such as tetrapropylene, $C_{18}$ to $C_{24}$ hydrocarbon polymer, etc. Suitable acids may also be obtained by sulfonation of alkylated derivatives of such compounds as diphenylene oxide thianthrene, phenolthioxine, diphenylene sulfide, phenothiazine, diphenyl oxide, diphenyl sulfide, diphenylamine, cyclohexane, decahydro naphthalene and the like.

The terms "basic salt" and "overbased salt" are used to designate metal salts wherein the metal is present in stoichiometrically larger amounts than the acid radical.

As used in this discussion, the term "complex" refers to basic metal salts which contain metal in an amount in excess of that present in a neutral or normal metal salt. The "base number" of a complex is the number of milligrams of KOH to which one gram of the complex is equivalent as measured by titration.

The commonly employed methods for preparing the basic salts involve heating a mineral oil solution of the normal metal salt of the acid with a metal neutralizing agent. The use of a "promoter" in the neutralization step to aid the incorporation of a large excess of metal is known and is preferred for the preparation of such compositions.

Examples of compounds useful as the promoter include phenolic substances such as phenol, naphthol, alkyl phenols, thiophenol, sulfurized alkyl phenols, and condensation products of formaldehyde with a phenolic substance; alcohols such as methanol, 2-propanol, octanol, cellosolve, carbitol, ethylene glycol, stearyl alcohol and cyclohexanol; and amines such as aniline, phenylene diamine, phenothiazine, phenol betanaphthylamine and dodecylamine.

The alkali and alkaline earth metal compounds which may be used in neutralizing these acids to provide the metal salts include the oxides and hydroxides, alkoxides, carbonates, carboxylate, sulfide, hydrosulfide, nitrate, borates and ethers of magnesium, calcium, and barium. Examples are calcium oxide, calcium hydroxide, magnesium acetate and magnesium borate. As noted, the alkaline earth metal compound is used in excess of that required to complete neutralization of the alkaryl sulfonic acids. Generally, the amount ranges from about 100 to 220%, although it is preferred to use at least 125%, of the stoichiometric amount of metal required for complete neutralization.

Various other preparations of basic alkaline earth metal alkaryl sulfonates are known, such as U.S. Pat. Nos. 3,150,088 and 3,150,089 wherein overbasing is accomplished by hydrolysis of an alkoxide-carbonate complex with the alkaryl sulfonate in a hydrocarbon solvent-diluent oil.

An example of a convenient process for the preparation of the metal-containing complexes employs an oil-soluble sulfonic acid, such as a synthetically prepared didodecylbenzene sulfonic acid, which is mixed with an excess of lime (e.g., 10 equivalents per equivalent of the acid) and a promoter such as methanol, heptylphenol, or mixture thereof, and a solvent such as mineral oil, at 50° C. to 150° C. and the process mass is then carbonated until a homogeneous mass is obtained. Complexes of sulfonic acids, carboxylic acids, and mixtures thereof are obtainable by processes such as are described in U.S. Pat. No. 3,312,618. Another example is the preparation of a magnesium sulfonate normal magnesium salt thereof, an excess of magnesium oxide, water, and preferably also an alcohol such as methanol.

The carboxylic acids useful for preparing sulfonate carboxylate complexes, and carboxylate complexes, i.e., those obtainable from processes such as the above wherein a mixture of sulfonic acid and carboxylic acid or a carboxylic acid alone is used in lieu of the sulfonic acid, are oil-soluble acids and include primarily fatty acids which have at least about 12 aliphatic carbon atoms and not more than about 24 aliphatic carbon atoms. Examples of these acids include: palmitic, stearic, myristic, oleic, linoleic, dodecanoic, behenic, etc. Cyclic carboxylic acids may also be employed. These include aromatic and cycloaliphatic acids. The aromatic acids are those containing a benzenoid structure (i.e., benzene, naphthalene, etc.) and an oil-solubilizing radical or radicals having a total of at least about 15 to 18 carbon atoms, preferably from about 15 to about 200 carbon atoms. Examples of the aromatic acids include: stearyl-benzoic acid, phenyl stearic acid, mono- or polywax-substituted benzoic or naphthoic acids wherein the wax group consists of at least about 18 carbon atoms, cetyl hydroxybenzoic acids, etc. The cycloaliphatic acids contemplated have at least about 12, usually up to about 30 carbon atoms. Examples of such acids are petroleum naphthenic acids, cetyl cyclohexane carboxylic acids, dilauryl decahydro naphthalene carboxylic acids, dioctyl cyclopentane carboxylic acids, etc. The thiocarboxylic acid analogs of the above acids, wherein one or both of the oxygen atoms of the carboxyl group are replaced by sulfur, are also contemplated.

The ratio of the sulfonic acid to the carboxylic acid in mixtures is typically at least 1:1 (on a chemical equivalent basis) and is usually less than 5:1, preferably from 1:1 to 2:1.

Usually, the basic composition obtained according to the above-described method is treated with carbon dioxide until its total base number (TBN) is less than about 50, as determined by ASTM procedure D-2896. In many instances, it is advantageous to form the basic product by adding a Ca or Mg base portionwise and carbonating after the addition of each portion. Products with very high metal ratios (10 or above) can be obtained by this method. As used herein, the term "metal ratio" refers to the ratio of total equivalents of alkaline earth metal in the sulfonate complex to equivalents of sulfonic acid anion therein. For example, a normal sulfonate has a metal ratio of 1.0 and a calcium sulfonate complex containing twice as much calcium as the normal salt has a metal ratio of 2.0. The overbased metal detergent compositions usually have metal ratios of at least about 1.1, for example, from about 1.1 to about 30, with metal ratios of from about 2 to 20 being preferred.

Neutral metal sulfonates are frequently used as rust inhibitors. Polyvalent metal alkyl salicylate, naphthenate and phenate materials are known additives for lubricating oil compositions to improve their high temperature performance and to counteract deposition of carbonaceous matter on pistons (U.S. Pat. No. 2,744,069). They can be methylene bridged or sulfur bridged.

The sulfurized metal phenates represent a preferred class of phenates and can be considered the "metal salt of a phenol sulfide" which thus refers to a metal salt whether neutral or basic. They can be typified by the general formula:

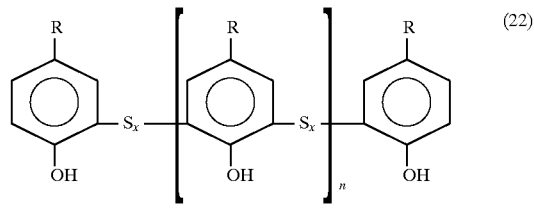

(22)

where x=1 or 2, n=0, 1 or 2; or a polymeric form of such a compound, where R is an alkyl radical, n and x are each integers from 1 to 4, and the average number of carbon atoms in all of the R groups is at least about 9 in order to ensure adequate solubility in oil. The individual R groups may each contain from 5 to 40, preferably 8 to 20, carbon atoms. The metal salt is prepared by reacting an alkyl phenol sulfide with a sufficient quantity of metal containing material to impart the desired alkalinity to the sulfurized metal phenate.

Regardless of the manner in which they are prepared, the sulfurized alkyl phenols which are useful generally contain from about 2 to about 14 wt. %, preferably about 4 to about 12 wt. % sulfur based on the weight of sulfurized alkyl phenol.

The sulfurized alkyl phenol may also be converted by reaction with a metal containing material including oxides, hydroxides and complexes in an amount sufficient to neutralize said phenol and, if desired, to overbase the product to a desired alkalinity by procedures well known in the art. Preferred is a process of neutralization utilizing a solution of metal in a glycol ether.

The neutral or normal sulfurized metal phenates are those in which the ratio of metal to phenol nucleus is about 1:2. The "overbased" or "basic" sulfurized metal phenates are sulfurized metal phenates wherein the ratio of metal to phenol is greater than that of stoichiometric, e.g. basic sulfurized metal dodecyl phenate, has a metal content up to and greater than 100% in excess of the metal present in the corresponding normal sulfurized metal phenates wherein the excess metal is produced in oil-soluble or dispersible form (as by reaction with $CO_2$).

Magnesium and calcium containing detergents although beneficial in other respects can increase the tendency of the lubricating oil to oxidize. This is especially true of the highly basic sulphonates.

The magnesium and/or calcium is generally present as basic or neutral detergents such as the sulphonates and phenates.

Viscosity Modifiers

A viscosity index (V.I.) improver, also referred to as viscosity modifier, is typically employed in multi-grade automobile engine lubricating oils. Viscosity modifiers impart high and low temperature operability to the lubricating oil and permit it to remain relatively viscous at elevated temperatures and also exhibit acceptable viscosity or fluidity at low temperatures. Viscosity modifiers are generally high molecular weight hydrocarbon polymers including polyesters. The viscosity modifiers may include derivatized polymers recited above which include various properties or functions, including dispersancy properties. These oil soluble viscosity modifying polymers will generally have number average molecular weights of from $10^3$ to $10^6$, preferably $10^4$ to $10^6$, e.g., 20,000 to 250,000, as determined by gel permeation chromatography or osmometry.

Examples of suitable hydrocarbon polymers which can be used are viscosity improvers include homopolymers and copolymers of two or more monomers of $C_2$ to $C_{30}$, e.g. $C_2$ to $C_8$ olefins, including both alpha olefins and internal olefins, which may be straight or branched, aliphatic, aromatic, alkyl-aromatic, cycloaliphatic, etc. Frequently they will be of ethylene with $C_3$ to $C_{30}$ olefins, particularly preferred being the copolymers of ethylene and propylene. Other polymers can be used such as polyisobutylenes, homopolymers and copolymers of $C_6$ and higher alpha olefins, atactic polypropylene, hydrogenated polymers and copolymers and terpolymers of styrene, e.g. with isoprene and/or butadiene and hydrogenated derivatives thereof. The polymer may be degraded in molecular weight, for example, by mastication, extrusion, oxidation or thermal degradation, and it may be oxidized and contain oxygen. Also included are derivatized polymers such as post-grafted interpolymers of ethylene-propylene with an active monomer such as maleic anhydride which may be further reacted with an alcohol, or amine, e.g. an alkylene polyamine or hydroxy amine, e.g., see U.S. Pat. Nos. 4,089,794: 4,160,739 and 4,137,185; or copolymers of ethylene and propylene reacted or grafted with nitrogen compounds such as shown in U.S. Pat. Nos. 4,068,056; 4,068,058; 4,146,489 and 4,149,984.

Useful hydrocarbon polymers include ethylene copolymers containing from 15 to 90 wt. % ethylene, preferably 30 to 80 wt. % of ethylene and 10 to 85 wt. %, preferably 20 to 70 wt. % of one or more $C_3$ to $C_{28}$, preferably $C_3$ to $C_{18}$, more preferably $C_3$ to $C_8$, alpha-olefins. While not essential, such copolymers preferably have a degree of crystallinity of less than 25 wt. %, as determined by X-ray and differential scanning calorimetry. Copolymers of ethylene and propylene or ethylene and butene are most preferred. Other alpha-olefins suitable in place of propylene to form the copolymer, or to be used in combination with ethylene and propylene, to form a terpolymer, tetrapolymer, etc., include 1-butene, 1-pentene, 1-hexene, 1-heptene, 1-octene, 1-nonene, 1-decene, etc.; also branched chain alpha-olefins, such as 4-methyl-1-pentene, 4-methyl-1-hexene, 5-methylpentene-1,4,4-dimethyl-1-pentene, and 6-methylheptene-1, etc., and mixtures thereof.

Terpolymers, tetrapolymers, etc., of ethylene, said $C_3$ to $C_{28}$ alpha-olefin, and a non-conjugated diolefin or mixtures of such diolefins may also be used. The amount of the non-conjugated diolefin generally ranges from about 0.5 to 20 mole %, preferably from about 1 to about 7 mole %, based on the total amount of ethylene and alpha-olefin present.

The polyester V.I. improvers are generally polymers of esters of ethylenically unsaturated $C_3$ to $C_8$ mono- and dicarboxylic acids such as methacrylic and acrylic acids, maleic acid, maleic anhydride, fumaric acid, etc.

Examples of unsaturated esters that may be used include those of aliphatic saturated mono alcohols of at least 1 carbon atom and preferably of from 12 to 20 carbon atoms, such as decyl acrylate, lauryl acrylate, stearyl acrylate, eicosanyl acrylate, docosanyl acrylate, decyl methacrylate, diamyl fumarate, lauryl methacrylate, cetyl methacrylate, stearyl methacrylate, and the like and mixtures thereof.

Other esters include the vinyl alcohol esters of $C_2$ to $C_{22}$ fatty or mono carboxylic acids, preferably saturated such as vinyl acetate, vinyl laurate, vinyl palmitate, vinyl stearate, vinyl oleate, and the like and mixtures thereof. Copolymers of vinyl alcohol esters with unsaturated acid esters such as the copolymer of vinyl acetate with dialkyl fumarates, can also be used.

The esters may be copolymerized with still other unsaturated monomers such as olefins, e.g. 0.2 to 5 moles of $C_2$ to $C_{20}$ aliphatic or aromatic olefin per mole of unsaturated ester, or per mole of unsaturated acid or anhydride followed by esterification. For example, copolymers or styrene with maleic anhydride esterified with alcohols and amines are known, e.g., see U.S. Pat. No. 3,702,300.

Such ester polymers may be grafted with, or the ester copolymerized with, polymerizable unsaturated nitrogen-containing monomers to impart dispersancy to the V.I. improvers. Examples of suitable unsaturated nitrogen-containing monomers include those containing 4 to 20 carbon atoms such as amino substituted olefins as p-(beta-diethylaminoethyl)styrene; basic nitrogen-containing heterocycles carrying a polymerizable ethylenically unsaturated substituent, e.g. the vinyl pyridines and the vinyl alkyl pyridines such as 2-vinyl-5-ethyl pyridine, 2-methyl-5-vinyl pyridine, 2-vinyl-pyridine, 4-vinylpyridine, 3-vinyl-pyridine, 3-methyl-5-vinyl-pyridine, 4-methyl-2-vinyl-pyridine, 4-ethyl-2-vinyl-pyridine and 2-butyl-1-5-vinyl-pyridine and the like. N-vinyl lactams are also suitable, e.g. N-vinyl pyrrolidones or N-vinyl piperidones. The vinyl pyrrolidones are preferred and are exemplified by N-vinyl pyrrolidone, N-(1-methylvinyl) pyrrolidone, N-vinyl-5-methyl pyrrolidone, N-vinyl-3,3-dimethylpyrrolidone, N-vinyl-5-ethyl pyrrolidone, etc.

Such nitrogen- and ester-containing polymeric viscosity index improver dispersants are generally employed in concentrations of from about 0.05 to 10 wt. % in the fully formulated oil, and preferably from about 0.1 to 5 wt. %, and more preferably from about 0.5 to 3 wt. % can reduce (e.g., to about 0.5 wt. %) the amount of the ashless dispersant employed to provide the required dispersancy to the oil formulation.

Antiwear Agents

Antiwear agents, as their name implies, reduce wear of moving metallic parts. Representative of conventional antiwear agents which may be used include, for example, the zinc dialkyl dithiophosphates, and the zinc diaryl dithiophosphates.

Suitable phosphates include dihydrocarbyl dithiophosphates, wherein the hydrocarbyl groups contain an average of at least 3 carbon atoms. Particularly useful are metal salts of at least one dihydrocarbyl dithiophosphoric acid wherein the hydrocarbyl groups contain an average of at least 3 carbon atoms. The acids from which the dihydrocarbyl dithiophosphates can be derived can be illustrated by acids of the formula:

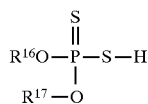

wherein $R^{16}$ and $R^{17}$ are the same or different and are alkyl, cycloalkyl, aralkyl, alkaryl or substituted substantially hydrocarbon radical derivatives of any of the above groups, and wherein the $R^{16}$ and $R^{17}$ groups in the acid each have, on average, at least 3 carbon atoms.

By "substantially hydrocarbon" is meant radicals containing substituent groups (e.g., 1 to 4 substituent groups per radical moiety) such as ether, ester, nitro or halogen which do not materially affect the hydrocarbon character of the radical.

Specific examples of suitable $R^{16}$ and $R^{17}$ radicals include isopropyl, isobutyl, n-butyl, sec-butyl, n-hexyl, heptyl, 2-ethylhexyl, diisobutyl, isooctyl, decyl, dodecyl, tetradecyl, hexadecyl, octadecyl, butylphenyl,o,p-depentylphenyl, octylphenyl, polyisobutene-(molecular weight 350)-substituted phenyl, tetrapropylene-substituted phenyl, beta-octylbutylnaphthyl, cyclopentyl, cyclohexyl, phenyl, chlorophenyl, o-dichlorophenyl, bromophenyl, naphthenyl, 2-methylcyclohexyl, benzyl, chlorobenzyl, chloropentyl, dichlorophenyl, nitrophenyl, dichlorodecyl and xenyl radicals. Alkyl radicals having about 3 to 30 carbon atoms, and aryl radicals having about 6 to 30 carbon atoms, are preferred. Particularly preferred $R^{16}$ and $R^{17}$ radicals are alkyl of 4 to 18 carbons.

The phosphorodithioic acids are readily obtainable by the reaction of phosphorus pentasulfide and an alcohol or phenol. The reaction involves mixing, at a temperature of about 20° C. to 200° C., 4 moles of the alcohol or phenol with one mole of phosphorus pentasulfide. Hydrogen sulfide is liberated as the reaction takes place. Mixtures of alcohols, phenols or both can be employed, e.g., mixtures of $C_3$ to $C_{30}$ alkanols, $C_6$ to $C_{30}$ aromatic alcohols, etc.

The metals useful to make the phosphate salts include Group I metals, Group II metals, aluminum, lead, tin, molybdenum, manganese, cobalt and nickel. Zinc is the preferred metal. Examples of metal compounds which may be reacted with the acid include lithium oxide, lithium hydroxide, lithium carbonate, lithium pentylate, sodium oxide, sodium hydroxide, sodium carbonate, sodium methylate, sodium propylate, sodium phenoxide, potassium oxide, potassium hydroxide, potassium carbonate, potassium methylate, silver oxide, silver carbonate, magnesium oxide, magnesium hydroxide, magnesium carbonate, magnesium ethylate, magnesium propylate, magnesium phenoxide, calcium oxide, calcium hydroxide, calcium carbonate, calcium methylate, calcium propylate, calcium pentylate, zinc oxide, zinc hydroxide, zinc carbonate, zinc propylate, strontium oxide, strontium hydroxide, cadmium oxide, cadmium hydroxide, cadmium carbonate, cadmium ethylate, barium oxide, barium hydroxide, barium hydrate, barium carbonate, barium ethylate, barium pentylate, aluminum oxide, aluminum propylate, lead oxide, lead hydroxide, lead carbonate, tin oxide, tin butylate, cobalt oxide, cobalt hydroxide, cobalt carbonate, cobalt pentylate, nickel oxide, nickel hydroxide and nickel carbonate.

In some instances, the incorporation of certain ingredients, particularly carboxylic acids or metal carboxylates such as small amounts of the metal acetate or acetic acid used in conjunction with the metal reactant will facilitate the reaction and result in an improved product. For example, the use of up to about 5% of zinc acetate in combination with the required amount of zinc oxide facilitates the formation of a zinc phosphorodithioate.

The preparation of metal phosphorodithioates is well known in the art and is described in a large number of issued patents, including U.S. Pat. Nos. 3,293,181; 3,397,145; 3,396,109 and 3,442,804, the disclosures of which are hereby incorporated by reference insofar as the preparation of metal salts of organic phosphorodithioic acids useful in this invention are described.

Also useful as antiwear additives are amine derivatives of dithiophosphoric acid compounds, such as are described in U.S. Pat. No. 3,637,499, the disclosure of which is hereby incorporated by reference in its entirety.

The zinc salts are most commonly used as antiwear additives in lubricating oil in amounts of 0.1 to 10, preferably 0.2 to 2 wt. %, based upon the total weight of the lubricating oil composition. They may be prepared in accordance with known techniques by first forming a dithiophosphoric acid, usually by reaction of an alcohol or a phenol with $P_2S_5$ and then neutralizing the dithiophosphoric acid with a suitable zinc compound.

Mixtures of alcohols may be used including mixtures of primary and secondary alcohols, secondary generally for imparting improved antiwear properties, and primary for thermal stability. Mixtures of the two are particularly useful. In general, any basic or neutral zinc compound could be used but the oxides, hydroxides and carbonates are most generally employed. Commercial additives frequently contain an excess of zinc due to use of an excess of the basic zinc compound in the neutralization reaction.

The zinc dihydrocarbyl dithiophosphates are oil soluble salts of dihydrocarbyl esters of dithiophosphoric acids and may be represented by the following formula:

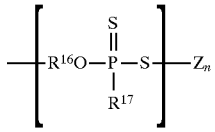

wherein $R^{16}$ and $R^{17}$ are as described in connection with the previous formula.

Suitable antiwear agents also comprise the phosphorous- and sulfur-containing product mixtures described in U.S. application Ser. No. 210,831 filed on Jun. 24, 1988 by Ryer and Gutierrez and the Continuation-in-Part thereof: U.S. Ser. No. 370,315, filed Jun. 22, 1989, the disclosures thereof are incorporated herein by reference.

In a preferred embodiment of the phosphorous- and sulfur-containing product mixtures disclosed in said commonly assigned applications, the following three components, namely: (1) organic phosphite ester, (2) hydrocarbyl thioalkanol, and (3) heterodialkanol are reacted in admixture, preferably in simultaneous admixture.

Preferred hydrocarbyl thioalkanol reactants include $C_8$ to $C_{18}$ thioethanols. The preferred heterodialkanols are thiodialkanols. Representative thiodialkanols include 2,2'-thiodiethanol; 3,3'-thiodipropanol; thio-bis ethoxy-ethanol; thiobisisopropoxyisopropanol; and mixtures thereof.

Oxidation Inhibitors

Oxidation inhibitors reduce the tendency of mineral oils to deteriorate in service, which deterioration can be evidenced by the products of oxidation such as sludge and varnish-like deposits on the metal surfaces and by viscosity growth.

Useful antioxidant materials include oil soluble phenolic compounds, oil soluble sulfurized organic compounds, oil soluble amine antioxidants, oil soluble organo borates, oil soluble organo phosphites, oil soluble organophosphates, oil soluble organo dithiophosphates and mixtures thereof. Preferably such antioxidants are metal-free (that is, free of metals which are capable of generating sulfated ash), and therefore are most preferably ashless (having a sulfated ash value of not greater than 1 wt. % SASH, as determined by ASTMD874).

Illustrative of oil soluble phenolic compounds are alkylated monophenols, alkylated hydroquinones, hydroxylated thiodiphenyl ethers, alkylidenebis phenols, benzyl compounds, acylaminophenols, and esters and amides of hindered phenol-substituted alkanoic acids.

Examples of Phenolic Antioxidants

1. Alkylated monophenols 2,6-di-tert-butyl-4-methylphenol; 2,6-di-tert-butylphenol; 2-tert-butyl-4,6 dimethylphenol; 2,6-di-tertbutyl-4-ethylphenol; 2,6-ditert-butyl-4-ethylphenol; 2,6-di-tert-butyl-4-n-butylphenol; 2,6-di-tertbutyl-4-isobutylphenol; 2,6-dicyclopentyl-4-methylphenol; 2-(alpha-methylcyclohexyl)-4,6-dimethylphenol; 2,6-dioctadecyl-4-methylphenol; 2,4,6-tricyclohexylphenol; 2,6-di-tert-butyl-4-methoxymethylphenol; o-tert-butylphenol.

2. Alkylated hydroquinones 2,6-di-tert-butyl-4-methoxyphenol; 2,5-di-tertbutyl-hydroquinone; 2,5-di-tert-amylhydroquinone; 2,6-di-phenyl-4-octadecyloxyphenol.

3. Hydroxylated thiodiphenyl ethers 2,2'-thiobis(6-tert-butyl-4-methyl-phenol); 2,2'-thiobis(4-octylphenol); 4,4'-thiobis(6-tert-butyl-3-methylphenol); 4,4'-thiobis(6-tert-butyl-2-methylphenol).

4. Alkylidenebisphenols 2,2'-methylenebis(6-tert-butyl-4-methylphenol); 2,2'-methylenebis(6-tert-butyl-4-ethylphenol); 2,2'-methylenebis[4-methyl-6-(alpha-methylcyclohexyl)-phenol]; 2,2'-methylenebis(4-methyl-6-cyclohexylphenol); 2,2'-methylenebis(6-nonyl-4-methylphenol); 2,2'-methylenebis(4,6-di-tert-butylphenol); 2,2'-methylidenebis(4,6-di-tert-butylphenol); 2,2'-ethylidenebis(6-tert-butyl-4-isobutylphenol); 2,2'-methylenebis[6-alpha-methylbenzyl)-4-nonylphenol]; 2,2'-methylenebis[6-(alpha, alpha-dimethylbenzyl)-4-nonylphenol]; 4,4'-methylenebis(2,6'-di-tert-butylphenol); 4,4'-methylenebis(6-tert-butyl-2-methylphenol); 1,1-bis-(5-tert-butyl-4-hydroxy-2-methylphenyl)butane; 2,6-di(3-tert-butyl-5-methyl-2-hydroxybenzyl)-4-methylphenol; 1,1,3-tris(5-tert-butyl-4-hydroxy-2-methylphenyl)-3-n-dodecylmercaptobutane; ethylene glycol bis[3,3-bis(3'-tert-butyl-4'-hydroxylphenyl)butyrate]; di(3-tert-butyl-4-hydroxy-5-methylphenyl)dicyclopentadiene; di[2-(3'-tert-butyl-2'-hydroxy-5'-methylbenzyl)-6-tertbutyl-4-methylphenyl]terephthalate.

5. Benzyl compounds 1,3,5-tris(3,5-di-tert-butyl-4-hydroxybenzyl)-2,4,6-trimethyl-benzene; di(3,5-di-tert-butyl-4-hydroxybenzyl)sulfide; 3,5-di-tert-butyl-4-hydroxybenzylmercaptoacetic acid isooctyl ester; bis(4-tert-butyl-3-hydroxy-2,6-dimethyl-benzyl)dithioterephthalate; 1,3,5-tris(3,5-di-tertbutyl-4-hydroxybenzyl)isocyanurate1, 3,5-tris(4-tertbutyl-3-hydroxy-2,6-dimethylbenzyl) isocyanurate; 3,5-di-tert-butyl-4-hydroxybenzylphosphonic acid dioctadecyl ester 3,5-di-tert-butyl-4-hydroxybenzylphosphonic acid mono-ethyl ester calcium salt.

6. Acylaminophenols 4-hydroxylauric acid anilide; 4-hydroxystearic acid anilide; 2,4-bis-octylmercapto-6-(3,5-di-tert-butyl-4-hydroxyaniline)-s-triazine; N-(3,5-di-tert-butyl-4-hydroxyphenyl)carbamic acid octyl ester.

7. Esters of beta-(3,5-di-tert-butyl-4-hydroxyphenyl) propionic acid with mono- or polyhydric alcohols, e.g. with methanol; octadecanol; 1,6-hexanediol; neopentyl glycol; thiodiethylene glycol; diethylene glycol; triethylene glycol; pentaerythritol; tris(hydroxy-ethyl)isocyanurate; and di(hydroxyethyl)oxalic acid diamide.

8. Esters of beta-(5-tert-butyl-4-hydroxy-3-methylphenyl)propionic acid with mono- or polyhydric alcohols, e.g. with methanol; octadecanol; 1,6-hexanediol; neopentyl glycol; thiodiethylene glycol; diethylene glycol; triethylene glycol; pentaerythritol; tris(hydroxyethyl) isocyanurate; and di(hydroxyethyl)oxalic acid diamide.

9. Amides of beta -(3,5-di-tert-butyl-4-hydroxyphenyl) propionic acid, e.g., N,N'-di(3,5-di-tertbutyl-4-hydroxyphenyl-pro-prionyl)hexamethylenediamine; N,N'-di(3,5-di-tert-butyl-4-hydroxyphenylpropionyl)trimethylenediamine; N,N'-di-(3,5-di-tert-butyl-4-hydroxyphenylpropionyl)hydrazine.

Oil soluble sulfurized organic compounds include those represented by the formula:

$$R^{18}S_{x_4}R^{19}$$

wherein S represents sulfur, $x_4$ is a whole number having a value of from 1 to about 10, and $R^{18}$ and $R^{19}$ may be the same or different organic groups. The organic groups may be hydrocarbon groups or substituted hydrocarbon groups containing alkyl, aryl, aralkyl, alkaryl, alkanoate, thiazole, imidazole, phosphorothionate, beta-ketoalkyl groups, etc. The substantially hydrocarbon groups may contain other substituents such as halogen, amino, hydroxyl, mercapto, alkoxy, aryloxy, thio, nitro, sulfonic acid, carboxylic acid, carboxylic acid ester, etc.

Specific examples of types of sulfurized compositions which are useful. Oxidation inhibitors include aromatic, alkyl or alkenyl sulfides and polysulfides, sulfurized olefins, sulfurized carboxylic acid esters, sulfurized ester olefins, sulfurized oil, and mixtures thereof. The preparation of such oil-soluble sulfurized compositions is described in the art, and U.S. Pat. No. 4,612,129 is incorporated herein by reference in its entirety for its disclosure of such preparations; including the type and amount of reactants and catalysts (or promoters), temperatures and other process conditions, and product purification and recovery techniques (e.g., decoloring, filtering, and other solids and impurity removal steps). The sulfurized organic compounds may be aromatic and alkyl sulfides such as dibenzyl sulfide, dixylyl sulfide, dicetylsulfide, diparaffin wax sulfide and polysulfide, cracked wax oleum sulfides, etc.

Examples of dialkenyl sulfides are described in U.S. Pat. No. 2,446,072. Examples of sulfides of this type include 6,6'-dithiobis(5-methyl-4-nonene), 2-butenyl monosulfide and disulfide, and 2-methyl-2-butenyl monosulfide and disulfide.

Representative sulfurized olefins include sulfurized olefins prepared by the reaction of an olefin (preferably containing 3 to 6 carbon atoms) or a lower molecular weight polyolefin derived therefrom, with a sulfur-containing compound such as sulfur, sulfur monochloride and/or sulfur dichloride, hydrogen sulfide, etc. Isobutene, propylene and their dimers, trimers and tetramers, and mixtures thereof are especially preferred olefinic compounds. Of these compounds, isobutylene and diisobutylene are particularly desirable because of their availability and the particularly high sulfur-containing compositions which can be prepared therefrom.

The sulfurized organic compounds may be sulfurized oils which may be prepared by treating natural or synthetic oils including mineral oils, lard oil, carboxylic acid esters derived from aliphatic alcohols and fatty acids or aliphatic carboxylic acids (e.g., myristyl oleate and oleyl oleate) sperm whale oil and synthetic sperm whale oil substitutes and synthetic unsaturated esters or glycerides.

The sulfurized fatty acid esters can be prepared by reacting sulfur, sulfur monochloride, and/or sulfur dichloride with an unsaturated fatty ester at elevated temperatures. Typical esters include $C_1$ to $C_{20}$ alkyl esters of $C_8$ to $C_{24}$ unsaturated fatty acids such as palmitoleic, oleic, ricinoleic, petroselic, vaccenic, linoleic, linolenic, oleostearic, licanic, etc. Sulfurized fatty acid esters prepared from mixed unsaturated fatty acid esters such as are obtained from animal fats and vegetable oils such as tall oil, linseed oil, olive oil, castor oil, peanut oil, rape oil, fish oil, sperm oil, etc. also are useful. Specific examples of the fatty esters which can be sulfurized include lauryl talate, methyl oleate, ethyl oleate, lauryl oleate, cetyl oleate, cetyl linoleate, lauryl ricinoleate, oleolinoleate, oleostearate, and alkyl glycerides.

Another class of organic sulfur-containing compounds includes sulfurized aliphatic esters of an olefinic monodicarboxylic acid. For example, aliphatic alcohols of from 1 to 30 carbon atoms can be used to esterify monocarboxylic acids such as acrylic acid, methacrylic acid, 2,4-pentadienic acid, etc. or fumaric acid, maleic acid, muconic acid, etc. Sulfurization of these esters is conducted with elemental sulfur, sulfur monochloride and/or sulfur dichloride.

Another class of sulfurized organic compounds include diester sulfides. Typical diesters include the butyl, amyl, hexyl, heptyl, octyl, nonyl, decyl, tridecyl, myristyl, pentadecyl, cetyl, heptadecyl, stearyl, lauryl, andeicosyl; diesters of thiodialkanoic acids such as propionic, butanoic, pentanoic and hexanoic acids. Of the diester sulfides, a specific example is dilauryl,3,3'-thiodipropionate.

Other suitable sulfurized organic compound antioxidants include those derived from a particular type of cyclic or bicyclic olefin which is a Diels-Alder adduct of at least one dienophile with at least one aliphatic conjugated diene. The sulfurized Diels-Alder adducts can be prepared by reacting various sulfurizing agents with the Diels-Alder adducts as described more fully below. Typically, the sulfurizing agent is sulfur.

The Diels-Alder adducts are a well-known, art-recognized class of compounds prepared by the diene synthesis of Diels-Alder reaction. A summary of the prior art relating to this class of compounds is found in the Russian monograph, "Dienovyi Sintes", Izdatelstwo Akademii Nauk SSSR, 1963 by A. S. Onischenko. (Translated into the English language by L. Mandel as A. S. Onischenko, "Diene Synthesis", N.Y., Daniel Davey and Co., Inc., 1964). This monograph and references cited therein are incorporated by reference into the present specification.

Still further sulfurized organic compounds include at least one sulfurized terpene compound or a composition prepared by sulfurizing a mixture comprising at least one terpene and at least one other olefinic compound.

The term "terpene compound" as used in the specification and claims is intended to include the various isomeric terpene hydrocarbons having the empirical formula $C_{10}H_{16}$, such as contained in turpentine, pine oil and dipentenes, and the various synthetic and naturally occurring oxygen-containing derivatives. Mixtures of these various compounds generally will be utilized, especially when natural products such as pine oil and turpentine are used. Pine oil, for example, which is obtained by destructive distillation of waste pinewood with super-heated steam comprises a mixture of terpene derivatives such as alpha-terpineol, beta-terpineol, alpha-fenchol, camphor, borneol/isoborneol, fenchone, estragole, dihydro alpha-terpineol, anethole, and other monoterpene hydrocarbons. The specific ratios and amounts of the various components in a given pine oil will depend upon the particular source and the degree of purification. A group of pine oil-derived products are available commercially from Hercules Incorporated. The pine oil products generally known as terpene alcohols available from Hercules Incorporated are particularly useful in the preparation of this class of sulfurized products. Examples of such products include alpha-Terpineol containing about 95 to 97% of alpha-terpineol, a high purity tertiary terpene alcohol mixture typically containing 96.3% of tertiary alcohols; Terpineol 318 Prime which is a mixture of isomeric terpineols obtained by dehydration of terpene hydrate and contains about 60 to 65 wt. % of alpha-terpineol and 15 to 20% beta-terpineol, and 18 to 20% of other tertiary terpene alcohols. Other mixtures and grades of useful pine oil products also are available from Hercules under such designations as Yarmor 302, Herco pine oil, Yarmor 302W, Yarmor F and Yarmor 60.

The above terpene compounds may be sulfurized terpene compounds, sulfurized mixtures of terpene compounds or mixtures of at least one terpene compound and at least one sulfurized terpene compound. Sulfurized terpene compounds can be prepared by sulfurizing terpene compounds with sulfur, sulfur halides, or mixtures of sulfur dioxide with hydrogen sulfide. Also, the sulfurization of various terpene compounds has been described in the prior art. For example, the sulfurization of pine oil is described in U.S. Pat. No. 2,012,446.

The other olefinic compound which may be combined with the terpene compound and sulfurized may be any of several olefinic compounds such as those described earlier.

The other olefin used in combination with the terpene also may be an unsaturated fatty acid, an unsaturated fatty acid ester, mixtures thereof, or mixtures thereof with the olefins described above. The term "fatty acid" as used herein refers to acids which may be obtained by hydrolysis of naturally occurring vegetable or animal fats or oils. These fatty acids usually contain from 16 to 20 carbon atoms and are mixtures of saturated and unsaturated fatty acids. The unsaturated fatty acids generally contained in the naturally occurring vegetable or animal fats and oils may contain one or more double bonds and such acids include palmitoleic acid, oleic acid, linoleic acid, linolenic acid, and erucic acid. The unsaturated fatty acids may comprise mixtures of acids such as those obtained from naturally occurring animal and vegetable oils such as lard oil, tall oil, peanut oil, soybean oil, cottonseed oil, sunflower seed oil, or wheat germ oil. Tall oil is a mixture of rosin acids, mainly abietic acid, and unsaturated fatty acids, mainly oleic and linoleic acids. Tall oil is a by-product of the sulfate process for the manufacture of wood pulp.

The most particularly preferred unsaturated fatty acid esters are the fatty oils, that is, naturally occurring esters of glycerol with the fatty acids described above, and synthetic esters of similar structure. Examples of naturally occurring fats and oils containing unsaturation include animal fats such as Neat's foot oil, lard oil, depot fat, beef tallow, etc. Examples of naturally occurring vegetable oils include cottonseed oil, corn oil, poppyseed oil, safflower oil, sesame oil, soybean oil, sunflower seed oil and wheat germ oil.

The fatty acid esters which are useful also may be prepared from aliphatic olefinic acids of the type described above such as oleic acid, linoleic acid, linolenic acid, and behenic acid by reaction with alcohols and polyols. Examples of aliphatic alcohols which may be reacted with the above-identified acids include monohydric alcohols such as methanol, ethanol, n-propanol, isopropanol, the butanols, etc.; and polyhydric alcohols including ethylene glycol, propylene glycol, trimethylene glycol, neopentyl glycol, glycerol, etc.

The sulfurized derivatives of the other olefin compounds can be prepared by methods known in the art utilizing sulfurizing reagents such as sulfur, sulfur halides or mixtures of sulfur or sulfur dioxide with hydrogen sulfide.

Exemplary of amine antioxidants are phenyl-substituted and phenylene-substituted amines, N-nitro phenylhydroxylamine, isoindoline compounds, phosphinodithioic acid-vinyl carboxylate adducts, phosphorodithioate ester-aldehyde reaction products, phosphorodithioate-alkylene oxide reaction products, silyl esters of terephthalic acid, bis-1,3-alkylamino-2-propanol, anthranilamide compounds, anthranilic acid esters, alpha-methyl styrenated aromatic amines, aromatic amines and substituted benzophenones, aminoguanidines, peroxide-treated phenothiazine, N-substituted phenothiazines and triazines, 3-tertiary alkyl-substituted phenothiazines, alkylated diphenyl-amines, 4-alkylphenyl-1-alkyl-2-naphthylamines, di-benzazepine compounds, fluorinated aromatic amines, alkylated polyhydroxy benzenoid compounds, substituted indans, dimethyl octadecylphosphonate-arylimino di-alkanol copolymers and substituted benzo-diazoborole.

Examples of Amine Antioxidants

N,N'-diisopropyl-p-phenylenediamine; N,N'-di-sec-butyl-p-phenylenediamine; N,N'-bis(1,4-dimethylpentyl)-p-phenylenediamine; N,N'-bis(1-ethyl-3-methylpentyl)-p-phenylenediamine; N,N'-bis(1-methylheptyl)-p-phenylenediamine; N,N'-diphenyl-p-phenylenediamine; N,N'-di-(naphthyl-2)-p-phenylenediamine; N-isopropyl-N'-phenyl-p-phenylenediamine; N-(1,3-dimethylbutyl)-N'-phenyl-n-phenylenediamine; N-(1-methylheptyl)-N'-phenyl-p-phenylenediamine; N-cyclohexyl-N'-phenyl-p-phenylenediamine; 4-(p-toluenesulfonamido)diphenylamine; N,N'-dimethyl-N,N'-di-sec-butyl-p-phenylenediamine diphenylamine; 4-isopropoxydiphenylamine; N-phenyl-1-naphthylamine; N-phenyl-2-naphthylamine; octylated diphenylamine; 4-n-butylaminophenol; 4-butyrylaminophenol; 4-nonanoylaminophenol; 4-dodecanoylaminophenol; 4-octadecanoylaminophenol; di-(4-methoxy-phenyl)amine; di-tert-butyl-4-dimethylaminomethylphenol; 2,4'-diaminodiphenylmethane; 4,4'-diaminophenylmethane; N,N,N',N'-tetramethyl-4,4'-diaminodiphenylmethane; 1,2-di[(2-methylphenyl)amino]ethane; 1,2-di(phenylamino)propane; (o-tolyl)biguanide; di[4-(1',3'-dimethylbutyl)phenyl]amine; tert-octylated N-phenyl-1-napthylamino; and mixture of mono- and dialkylated tert-butyl-tert-octyldiphenylamines.

Oil soluble organo-borate, phosphate and phosphite antioxidants include alkyl- and aryl- (and mixed alkyl, aryl) substituted borates, alkyl- and aryl- (and mixed alkyl, aryl) substituted phosphates, alkyl- and aryl- (and mixed alkyl, aryl) substituted phosphites, and alkyl- and aryl- (and mixed alkyl, aryl) substituted dithiophosphates such as O,O,S-trialkyl dithiophosphates, O,O,S-triaryldithiophosphates and dithiophosphates having mixed substitution by alkyl andaryl groups, phosphorothionyl sulfide, phosphorus-containing silane, polyphenylene sulfide, amine salts of phosphinic acid and quinone phosphates.

A preferred class of antioxidants includes the sulfurized alkyl-substituted hydroxyaromatic compounds. Sulfurized alkyl-substituted hydroxyaromatic compounds and the methods of preparing them are known in the art and are disclosed, for example, in the following U.S. Patents (which are incorporated by reference herein): U.S. Pat. Nos. 2,139,766; 2,198,828; 2,230,542; 2,836,565; 3,285,854; 3,538,166; 3,844,956; 3,951,830 and 4,115,287.

In general, the sulfurized alkyl-substituted hydroxyaromatic compounds may be prepared by reacting an alkyl-substituted hydroxyaromatic compound with a sulfurizing agent such as elemental sulfur, a sulfur halide (e.g., sulfurmonochloride or sulfur dichloride), a mixture of hydrogen sulfide and sulfur dioxide, or the like. The preferred sulfurizing agents are sulfur and the sulfur halides, and especially the sulfur chlorides, with sulfur dichloride ($SCl_2$)being especially preferred.

The alkyl-substituted hydroxyaromatic compounds which are sulfurized to produce antioxidant are generally compounds containing at least one hydroxy group (e.g., from 1 to 3 hydroxy groups) and at least one alkyl radical (e.g., from 1 to 3 alkyl radicals) attached to the same aromatic ring. The alkyl radical ordinarily contains about 3 to 100, and preferably about 6 to 20, carbon atoms. The alkyl-substituted hydroxy aromatic compound may contain more than one hydroxy group as compound may contain more than one hydroxy group as exemplified by alkyl resorcinols, hydroquinones and catechols, or it may contain more than one alkyl radical; but normally it contains only one of each. Compounds in which the alkyl and hydroxy groups are ortho, meta and para to each other, and mixtures of such compounds, are within the scope of the invention. Illustrative alkyl-substituted hydroxyaromatic compounds are n-propylphenol, isopropylphenol, n-butylphenol, t-butylphenol, hexylphenol, heptylphenol, octylphenol, nonylphenol, n-dodecylphenol, (propenetetramer)-substituted phenol, octadecylphenol, eicosylphenol, polybutene (molecular weight about 1000)-substituted phenol, n-dodecylresorcinol and 2,4-di-t-butylphenol, and the alkyl-substituted catechols corresponding to the foregoing. Also included are methylene-bridged alkyl-substituted hydroxyaromatic compounds of the type which may be prepared by the reaction of an alkyl-substituted hydroxyaromatic compound with formaldehyde or a formaldehyde-yielding reagent such as trioxane or paraformaldehyde.

The sulfurized alkyl-substituted hydroxy-aromatic compound is typically prepared by reacting the alkyl-substituted hydroxyaromatic compound with the sulfurizing agent at a temperature within the range of about 100° C. to 250° C. The reaction may take place in a substantially inert diluent such as toluene, xylene, petroleum naphtha, mineral oil, Cellosolve or the like. If the sulfurizing agent is a sulfur halide, and especially if no diluent is used, it is frequently preferred to remove acidic materials such as hydrogen halides by vacuum stripping the reaction mixture or blowing it with an inert gas such as nitrogen. If the sulfurizing agent is sulfur, it is frequently advantageous to blow the sulfurized product with an inert gas such as nitrogen or air so as to remove sulfur oxides and the like.

Also useful herein are antioxidants disclosed in the following U.S. Patents, the disclosures of which are herein incorporated by reference in their entirety: U.S. Pat. Nos. 3,451,166; 3,458,495; 3,470,099; 3,511,780; 3,687,848; 3,770,854; 3,850,822; 3,876,733; 3,929,654; 4,115,287; 4,136,041; 4,153,562; 4,367,152 and 4,737,301.

The most preferred antioxidants include oil soluble copper compounds. The copper may be blended into the oil as any suitable oil soluble copper compound. By oil soluble we mean the compound is oil soluble under normal blending conditions in the oil or additive package. The copper compound may be in the cuprous or cupric form. The copper may be in the form of the copper dihydrocarbyl thio- or dithiophosphates wherein copper may be substituted for zinc in the compounds and reactions described above although 1 mole of cuprous or cupric oxide may be reacted with 1 or 2 moles of the dithiophosphoric acid, respectively. Alternatively, the copper may be added as the copper salt of a synthetic or natural carboxylic acid. Examples include $C_{10}$ to $C_{18}$ fatty acids such as stearic or palmitic, but unsaturated acids such as oleic or branched carboxylic acids such as napthenic acids of molecular weight from 200 to 500 or synthetic carboxylic acids are preferred because of the improved handling and solubility properties of the resulting copper carboxylates. Also useful are oil soluble copper dithiocarbamates of the general formula $(RR'NCSS)_nCu$, where n is 1 or 2 and R and R' are the same or different hydrocarbyl radicals containing from 1 to 18 and preferably 2 to 12 carbon atoms and including radicals such as alkyl, alkenyl, aryl, aralkyl, alkaryl and cycloaliphatic radicals. Particularly preferred as R and R' groups are alkyl groups of 2 to 8 carbon atoms. Thus, the radicals may, for example, be ethyl, n-propyl, i-propyl, n-butyl, i-butyl, sec-butyl, amyl, n-hexyl, i-hexyl, n-heptyl, n-octyl, decyl, dodecyl, octadecyl, 2-ethylhexyl, phenyl, butylphenyl, cyclohexyl, methylcyclopentyl, propenyl, butenyl, etc. In order to obtain oil solubility, the total number of carbon atoms (i.e., R and R') will generally be about 5 or greater. Copper sulphonates, phenates, and acetylacetonates may also be used.

Exemplary of useful copper compound antioxidants are copper ($Cu^I$ and/or $Cu^{II}$) salts of alkenyl carboxylic acids or anhydrides such as succinic acids or anhydrides. The salts themselves may be basic, neutral or acidic. They may be formed by reacting (a) any of the functionalized polymers which are useful as dispersants section, which have at least one free carboxylic acid (or anhydride) group with (b) a reactive metal compound. Suitable acid (or anhydride) reactive metal compounds include those such as cupric or cuprous hydroxides, oxides, acetates, borates, and carbonates or basic copper carbonate.

Examples of the metal salts are Cu salts of poly-n-butene succinic anhydride (hereinafter referred to as Cu-PNBSA) polyisobutenyl succinic anhydride (hereinafter referred to as Cu-PIBSA), and Cu salts of poly-n-butene or polyisobutenyl succinic acid. Preferably, the selected metal employed is its divalent form, e.g., $Cu+^2$. The preferred substrates are polyalkenyl carboxylic acids in which the alkenyl group has a molecular weight greater than about 700. The alkenyl group desirably has a $\overline{M}n$ from about 900 to 1,500, and up to 5,000. These materials can be dissolved in a solvent, such as a mineral oil, and heated in the presence of a water solution (or slurry) of the metal bearing material. Heating may take place between 70° C. and about 200° C. Temperatures of 110° C. to 140° C. are entirely adequate. It may be necessary, depending upon the salt produced, not to allow the reaction to remain at a temperature above about 140° C. for an extended period of time, e.g., longer than 5 hours, or decomposition of the salt may occur.

The copper antioxidants (e.g., Cu-PIBSA, Cu-PNB, Cu-oleate, or mixtures thereof) will be generally employed in an amount of from about 50 to 500 ppm by weight of the metal, in the final lubricating or fuel composition.

The copper antioxidants are inexpensive and are effective at low concentrations and therefore do not add substantially to the cost of the product. The results obtained are frequently better than those obtained with previously used antioxidants, which are expensive and used in higher concentrations. In the amounts employed, the copper compounds do not interfere with the performance of other components of the lubricating composition, in many instances, completely satisfactory results are obtained when the copper compound is the sole antioxidant in addition to the ZDDP. The copper compounds can be utilized to replace part or all of the need for supplementary antioxidants. Thus, for particularly severe conditions it may be desirable to include a supplementary, conventional antioxidant. However, the amounts of supplementary antioxidant required are small, far less than the amount required in the absence of the copper compound.

While any effective amount of the copper antioxidant can be incorporated into the lubricating oil composition, it is contemplated that such effective amounts be sufficient to provide said lube oil composition with an amount of the copper antioxidant of from about 5 to 500 (more preferably 10 to 200, still more preferably 10 to 180, and most preferably 20 to 130 (e.g., 90 to 120)) ppm of added copper based on the weight of the lubricating oil composition. Of course, the preferred amount may depend, amongst other factors, on the quality of the basestock lubricating oil.

Corrosion Inhibitors

Corrosion inhibitors, also known as anti-corrosive agents, reduce the degradation of the metallic parts contacted by the lubricating oil composition. Illustrative of corrosion inhibitors are phosphosulfurized hydrocarbons and the products obtained by reaction of a phosphosulfurized hydrocarbon with an alkaline earth metal oxide or hydroxide, preferably in the presence of an alkylated phenol or of an alkylphenol thioester, and also preferably in the presence of carbon dioxide. Phosphosulfurized hydrocarbons are prepared by reacting a suitable hydrocarbon such as a terpene, a heavy petroleum fraction of a $C_2$ to $C_6$ olefin polymer such as polyisobutylene, with from 5 to 30 wt. % of a sulfide of phosphorus for ½ to 15 hours, at a temperature in the range of 65° C. to 315° C. Neutralization of the phosphosulfurized hydrocarbon may be effected in the manner taught in U.S. Pat. No. 2,969,324.

Other suitable corrosion inhibitors include copper corrosion inhibitors comprising hydrocarbyl-thio-distributed derivatives of 1,3,4-thiadiazole, e.g., $C_2$ to $C_{30}$; alkyl, aryl, cycloalkyl, aralkyl and alkaryl-mono-, di-, tri-, tetra- or thio-substituted derivatives thereof.

Representative examples of such materials included 2,5-bis(octylthio)-1,3,4-thiadiazole; 2,5-bis(octyldithio)-1,3,4-thiadiazole; 2,5-bis(octyltrithio)-1,3,4-thiadiazole; 2,5-bis(octyltetrithio)-1,3,4-thiadiazole; 2,5-bis(nonylthio)-1,3,4-thiadiazole; 2,5-bis(dodecyldithio)-1,3,4-thiadiazole; 2-dodecyldithio-5-phenyldithio-1,3,4-thiadiazole; 2,5-bis(cyclohexyl dithio)-1,3,4-thiadiazole; and mixtures thereof.

Preferred copper corrosion inhibitors are the derivative of -1,3,4-thiadiazoles such as those described in U.S. Pat. Nos. 2,719,125, 2,719,126 and 3,087,932; especially preferred is the compound 2,5-bis(toctyldithio)-1,3,4-thiadiazole commercially available as Amoco 150, and 2,5-bis(t-nonyldithio)-1,3,4-thiadiazole, commercially available as Amoco 158.

The preparation of such materials is further described in U.S. Pat. Nos. 2,719,125, 2,719,126, 3,087,932 and 4,410,436, the disclosures of which are hereby incorporated by reference.

Corrosion inhibitors also include copper lead bearing corrosion inhibitors. Typically such compounds are the thiadiazole polysulphides containing from 5 to 50 carbon atoms, their derivatives and polymers thereof. Preferred materials are the derivatives of 1,3,4-thiadiazoles such as those described in U.S. Pat. Nos. 2,719,125; 2,719,126 and 3,087,932; especially preferred is the compound 2,5 bis(t-octadithio)-1,3,4-thiadiazole, commercially available as Amoco 150. Other similar materials also suitable are described in U.S. Pat. Nos. 3,821,236; 3,904,537; 4,097,387; 4,107,059; 4,136,043; 4,188,299 and 4,193,882.

Other suitable corrosion inhibitors are the thio and polythio sulphenamides of thiadiazoles such as those described in U.K. Patent Specification 1,560,830. These compounds can be included in the lubricating composition in an amount from 0.01 to 10, preferably 0.1 to 5.0 wt. % based on the weight of the composition.

Friction Modifiers

Friction modifiers serve to impart the proper friction characteristics to lubricating oil compositions such as automatic transmission fluids. Representative examples of suitable friction modifiers are found in U.S. Pat. No. 3,933,659 which discloses fatty acid esters and amides; U.S. Pat. No. 4,176,074 which describes molybdenum complexes of polyisobutenyl succinic anhydride-amino alkanols; U.S. Pat. No. 4,105,571 which discloses glycerol esters of dimerized fatty acids; U.S. Pat. No. 3,779,928 which discloses alkane phosphonic acid salts; U.S. Pat. No. 3,778,375 which discloses reaction products of a phosphonate with an oleamide; U.S. Pat. No. 3,852,205 which discloses S-carboxy-alkylene hydrocarbyl succinimide, S-carboxy alkylene hydrocarbyl succinamic acid and mixtures thereof; U.S. Pat. No. 3,879,306 which discloses N-(hydroxyalkyl) alkenylsuccinamic acids or succinimides; U.S. Pat. No. 3,932,290 which discloses reaction products of di-(lower alkyl) phosphites and epoxides; and U.S. Pat. No. 4,028,258 which discloses the alkylene oxide adduct of phosphosulfurized N-(hydroxyalkyl) alkenyl succinimides. The disclosures of the above references are herein incorporated by reference. Preferred friction modifiers are include hydroxy amines, as disclosed in U.S. Pat. No. 5,078,893 and the thioether hydroxyamines as disclosed in U.S. Ser. No. 211,428 filed Jun. 24, 1988; glycerol mono and dioleates; succinate esters, or metal salts thereof, of hydrocarbyl substituted succinic acids or anhydrides and thiobis alkanols such as described in U.S. Pat. No. 4,344,853 and amide friction modifiers such as the reaction product of isostearic acid and tetraethylene pentamine as disclosed in U.S. Ser. No. 425,939, filed Oct. 24, 1989 (our file PTF-048), all of which are herein incorporated by reference.

Anti-Foamants

Foam control can be provided by an antifoamant of the polysiloxane type, e.g. silicone oil and polydimethyl siloxane.

Rust Inhibitors

Organic, oil-soluble compounds useful as rust inhibitors comprise nonionic surfactants such as polyoxyalkylene polyols and esters thereof, and anionic surfactants such as salts of alkyl sulfonic acids. Such anti-rust compounds are known and can be made by conventional means. Nonionic surfactants, useful as anti-rust additives in oleaginous compositions usually owe their surfactant properties to a number of weak stabilizing groups such as ether linkages. Nonionic anti-rust agents containing ether linkages can be made by alkoxylating organic substrates containing active hydrogens with an excess of the lower alkylene oxides (such as ethylene and propylene oxides) until the desired number of alkoxy groups have been placed in the molecule.

The preferred rust inhibitors are polyoxyalkylene polyols and derivatives thereof. This class of materials are commercially available from various sources: Pluronic Polyols from Wyandotte Chemicals Corporation; Polyglycol 112-2, a liquid triol derived from ethylene oxide and propylene oxide available from Dow Chemical Co.; and Tergitol, dodecylphenyl or monophenyl polyethylene glycol ethers, and Ucon, polyalkylene glycols and derivatives, both available from Union Carbide Corp. These are but a few of the commercial products suitable as rust inhibitors.

In addition to the polyols per se, the esters thereof obtained by reacting the polyols with various carboxylic acids are also suitable. Acids useful in preparing these esters are lauric acid, stearic acid, succinic acid, and alkyl- or alkenyl-substituted succinic acids wherein the alkyl or alkenyl group contains up to about 20 carbon atoms.

The preferred polyols are prepared as block polymers. Thus, a hydroxy-substituted compound, R—(OH)n (wherein n is 1 to 6, and R is the residue of a mono- or polyhydric alcohol, phenol, naphthol, etc.) is reacted with propylene oxide to form a hydrophobic base. This base is then reacted with ethylene oxide to provide a hydrophylic portion resulting in a molecule having both hydrophobic and hydrophylic portions. The relative sizes of these portions can be adjusted by regulating the ratio of reactants, time of reaction, etc., as is obvious to those skilled in the art. Typically, the ethylene oxide units will comprise from about 10 to about 40%, preferably from about 10 to about 15% by weight of the molecule. Number average molecular weight of the polyol is from about 2,500 to 4,500. The polyols having a molecule weight of about 4,000 with about 10% attributable to ethylene oxide units are particularly good.

Thus it is within the skill of the art to prepare polyols whose molecules are characterized by hydrophobic and hydrophylic moieties which are present in a ratio rendering rust inhibitors suitable for use in any lubricant composition regardless of differences in the base oils and the presence of other additives.

If more oil-solubility is needed in a given lubricating composition, the hydrophobic portion can be increased and/or the hydrophylic portion decreased. If greater oil-in-water emulsion breaking ability is required, the hydrophylic and/or hydrophobic portions can be adjusted to accomplish this.

Compounds illustrative of R—(OH)n include alkylene polyols such as the alkylene glycols, alkylene triols, alkylene tetrols, etc., such as ethylene glycol, propylene glycol, glycerol, pentaerythritol, sorbitol, mannitol, and the like. Aromatic hydroxy compounds such as alkylated mono- and polyhydric phenols and naphthols can also be used, e.g., heptylphenol, dodecylphenol, etc.

Also useful rust inhibitors are alkoxylated fatty amines, amides, alcohols and the like, including such alkoxylated fatty acid derivatives treated with $C_9$ to $C_{16}$ alkyl-substituted phenols (such as the mono- and diheptyl, octyl, nonyl, decyl, undecyl, dodecyl and tridecyl phenols), as described in U.S. Pat. No. 3,849,501, which is also hereby incorporated by reference in its entirety.

Demulsifiers

Suitable demulsifiers include the esters disclosed in U.S. Pat. Nos. 3,098,827 and 2,674,619 herein incorporated by reference.

Lube Oil Flow Improvers

Lubricating oil flow improvers (LOFI) include all those additives which modify the size, number, and growth of wax crystals in lube oils or fuels in such a way as to impart improved low temperature handling, pumpability, and/or vehicle operability as measured by such tests as pour point and mini rotary viscometry (MRV). The majority of flow improvers are polymers or contain polymers. These polymers are generally of two types, either backbone or sidechain.

The backbone variety, such as the ethylene-vinyl acetates (EVA), have various lengths of methylene segments randomly distributed in the backbone of the polymer, which associate or cocrystallize with the wax crystals inhibiting further crystal growth due to branches and non-crystallizable segments in the polymer.

The sidechain type polymers, which are the predominant variety used as LOFI's, have methylene segments as the sidechains, preferably as straight sidechains. The polymers work similarly to the backbone type except the sidechains have been found more effective in treating isoparaffins as well as n-paraffins found in lube oils. Representative of this type of polymer are $C_8$ to $C_{18}$ dialkylfumarate/vinyl acetate copolymers, polyacrylates, polymethacrylates, and esterified styrene-maleic anhydride copolymers.

Seal Swell Agents

Seal swellants include mineral oils of the type that provoke swelling of engine seals, including aliphatic alcohols of 8 to 13 carbon atoms such as tridecyl alcohol, with a preferred seal swellant being characterized as an oil-soluble, saturated, aliphatic or aromatic hydrocarbon ester of from 10 to 60 carbon atoms and 2 to 4 linkages, e.g., dihexyl phthalate, as are described in U.S. Pat. No. 3,974,081.

Some of the above numerous additives can provide a multiplicity of effects e.g., a dispersant oxidation inhibitor. This approach is well known and need not be further elaborated herein.

Compositions, when containing these additives, typically are blended into the base oil in amounts which are effective to provide their normal attendant function. Representative effective amounts of such additives are illustrated as follows:

| Compositions | (Broad) Wt % | (Preferred) Wt % |
|---|---|---|
| V.I. Improver | 1–12 | 1–4 |
| Corrosion Inhibitor | 0.01–3 | 0.01–1.5 |
| Oxidation Inhibitor | 0.01–5 | 0.01–1.5 |
| Dispersant | 0.1–10 | 0.1–5 |
| Lube Oil Flow Improver | 0.01–2 | 0.01–1.5 |
| Detergents and Rust Inhibitors | 0.01–6 | 0.01–3 |
| Pour Point Depressant | 0.01–1.5 | 0.01–1.5 |
| Anti-Foaming Agents | 0.001–0.1 | 0.001–0.01 |
| Antiwear Agents | 0.001–5 | 0.001–1.5 |
| Seal Swellant | 0.1–8 | 0.1–4 |
| Friction Modifiers | 0.01–3 | 0.01–1.5 |
| Lubricating Base Oil | Balance | Balance |

When other additives are employed, it may be desirable, although not necessary, to prepare additive concentrates comprising concentrated solutions or dispersions of the subject additives of this invention (in concentrate amounts hereinabove described), together with one or more of said other additives (said concentrate when constituting an additive mixture being referred to herein as an additive-package) whereby several additives can be added simultaneously to the base oil to form the lubricating oil composition. Dissolution of the additive concentrate into the lubricating oil may be facilitated by solvents and by mixing accompanied with mild heating, but this is not essential. The concentrate or additive-package will typically be formulated to contain the additives in proper amounts to provide the desired concentration in the final formulation when the additive-package is combined with a predetermined amount of base lubricant. Thus, the subject additives of the present invention can be added to small amounts of base oil or other compatible solvents along with other desirable additives to form additive-packages containing active ingredients in collective amounts of typically from about 2.5 to about 90%, and preferably from about 15 to about 75%, and most preferably from about 25 to about 60% by weight additives in the appropriate proportions with the remainder being base oil.

The final formulations may employ typically about 10 wt. % of the additive-package with the remainder being base oil.

All of said weight percents expressed herein (unless otherwise indicated) are based on active ingredient (A.I.) content of the additive, and/or upon the total weight of any additive-package, or formulation which will be the sum of the A.I. weight of each additive plus the weight of total oil or diluent.

The invention is further illustrated by the following examples which are not to be considered as limitative of its scope. The molecular weights were measured by gas permeation chromatography (GPC). Polystyrene was used as a calibration standard.

EXAMPLES 1–7

Figure 2:
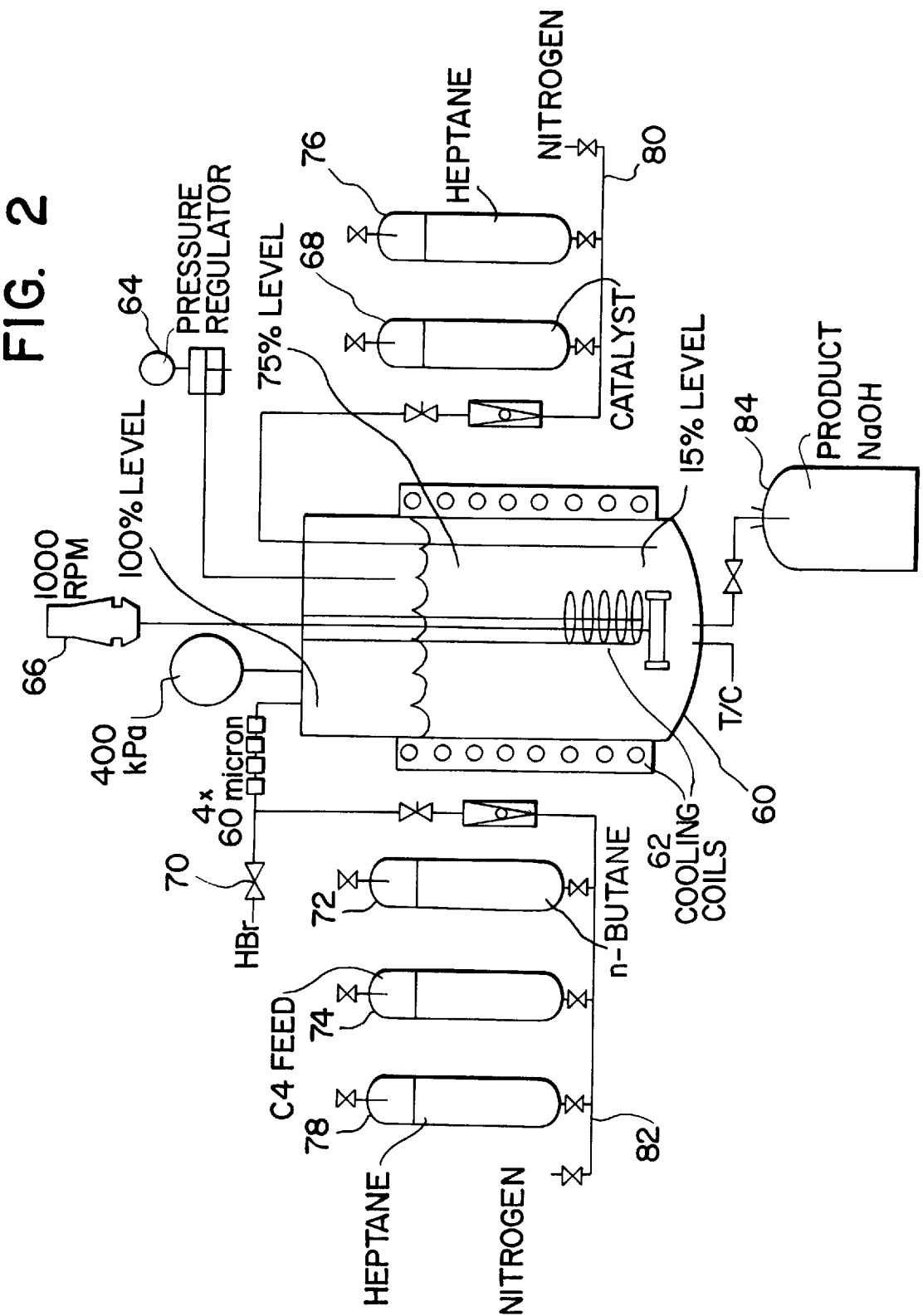
FIG. 2 is a schematic diagram of a laboratory reactor useful for the present invention.
Figure 4A:
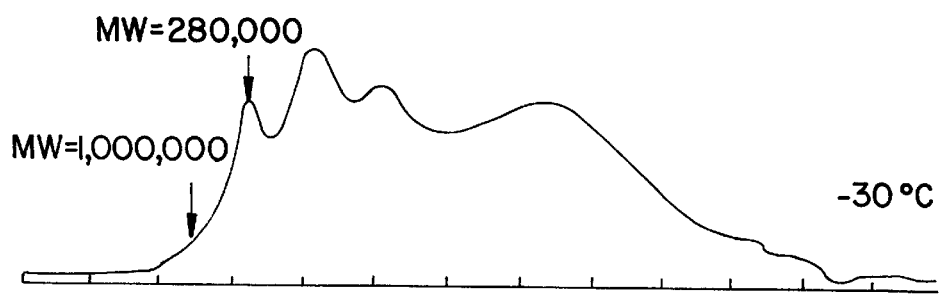
FIGS. 4A to 4E represent a series of plots of concentration vs. time (number average molecular weight) based on gel permeation chromatography showing changes with varying polymerization temperature for polymer made in Examples 2–6.
Figure 4B:
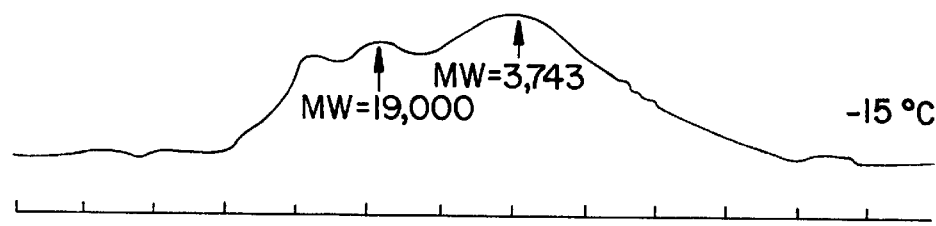
Figure 4C:
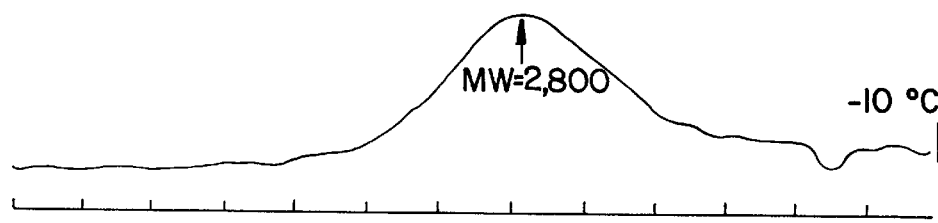
Figure 4D:
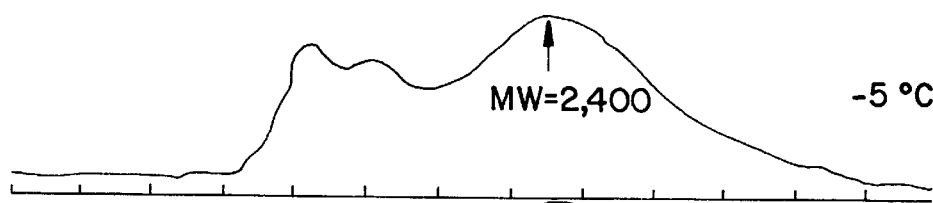
Figure 4E:
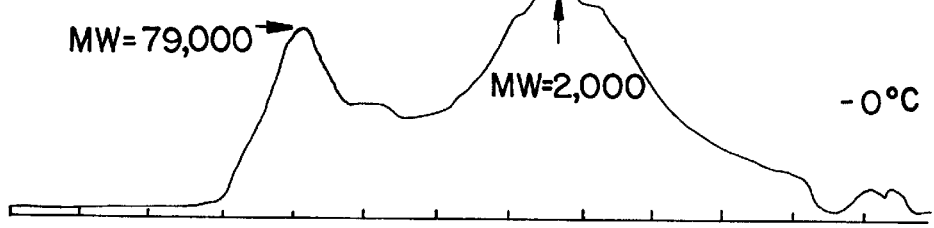

In a series of runs, liquefied anhydrous feedstream composed of isobutene, 1-butene, 2-butene, n-butane and isobutane were mixed for pre-reaction with the selected amount of gaseous anhydrous HBr. Referring to FIG. 2, the reaction was conducted in a laboratory reactor 60 having cooling coils 62, pressure regulator 64, and stirrer 66. Aluminum bromide solution was prepared immediately before each example and placed in catalyst reservoir 68. Cocatalyst HBr was added through cocatalyst line 70. N-butane was added from n-butane reservoir 72. $C_4$ feed was added from $C_4$ reservoir 74. There were heptane wash reservoirs 76 and 78. There were also nitrogen lines 80 and 82 to maintain the reaction under a blanket of nitrogen. The resulting product was fed to product tank 84.

The apparatus was used to polymerize 1-butene in Example 1. The compositions and conditions for polymerization in accordance with Example 1 are summarized in Table I below. $C_4$=represents the $C_4$ feed having an unsaturated double bond (i.e. 1-butene in Example 1). $C_{40}$ represents n-butane and isobutane (i.e. n-butane in Example 1). FIG. 3 is a gel permeation chromatography plot of concentration vs. minutes. Molecular weight peaks were observed at 16,860 and 15,000,000.

TABLE I

| Semi Batch Reactor | |
|---|---|
| Vol 1-butene and n-butane feed[1] | 120.0 |
| Wt % $C_4$= | 20.5 |
| Moles $C_4$= | 0.264 |
| $C_4$= delivery time, min | 60 |
| $C_4$= flow rate, ml/min | 2.00 |
| Mole ratio per minute $C_4$=/AlBr$_3$/min | 0.83 |
| Mole ratio n-butane/$C_4$= | 6.63 |
| Conc AlBr3, g/ml in n-butane[2] | 0.0500 |
| Desired AlBr3/$C_4$= ratio | 0.020 |
| Vol AlBr3 ml | 28.1 |
| AlBr3 delivery time, min | 5 |
| AlBr3 rate, ml/min | 5.62 |
| HBr/$C_4$= ratio | 0.0080 |
| HBr delivery time, min | 10 |
| HBr rate, g/min | 0.01706 |
| Initial n-butane charge, ml | 50 |

TABLE I-continued

Semi Batch Reactor

| | |
|---|---|
| total reactor charge, ml | 198 |
| Reactor temp, °C. | −30 |

[1]-Feed prepared by mixing 102.5 g 1-butene with 397.5 g n-butane.
[2]-38 g AlBr3 dissolved in 440 g n-butane.

EXAMPLES 2–6

Examples 2 through 6 were conducted according to the same procedure as Example 1 with reaction temperatures of −30° C. in Example 2, −15° C. in Example 3, −10° C. in Example 4, −5° C. in Example 5 and 0° C. in Example 6. FIGS. 4A, 4B, 4C and 4D, and 4E are gel permeation chromatography plots. Based on FIGS. 4A to 4E, it was determined that at −30° C. the molecular weight ranged up to 1,000,000. As the temperature increased, the molecular weight decreased. At −30° C. there was a molecular weight concentration peak at 280,000 while at 0° C. the high molecular weight peak was at 79,000.

EXAMPLE 7

Example 7 was conducted in a reactor as shown in FIG. 2. A simulated Raffinate II feedstream was added to reactor from $C_4$ reservoir 74. Cocatalyst HBr gas was added through cocatalyst line 70 to premix with feedstream through a series of gas-liquid mixers before adding to reactor. The simulated Raffinate II composition used was:

| Raffinate II Composition: | |
|---|---|
| | wt. % |
| isobutane | 16.12 |
| n-butane | 50.49 |
| trans-2-butene | 7.59 |
| 1-butene | 20.66 |
| isobutylene | 1.05 |
| cis-2-butene | 4.08 |

Figure 5:
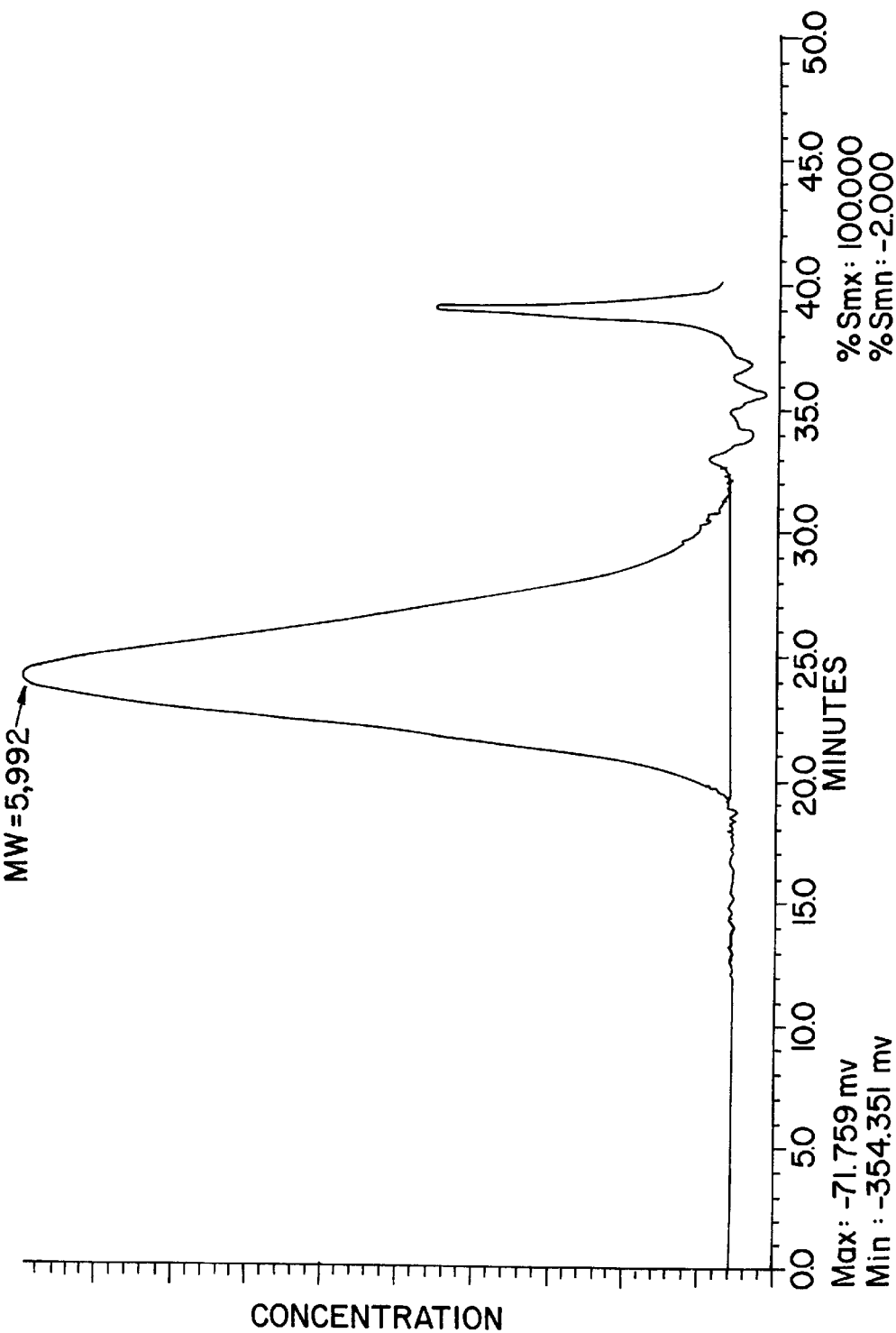
FIG. 5 illustrates the gel permeation chromatography of concentration vs. time (number average molecular weight) for poly-n-butene prepared from a simulated Raffinate II feed in Example 7.

The polymerization conditions listed in Table II were used. The resulting PNB polymer mol. wt. was measured by GPC with peak mol. wt. 5,992, Mn (number average molecular weight) 2,899 and weight average molecular weight 7,134 as shown in FIG. 5.

TABLE II

Semi-Batch Reactor

| | |
|---|---|
| Vol 50% dil Raff-2 feed ml[1] | 120.0 |
| wt % $C_4$= | 33.5 |
| Moles $C_4$= | 0.423 |
| $C_4$= delivery time, min | 60 |
| $C_4$= flow rate, ml/min | 2.00 |
| Mole ratio per min. $C_4$=/AlBr3/min | 0.83 |
| Mole ratop/$C_4$= | 3.71 |
| Concn AlBr3 g/ml in hexane[2] | 0.0500 |
| AlBr3/$C_4$= ratio | 0.020 |
| Vol AlBr$_3$ ml | 45.1 |
| AlBr$_3$ delivery time, min | 5 |
| AlBr$_3$ rate, ml/min | 9.02 |
| Desired HBr/$C_4$= ratio | 0.0080 |
| HBr delivery time, min | 10 |
| HBr rate, g/min | 0.02737 |
| Initial hexane charge, ml | 50 |
| Total reactor charge, ml | 215 |
| Reactor temp, °C. | −30 |

[1]-About 300 g of a dilute feed by mixing equal wts of simulated Raff-2 and n-butane.
[2]-Dissolve 38 g AlBr3 in 440 g n-butane.

EXAMPLE 8

Example 8 was conducted in a pilot plant reactor, a schematic diagram of which is shown in FIG. 6. The reactor system included a continuous feed stirred tank reactor 100. A simulated Raffinate II feedstream as described in Example 7 was fed through line 102 to the continuous stirred reactor 100. A catalyst solution was fed to the reactor through catalyst feedline 104.

The Raffinate II feedstream was mixed with a cocatalyst HBr gas fed through cocatalyst line 106. The reactor had a suitable stirring means 108. The reactor was a sealed reactor which had means to provide an inert atmosphere such as nitrogen as well as a means to control the temperature of the incoming fluids and the temperature in the reactor. The reactants were fed at or near the bottom of the reactor with product removed at reactor outlet 110 and reactor outlet 112. The pressure was 600 Kpa. The reactor was run continuously with variations in temperature T(°C.), monomer (M) to catalyst (CAT) molar ratio, cocatalyst (COCAT) to catalyst molar ratio with reaction time (min) peak molecular weight(s) of product, and percent monomer conversion measured. Results are summarized in Table III for runs 1 through 21.

Figure 8:
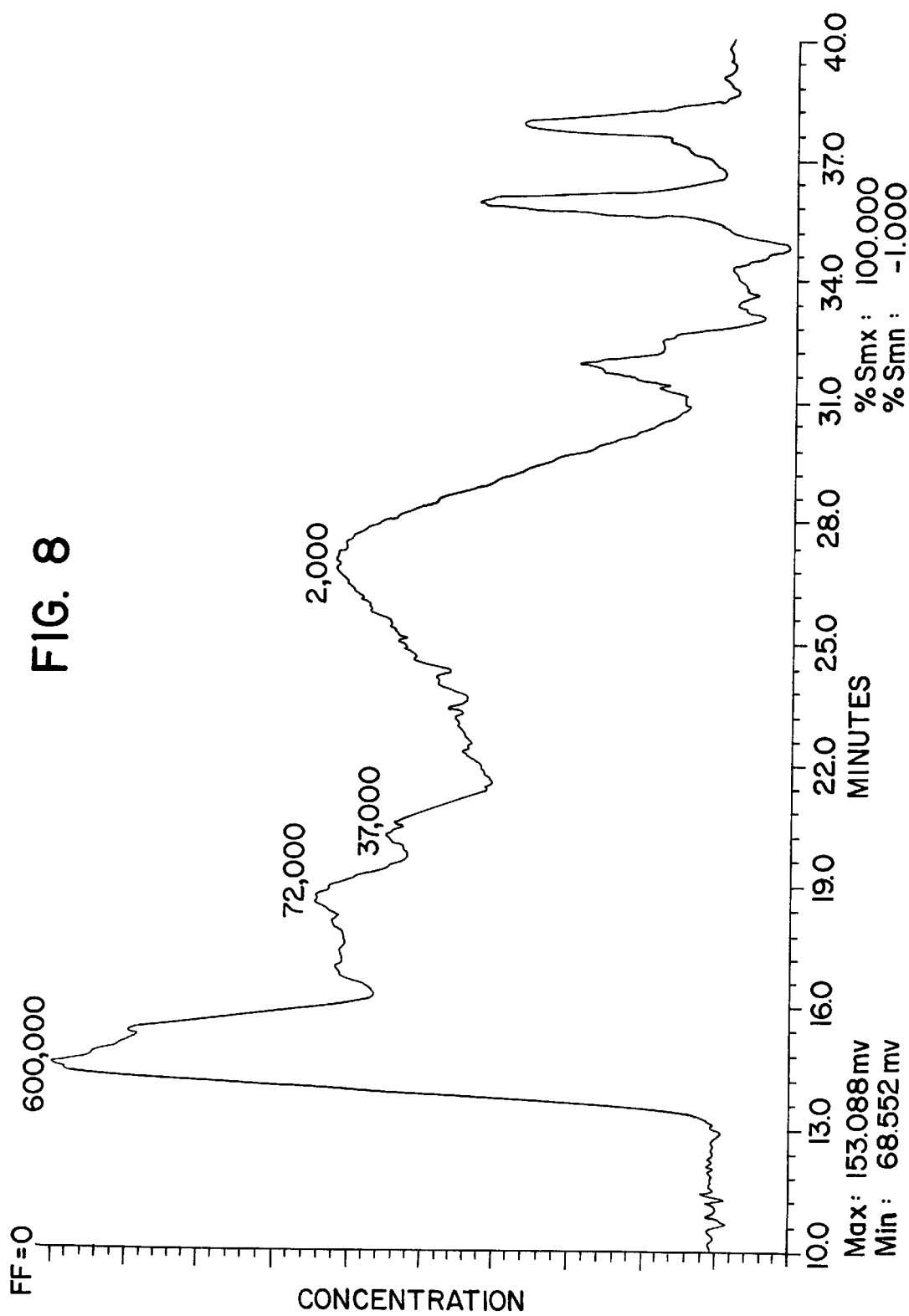
FIG. 8 shows the results of a gel permeation chromatographic test shown as a plot of concentration vs. time which can be converted to number average molecular weight for polymer made in Example 8, run 9.
Figure 9:
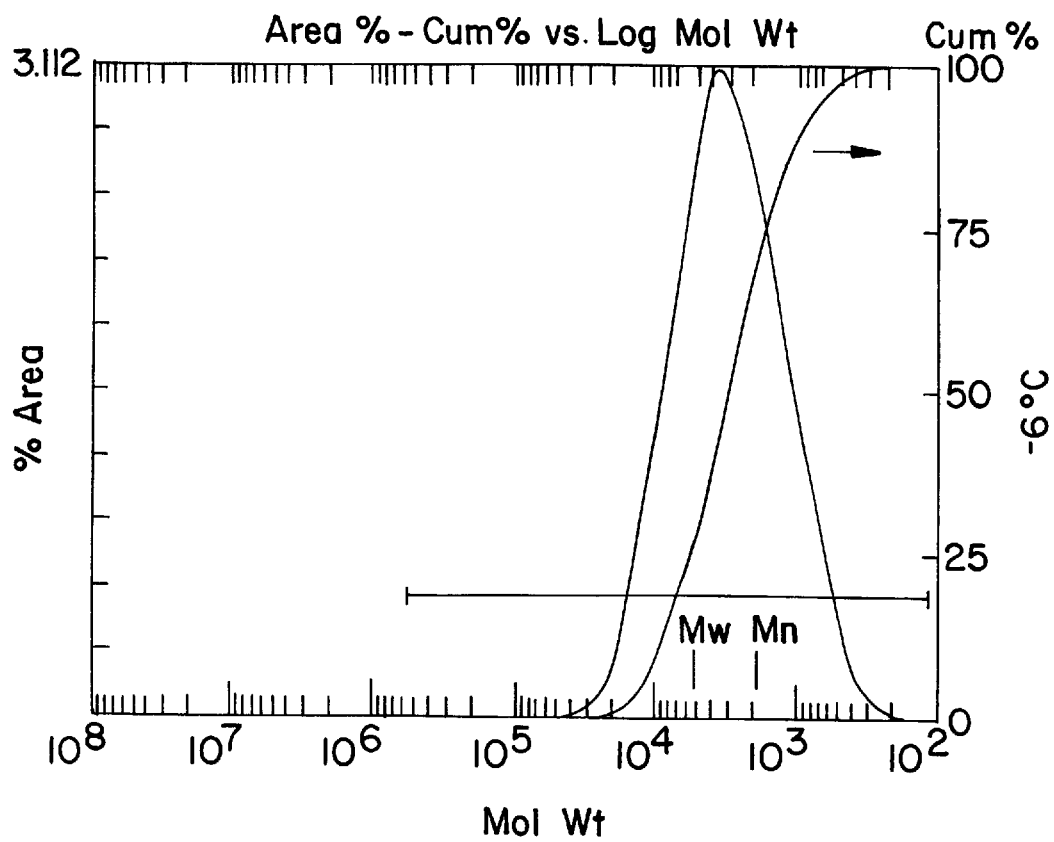
FIGS. 9 and 10 are each a gel permeation trace, having a curve (related to the right axis), showing cumulated % of sample concentration vs. number average weight for Example 8, runs 3 and 6 respectively.
Figure 10:
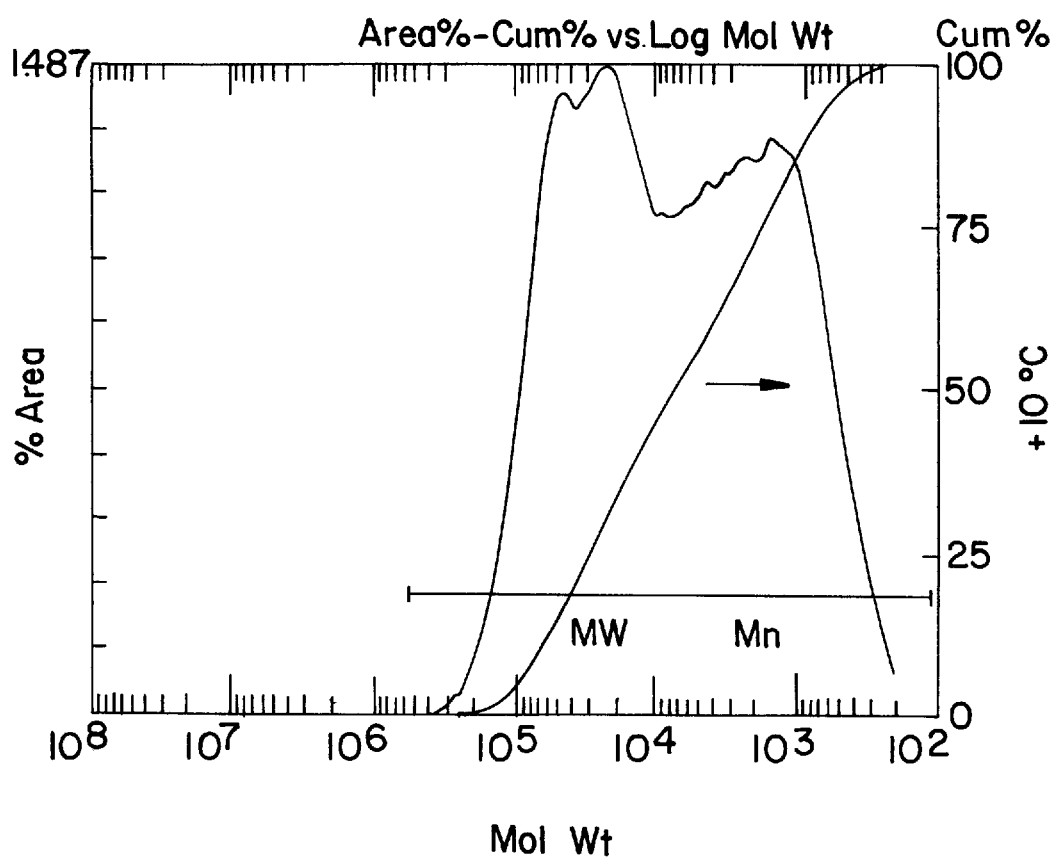

The results of run 9 are shown in FIG. 8, with molecular weights at various peaks indicated.

TABLE III

PNB CONTINUOUS RUNS SUMMARY
CFST REACTOR, CAT = AlBR$_3$, COCAT = HBR

| RUN | TEMP | M/CAT MOLE RATIO | M/COCAT MOLE RATIO | COCAT/CAT MOLE RATIO | TIME | GPC PEAK MW | % CONV |
|---|---|---|---|---|---|---|---|
| 1 | −10.6 | 175 | 100.2 | 1.75 | 22.9 | 1634 | 99.2 |
| 2 | 7.8 | 50.0 | 185.0 | 0.27 | 44.2 | 2315 | 100.0 |
| 3 | −6.1 | 116.2 | 125.0 | 0.93 | 34.7 | 3533 | 100.0 |
| 4 | −23.2 | 202.3 | 185.0 | 1.09 | 55.1 | 2271 | 99.9 |
| 5 | 7.5 | 197.0 | 100.0 | 1.97 | 55.0 | 1635 | 99.3 |
| 6 | 10.1 | 54.6 | 33.3 | 1.64 | 23.1 | 47000 | 99.9 |
|  |  |  |  |  |  | 21000 |  |
|  |  |  |  |  |  | 1300 |  |
| 7 | 7.5 | 184.6 | 443.6 | 0.42 | 22.3 | 1578 | 97.5 |
| 8 | −20.0 | 53.0 | 500.0 | 0.11 | 22.6 | 2119 | 100.0 |
| 9 | −15.5 | 60.2 | 33.3 | 1.80 | 44.2 | 600000 | 100.0 |
|  |  |  |  |  |  | 72000 |  |
|  |  |  |  |  |  | 37000 |  |
|  |  |  |  |  |  | 2000 |  |
| 10 | −16.0 | 50.0 | 50.0 | 1.00 | 40.8 | 65000 | 100.0 |
|  |  |  |  |  |  | 25000 |  |
|  |  |  |  |  |  | 2000 |  |
| 11 | −4.7 | 50.0 | 50.0 | 1.00 | 40.8 | 76000 | 100.0 |
|  |  |  |  |  |  | 24000 |  |
|  |  |  |  |  |  | 1200 |  |
| 12 | −3.0 | 120.6 | 140.6 | 0.86 | 25.9 | 3045 | 100.0 |
| 13 | −1.0 | 150.0 | 150.0 | 1.00 | 27.1 | 1632 | 97.5 |
| 14 | −20.0 | 217.0 | 75.0 | 2.89 | 27.6 | 2004 | 99.6 |
| 15 | −1.2 | 217.0 | 75.0 | 2.89 | 27.6 | 1716 | 98.3 |
| 16 | −10.7 | 92.0 | 67.0 | 1.37 | 29.7 | 4528 | 99.9 |
| 17 | −10.5 | 45.0 | 20.0 | 2.25 | 31.6 |  | 99.1 |
| 18 | −20.5 | 44.0 | 50.0 | 0.88 | 31.4 |  | 100.0 |
| 19 | −1.0 | 39.0 | 50.0 | 0.79 | 30.9 | 64000 | 99.9 |
| 20 | −1.0 | 39.0 | 20.0 | 1.96 | 30.9 |  | 100.0 |
| 21 | −15.0 | 134.0 | 189.0 | 0.71 | 27.0 | 2447 | 99.9 |

EXAMPLES 9–11

Figure 7A:
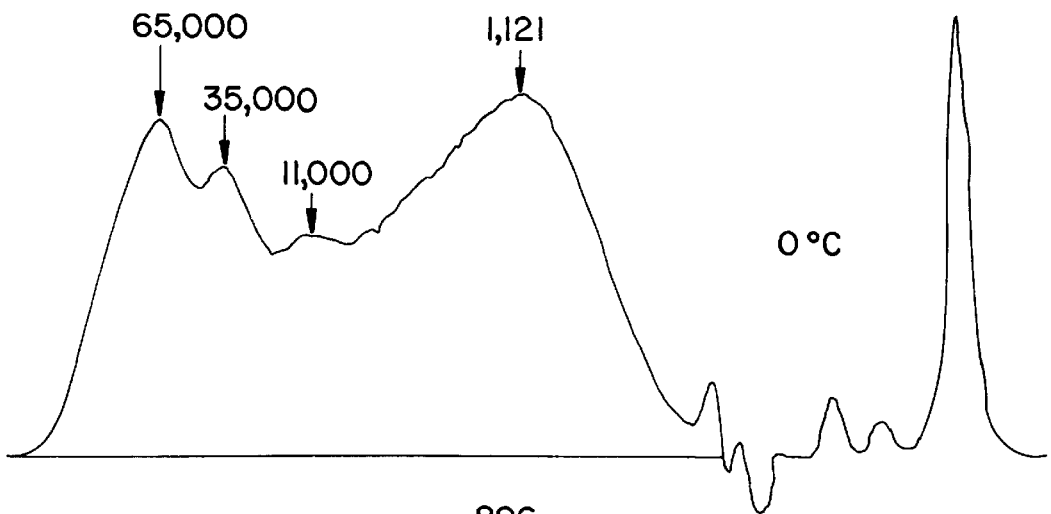
FIGS. 7A to 7C is a series of gel permeation chromatography plots of concentration vs. time (number average molecular weight) with varying temperature based on polymers produced in Examples 9–11 using the reactor shown in FIG. 6.
Figure 7B:
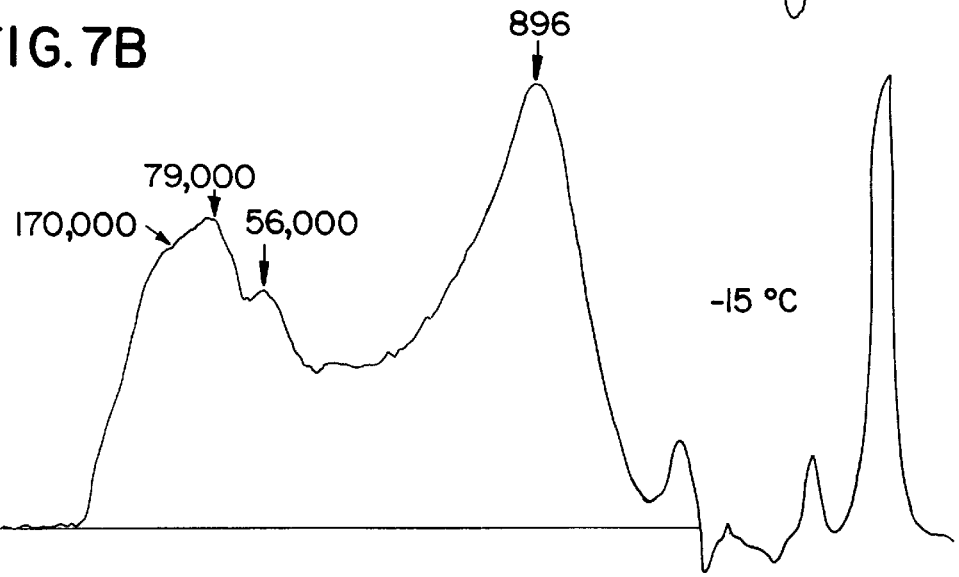
Figure 7C:
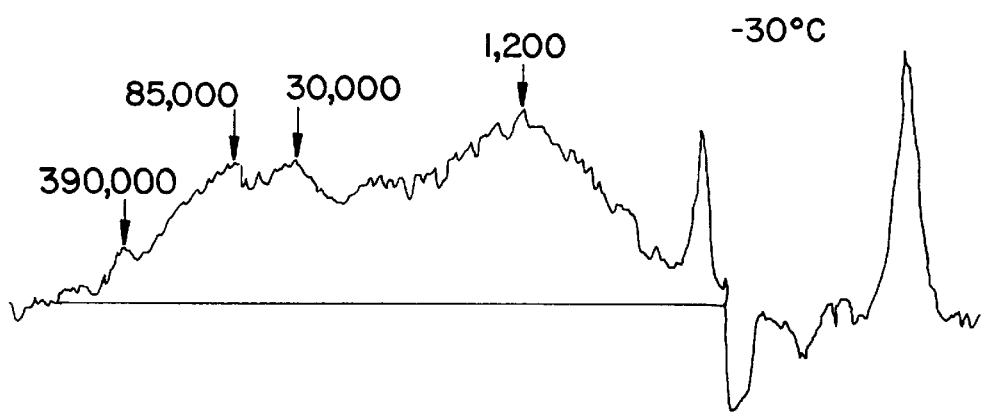

Examples 9 through 11 were conducted according to the similar procedure as Example 8. Poly-n-butene was prepared with the reactor at 0° C. in Example 9, −15° C. in Example 10, and −30° C. in Example 11. Results of gel permeation chromatography are shown on FIGS. 7A to 7C. At lower temperatures the molecular weight increased.

A correlation analysis was conducted based on the results in Table III with the analysis results summarized in FIG. 11. The analysis used a preferred cocatalyst to catalyst mole ratio of 1.5. The molecular weight of the polymers was estimated from the equation: Molecular Weight= 30918−227.6 (Temperature)−137.1 (M/CAT) with R-square=0.76. The temperature is the reactor temperature (RC), and M/CAT is the mole ratio of monomer to catalyst.

The principles, preferred embodiments, and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. Amorphous poly-n-butene having a number average molecular weight of from about 1,200,000 to about 15,000,000 and being at least 95% amorphous.

2. Polymer comprising at least one repeating unit selected from the group consisting of:

—(CH$_2$—CHR)—;

and

—(R$^1$HC—CHR$^2$)— wherein R is a hydrocarbon having from 2 to 22 carbon atoms and R$^1$ and R$^2$ are the same or different hydrocarbon groups or substituted hydrocarbon groups having 1 to 22 carbon atoms, the polymer comprising at least 50 mole % of —(CH$_2$—CHR)—, being at least 95% amorphous, further comprising polymer chains having from 0.5 to 1.0 carbon-carbon double bonds per polymer chain, and having a number average molecular weight of from about 1,200,000 to about 15,000,000.

3. Amorphous poly-n-butene as recited in claim 1 wherein the polymer is at least 99% amorphous.

4. Cationically polymerized polymer derived from at least one monomer selected from the group consisting of monomers having the formula:

H$_2$C=CHR;

and

R$^1$HC=CHR$^2$ wherein R is a hydrocarbon having from 2 to 22 carbon atoms and R$^1$ and R$^2$ are the same or different hydrocarbon groups or substituted hydrocarbon groups having from 1 to 22 carbon atoms, the polymer comprising at least 50 mole % of repeating units derived from H$_2$C=CHR, being at least 95% amorphous and having a number average molecular weight of from about 1,200,000 to about 15,000,000.

5. Cationically polymerized polymer recited in claim 4 being a homopolymer wherein said monomer is 1-butene.

6. Cationically polymerized polymer as recited in claim 4 comprising at least one of cis-2-butene and trans-2-butene.

7. Cationically polymerized polymer as recited in claim 4 being at least 99% amorphous.

8. The polymer or copolymer of claim 1 having a molecular weight distribution of less than about 4.

9. Polymer as recited in claim 8 having a molecular weight distribution of from about 1.1 to about 3.5.

10. A lubricating oil concentrate containing from about 10 to about 80 wt. % of the polymer or copolymer of claim 1.

11. A lubricating oil concentrate containing from about 20 to about 60 wt. % of the polymer as recited in claim 10.

12. A lubricating oil composition containing from about 0.1 to about 20 wt. % of the polymer or copolymer of claim 1.

13. Amorphous poly-n-butene having a number average molecular weight of from about 1,200,000 to about 15,000,000 obtained by the process comprising (A) combining polymerization reaction promoter and n-butene containing monomer stream to form promoted monomer stream prior to contact with polymerization catalyst;

(B) combining said promoted monomer stream with a catalyst selected from the group consisting of organo metal bromide having the formula

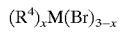

wherein M is selected from Group IIIA elements of the Periodic Table, $R^4$ is $C_1$ to $C_{20}$ hydrocarbyl and X is an integer of from 1 to 2; and metal bromide having the formula MXn wherein M is as defined above, X is a halogen with at least one X being bromide, and n is the ratio of halogen atoms to atoms of M; and (C) polymerizing said promoted monomer in the presence of said catalyst in a manner and under conditions sufficient to produce said amorphous poly-n-butene.

14. Polymer comprising at least one repeating unit selected from the group consisting of:

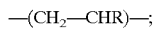

and

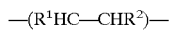

wherein R is a hydrocarbon having from 2 to 22 carbon atoms and $R^1$ and $R^2$ are the same or different hydrocarbon groups or substituted hydrocarbon groups having 1 to 22 carbon atoms, the polymer comprising at least 50 mole percent of —(CH$_2$—CHR)—, being at least 95 percent amorphous, said polymer further comprising polymer chains having from 0.5 to 1.0 carbon-carbon double bonds per polymer chain, and having a number average molecular weight of from about 1,200,000 to about 15,000,000 obtained by the process comprising (A) combining polymerization reaction promoter and n-butene containing monomer stream to form promoted monomer stream prior to contact with polymerization catalyst;

(B) combining said promoted monomer stream with a catalyst selected from the group consisting of organo metal bromide having the formula

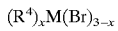

wherein M is selected from Group IIIA elements of the Periodic Table, $R^4$ is $C_1$ to $C_{20}$ hydrocarbyl and X is an integer of from 1 to 2; and metal bromide having the formula MXn wherein M is as defined above, X is a halogen with at least one X being bromide, and n is the ratio of halogen atoms to atoms of M; and (C) polymerizing said promoted monomer in the presence of said catalyst in a manner and under conditions sufficient to produce said amorphous poly-n-butene.

15. The polymer of claim 13, wherein R is —$C_2H_5$ and $R^1$ and $R^2$ can be the same or different and are selected from the group consisting of —$CH_3$ and —$C_2H_5$.

16. The polymer of claim 14 comprising up to 95 mole percent —(CH$_2$—CHR)— and up to 50 mole percent of —($R^1$HC—CHR$^2$)—.

17. The polymer of claim 13, wherein the catalyst is selected from the group consisting of AlBr$_3$, AlBr$_2$Cl, AlBrCl$_2$, GaBr$_3$, GaBrCl$_2$, GaBr$_2$Cl, GaBr$_2$Cl$_2$, GaCl$_3$ and SbF$_5$ and the cocatalyst is HBr.

18. The polymer or copolymer of claim 2, having a molecular weight distribution of less than 4.

19. The polymer or copolymer of claim 18, having a molecular weight distribution of from about 1.1 to about 3.5.

20. A lubricating oil concentrate containing about 10 to about 80 wt. % of the polymer or copolymer of claim 2.

21. A lubricating oil composition containing from about 0.1 to about 20 wt. % of the polymer or copolymer of claim 2.

22. The polymer or copolymer of claim 4, having a molecular weight distribution of less than 4.

23. The polymer or copolymer of claim 22, having a molecular weight distribution of from about 1.1 to about 3.5.

24. A lubricating oil concentrate containing about 10 to about 80 wt. % of the polymer or copolymer of claim 4.

25. A lubricating oil composition containing from about 0.1 to about 20 wt. % of the polymer or copolymer of claim 4.

26. The polymer of claim 14, wherein R is —$C_2H_5$ and $R^1$ and $R^2$ can be the same or different and are selected from the group consisting of —$CH_3$ and —$C_2H_5$.

27. The polymer of claim 14, wherein the catalyst is selected from the group consisting of AlBr$_3$, AlBr$_2$Cl, AlBrCl$_2$, GaBr$_3$, GaBrCl$_2$, GaBr$_2$Cl, GaBr$_2$Cl$_2$, GaCl$_3$ and SbF$_5$, and the cocatalyst is HBr.

* * * * *